(12) United States Patent
Huang et al.

(10) Patent No.: US 12,466,811 B2
(45) Date of Patent: Nov. 11, 2025

(54) MASS SPECTROMETRY CLEAVABLE HETEROBIFUNCTIONAL PHOTOACTIVATED CROSS-LINKERS

(71) Applicant: The Regents of the University of California, Oakland, CA (US)

(72) Inventors: Lan Huang, Irvine, CA (US); Scott D. Rychnovsky, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 874 days.

(21) Appl. No.: 17/680,236

(22) Filed: Feb. 24, 2022

(65) Prior Publication Data

US 2022/0274963 A1    Sep. 1, 2022

Related U.S. Application Data

(60) Provisional application No. 63/153,344, filed on Feb. 24, 2021.

(51) Int. Cl.
| | |
|---|---|
| C07D 403/12 | (2006.01) |
| G01N 30/72 | (2006.01) |
| G01N 33/68 | (2006.01) |
| G01N 30/02 | (2006.01) |

(52) U.S. Cl.
CPC ....... *C07D 403/12* (2013.01); *G01N 30/7233* (2013.01); *G01N 33/6845* (2013.01); *G01N 33/6848* (2013.01); *G01N 2030/027* (2013.01)

(58) Field of Classification Search
None
See application file for complete search history.

(56) References Cited

U.S. PATENT DOCUMENTS

| | | |
|---|---|---|
| 9,222,943 B2 | 12/2015 | Rychnovsky et al. |
| 2016/0245822 A1 | 8/2016 | Rychnovsky et al. |
| 2017/0082635 A1 | 3/2017 | Rychnovsky et al. |
| 2017/0350901 A1 | 12/2017 | Huang et al. |
| 2021/0253524 A1 | 8/2021 | Huang et al. |

FOREIGN PATENT DOCUMENTS

WO    WO 2020/072674    *    4/2020    .......... C12Q 1/6872

OTHER PUBLICATIONS

Pan et al., "Targeting Jab1/CSN5 in nasopharyngeal carcinoma." Cancer Lett. 326(2): 155-160 (2012).
Peth et al., "Downregulation of COP9 signalosome subunits differentially affects the CSN complex and target protein stability." BMC Biochemistry 8(27):1-14 (2007).
Petroski et al., "Function and Regulation of Cullin_RING Ubiquitin Ligases." Nature Reviews Molecular Cell Biology 6(1):9-20 (2005).
(Continued)

*Primary Examiner* — Xiaoyun R Xu
(74) *Attorney, Agent, or Firm* — Gavrilovich, Dodd & Lindsey LLP

(57) ABSTRACT

The disclosure provides for mass spectrometry (MS)-cleavable heterobifunctional photoactivated cross-linkers. The MS-cleavable heterobifunctional photoactivated cross-linkers can be used in mass spectrometry to facilitate structural analysis of intra-protein interactions in proteins and inter-protein interactions in protein complexes.

12 Claims, 38 Drawing Sheets

Specification includes a Sequence Listing.

(56) References Cited

OTHER PUBLICATIONS

Petrotchenko et al., "An Isotopically Coded CID-cleavable Biotinylated Cross-linker for Structural Proteomics." Molecular Cell Proteomics 10(2):M110.001420 (2011).
Richardson et al., "The Emerging Role of the COP9 Signalosome in Cancer." Mol Cancer Res 3(12):645-653 (2005).
Rieping et al., "Inferential Structure Determination." Science 309:303-306 (2005).
Robinson et al., "Molecular architecture of the yeast Mediator complex," eLife:08719 (2015).
Rockel et al., "Electron microscopy and in vitro deneddylation reveal similar architectures and biochemistry of isolated human and Flag-mouse COP9 signalosome complexes." Biochemical and Biophysical Research Communications 450:991-997 (2014).
Rout et al., "Principles for Integrative Structural Biology Studies." Cell 177:1384-1403 (May 30, 2019).
Rozen et al., "CSNAP is a Stoichiometric Subunit of the COP9 Signalosome." Cell Reports 13, 585-598 (2015).
Russel et al., "Putting the Pieces Together: Integrative Modeling Platform Software for Structure Determination of Macromolecular Assemblies." PLoS Biology 10(1):e1001244 (2012).
Sali et al., "Comparative Protein Modelling by Satisfaction of Spatial Restraints." Journal of Molecular Biology 234:779-815 (1993).
Sali et al., "Outcome of the First wwPDB Hybrid/Integrative Methods Task Force Workshop." Structure 23:1157-1167 (2015).
Sawyer Jennifer C., Non-Final Office Action for U.S. Appl. No. 15/613,065. Mailed Nov. 19, 2018.
Sawyer Jennifer C., Final Office Action for U.S. Appl. No. 15/613,065. Mailed Jul. 8, 2019.
Sawyer Jennifer C., Notice of Allowance for U.S. Appl. No. 15/613,065. Mailed Feb. 27, 2020.
Schilling et al., "MS2Assign, Automated Assignment and Nomenclature of Tandem Mass Spectra of Chemically Crosslinked Peptides." J Am Soc Mass Spectrom 4:834-850 (2003).
Schneidman-Duhovny et al., "Uncertainty in Integrative Structural Modeling." Curr Opin Struct Biol. 0: 96-104 (2014).
Scott et al., "Spatial organization and molecular interactions of the Schizosaccharomyces pombe Ccq1-Tpz1-Poz1 shelterin complex."J Mol Biol. 429(19):2863-2872 (2017).
Seeger et al., "A novel protein complex involved in signal transduction possessing similarities to 26S proteasome subunits." The FASEB Journal 12:469-478 (1998).
Sharon et al., "Structural Organization of the 19S Proteasome Lid: Insights from MS of Intact Complexes." PLoS Biology 4(8):e267 (2006).
Sharon et al., "Symmetrical Modularity of the COP9 Signalosome Complex Suggests its Multifunctionality." Structure 17, 31-40 (2009).
Shen et al., "Statistical potential for assessment and prediction of protein structures." Protein Science 15:2507-2524 (2006).
Sinz, A., "Investigation of protein-protein interactions in living cells by chemical crosslinking and mass spectrometry." Anal Bioanal Chem 397:3433-3440 (2010).
Sinz et al., "Chemical cross-linking and native mass spectrometry: A fruitful combination for structural biology." Protein Science 24:1193-1209 (2015).
Skaar et al., "Mechanisms and function of substrate recruitment by F-box proteins." Nat Rev Mol Cell Biol. 14(6):1-28 2013.
Tacke et al., "An update on the recent advances in antifibrotic therapy." Expert Review of Gastroenterology & Hepatology 12(11):1143-1152 (Nov. 2018).
Tang et al., "Mass Spectrometry Identifiable Cross-Linking Strategy for Studying Protein-Protein Interactions." Anal. Chem. 77:311-318 (2005).
Tang et al., "One-pot N-glycosylation remodeling of IgG with non-natural sialylglycopeptides enables glycosite-specific and dual-payload antibody-drug conjugates." Org. Biomol. Chem. 14:9501 (2016).
Upla et al., "Molecular Architecture of the Major Membrane Ring Component of the Nuclear Pore Complex." Structure 25:434-445 (2017).
Mswanath et al., "Assessing Exhaustiveness of Stochastic Sampling for Integrative Modeling of Macromolecular Structures." Biophysical Journal 113:2344-2353 (2017).
Wei et al., "Making Sense of the COP9 Signalosome, a regulatory protein complex conserved from *Arabidopsis* to humans." Trends Genet 15(3):98-103 (1999).
Wei et al., "The COP9 Signalosome." Annu. Rev. Cell Dev. Biol. 19:261-86 (2003).
Wei et al., "The COP9 signalosome: more than a protease." Trends in Biochemical Sciences 33(12):592-600 (2008).
Wells et al., "Reaching for high-hanging fruit in drug discovery at protein-protein interfaces." Nature 450 (13):1001-1009 (2007).
Wolf et al., "The COP9/Signalosome: An Assembly and Maintenance Platform for Cullin Ubiquitin Ligases?" Nature Cell Biology 5:1029-1033 (2003).
Wu et al., "Porous molybdenum carbide nano-octahedrons synthesized via confined carburization in metal-organic frameworks for efficient hydrogen production." Nature Communications 6:6512 (2015).
Yu et al., "Characterization of Dynamic UbR-Proteasome Subcomplexes by In vivo Cross-linking (X) Assisted Bimolecular Tandem Affinity Purification (XBAP) and Label-free Quantitation." Molecular & Cellular Proteomics 15(7):2279-2292 (2016).
Zhang et al., "COPS5 inhibition arrests the proliferation and growth of serous ovarian cancer cells via the elevation of p27 level." Biochemical and Biophysical Research Communications 493:85e93 (2017).
Zhong et al., "CSN5 silencing inhibits invasion and arrests cell cycle progression in human colorectal cancer SW480 and LS174T cells in vitro." Int J Clin Exp Pathol 8(3):2809-2815 (2015).
Aufderheide et al., "Structural characterization of the interaction of Ubp6 with the 26S proteasome." Proc. Natl. Acad. Sci. U.S.A. 112:8626-8631 (2015).
Bard et al. "Structure and function of the 26S proteasome." Annu. Rev. Biochem. 87:697-724 (2018).
Belsom et al., "Serum albumin domain structures in human blood serum by mass spectrometry and computational biology." Mol. Cell. Proteomics 15:1105-1116 (2016).
Belsom et al., "Complementary benzophenone cross-linking/mass spectrometry photochemistry." Anal. Chem. 89:5319-5324 (2017).
Brodie et al., "Isotopically-coded short-range hetero-bifunctional photo-reactive crosslinkers for studying protein structure." J. Proteomics 118:12-20 (2015).
Brodie et al., "The novel isotopically coded short-range photo-reactive crosslinker 2,4,6-triazido1,3,5-triazine (TATA) for studying protein structures." J. Proteomics 149:69-76 (2016).
Brodie et al., "Solving protein structures using short-distance cross-linking constraints as a guide for discrete molecular dynamics simulations." Sci. Adv. 3:e1700479 (2017).
Burke et al., "Synthesis of two new enrichable and MS-cleavable cross-linkers to define protein-protein interactions by mass spectrometry." Org. Biomol. Chem. 13:5030-5037 (2015).
Chavez et al., "Chemical cross-linking with mass spectrometry: A tool for systems structural biology." Curr. Opin. Chem. Biol. 48:8-18 (2019).
Ding et al., "Increasing the depth of mass-spectrometry-based structural analysis of protein complexes through the use of multiple cross-linkers." Anal. Chem. 88:4461-4469 (2016).
Finley, D. "Recognition and processing of ubiquitin-protein conjugates by the proteasome." Annu. Rev. Biochem. 78:477-513 (2009).
Fioramonte et al., "XPlex: An effective, multiplex cross-linking chemistry for acidic residues." Anal.Chem. 90:6043-6050 (2018).
Gutierrez et al., "Developing an acidic residue reactive and sulfoxide containing MS-cleavable homobifunctional cross-linker for probing protein-protein interactions." Anal. Chem. 88:8315-8322 (2016).
Gutierrez et al., "Development of a novel sulfoxide-containing MS-cleavable homobifunctional cysteine-reactive cross-linker for studying protein-protein interactions." Anal. Chem. 90:7600-7607 (2018).

(56) References Cited

OTHER PUBLICATIONS

Gutierrez et al., "Structural dynamics of the human COP9 signalosome revealed by cross-linking mass spectrometry and integrative modeling." Proc. Natl. Acad. Sci. U.S.A. 117:4088-4098 (2020).
Herzog et al., "Structural probing of a protein phosphatase 2A network by chemical cross-linking and mass spectrometry." Science 337:1348-1352 (2012).
Huang et al., "A novel mass spectrometry-cleavable, phosphate-based enrichable and multi-targeting protein cross-linker." Chem. Sci. 10:64436447 (2019).
Iacobucci et al., "Carboxyl-photo-reactive MS-cleavable cross-linkers: Unveiling a hidden aspect of diazirine-based reagents." Anal. Chem.90:2805-2809 (2018).
Iacobucci et al. "The first MS-cleavable, photo-thiol-reactive cross-linker for protein structural studies." J. Am. Soc. Mass Spectrom. 30:139-148 (2019).
Jones et al. "Improving mass spectrometry analysis of protein structures with arginine-selective chemical cross-linkers." Nat. Commun. 10:3911 (2019).
Kaake et al., "A new in vivo cross-linking mass spectrometry platform to define protein-protein interactions in living cells." Mol. Cell. Proteomics 13:3533-3543 (2014).
Kahraman et al., "Xwalk: Computing and visualizing distances in cross-linking experiments." Bioinformatics 27:2163-2164 (2011).
Kao et al., "Development of a novel cross-linking strategy for fast and accurate identification of crosslinked peptides of protein complexes." Mol. Cell. Proteomics 10:M110.002212 (2011).
Kao et al., "Mapping the structural topology of the yeast 19S proteasomal regulatory particle using chemical cross-linking and probabilistic modeling." Mol. Cell. Proteomics 11:1566-1577 (2012).
Kim et al., "Integrative structure and functional anatomy of a nuclear pore complex." Nature 555:475-482 (2018).
Leggett et al., "Multiple associated proteins regulate proteasome structure and function." Mol. Cell 10:495-507 (2002).
Leitner et al., "Probing native protein structures by chemical cross-linking, mass spectrometry, and bioinformatics." Mol. Cell. Proteomics 9:1634-1649 (2010).
Leitner et al. "Expanding the chemical cross-linking tool box by the use of multiple proteases and enrichment by size exclusion chromatography." Mol. Cell. Proteomics 11:M111.014126 (2012).
Leitner et al., "Chemical cross-linking/mass spectrometry targeting acidic residues in proteins and protein complexes." Proc. Natl. Acad. Sci. U. S. A. 111, 9455-9460 (2014).
Leitner et al., "Crosslinking and mass spectrometry: An integrated technology to understand the structure and function of molecular machines." Trends Biochem. Sci. 41:20-32 (2016).
Liang et al., "Chemical synthesis of diubiquitin based photo affinity probes for selectively profiling ubiquitin-binding proteins." Angew. Chem. Int. Ed. Engl. 56:2744-2748 (2017).
Liu et al., "Proteome-wide profiling of protein assemblies by cross-linking mass spectrometry." Nat. Methods 12:1179-1184 (2015).
Liu et al., "Photo caged quinone methide crosslinkers for light-controlled chemical crosslinking of protein-protein and protein-DNA complexes." Angew. Chem. Int. Ed. Engl. 58:18839-18843 (2019).
Ma et al., "Multidentate polymer coatings for compact and homogeneous quantum dots with efficient bioconjugation." J. Am. Chem. Soc. 138:3382-3394 (2016).
Mcdonald et al., "Altered domain structure of the prion protein caused by Cu(2+) binding and functionally relevant mutations: Analysis by cross-linking, MS/MS, and NMR." Structure 27:907-922.e905 (2019).
Mintseris et al., "High-density chemical cross-linking for modeling protein interactions." Proc. Natl. Acad. Sci. U.S.A. 117:93-102 (2020).
O'reilly et al., "Cross-linking mass spectrometry: Methods and applications in structural, molecular and systems biology." Nat. Struct. Mol. Biol. 25:1000-1008 (2018).
Piotrowski et al., "Extending the cross-linking/ mass spectrometry strategy: Facile incorporation of photo-activatable amino acids into the model protein calmodulin in Escherichia coli cells." Methods 89:121-127 (2015).
Schneider et al., "Protein tertiary structure by crosslinking/mass spectrometry." Trends Biochem. Sci.43:157-169 (2018).
Shi et al., "Structural characterization by cross-linking reveals the detailed architecture of a coatomer-related heptameric module from the nuclear pore complex." Mol. Cell. Proteomics 13:2927-2943 (2014).
Sinz, A., "Divide and conquer: Cleavable cross-linkers to study protein conformation and protein-protein interactions." Anal. Bioanal. Chem. 409:33-44 (2017).
Sinz, A., "Cross-linking/mass spectrometry for studying protein structures and protein-protein interactions: Where are we now and where should we go from here?" Angew. Chem. Int. Ed. Engl. 57:6390-6396 (2018).
Sun et al., "Simple light-triggered fluorescent labeling of silica nanoparticles for cellular imaging applications." Chemistry 23:13893-13896 (2017).
Unverdorben et al., "Deep classification of a large cryo-EM dataset defines the conformational landscape of the 26S proteasome." Proc. Natl. Acad. Sci. U.S.A. 111:5544-5549 (2014).
Wang et al., "Regulation of the 26S proteasome complex during oxidative stress." Sci. Signal. 3:ra88 (2010).
Wang et al., "The proteasome-interacting Ecm29 protein disassembles the 26S proteasome in response to oxidative stress." J. Biol. Chem. 292:16310-16320 (2017).
Wang et al., "Molecular details underlying dynamic structures and regulation of the human 26S proteasome." Mol. Cell. Proteomics 16:840-854 (2017).
Wehmer et al., "Recent advances in the structural biology of the 26S proteasome." Int. J. Biochem. Cell Biol.79,437-442 (2016).
Wisniewski et al., "Universal sample preparation method for proteome analysis." Nat. Methods 6:359362 (2009).
Yang et al., "Proximity-enhanced SuFEx chemical cross-linker for specific and multitargeting cross-linking mass spectrometry." Proc. Natl. Acad. Sci. U.S.A. 115:11162-11167 (2018).
Gutierrez et al., "Enabling Photoactivated Cross-Linking Mass Spectrometric Analysis of Protein Complexes by Novel MS-Cleavable Cross-Linkers." Mol Cell Proteomics 20:100084 (2021).
Yu et al., "Developing new isotope-coded mass spectrometry-cleavable cross-linkers for elucidating protein structures." Anal. Chem. 86:2099-2106 (2014).
Yu et al., "Gln 40 deamidation blocks structural reconfiguration and activation of SCF ubiquitin ligase complex by Nedd 8." Nat. Commun. 6:10053 (2015).
Yu et al., "Developing a multiplexed quantitative cross-linking mass spectrometry platform for comparative structural analysis of protein complexes." Anal. Chem. 88:10301-10308 (2016).
Yu et al., "Cross-linking mass spectrometry: An emerging technology for interactomics and structural biology." Anal. Chem. 90:144165 (2018).
Yu et al., "Probing H2O2-mediated structural dynamics of the human 26S proteasome using quantitative cross-linking mass spectrometry (QXL-MS)." Mol. Cell. Proteomics 18:954-967 (2019).
Yu et al., "Exploring spacer arm structures for designs of asymmetric sulfoxide-containing MS-cleavable cross-linkers." Anal. Chem. 92:60266033 (2020).
Zhang et al., "Carboxylate-selective chemical crosslinkers for mass spectrometric analysis of protein structures." Anal. Chem. 90:1195-1201 (2018).
Ziemianowicz et al., "Amino acid insertion frequencies arising from photoproducts generated using aliphatic diazirines." J. Am. Soc. Mass Spectrom. 28:2011-2021 (2017).
Ziemianowicz et al. "Photo-cross-linking mass spectrometry and integrative modeling enables rapid screening of antigen interactions involving bacterial transferrin receptors." J. Proteome Res.18:934-946 (2019).
Aguirre, Amanda L., Non-Final Office Action for U.S. Appl. No. 15/275,001. Mailed May 1, 2018.
Aguirre, Amanda L., Final Office Action for U.S. Appl. No. 15/275,001. Mailed Dec. 14, 2018.

(56) References Cited

OTHER PUBLICATIONS

Aguirre, Amanda L., Notice of Allowance for U.S. Appl. No. 15/275,001. Mailed Apr. 3, 2019.
Alber et al., "The molecular architecture of the nuclear pore complex." Nature 450(7170):695-701 (2007).
Algret et al., "Molecular architecture and function of the SEA complex, a modulator of the TORC1 pathway." Mol. Cell Proteomics 13(11):2855-2870 (2014).
Arkin et al., "Small-Molecule Inhibitors of Protein-Protein Interactions: Progressing toward the Reality." Chem Biol 21:1102-1114 (2014).
Bai et al., "In-depth Analysis of the Lid Subunits Assembly Mechanism in Mammals." Biomolecules 9(213):1-15 (May 31, 2019).
Birol et al., "Structural and biochemical characterization of the Cop9 signalosome CSN5/CSN6 heterodimer." PLoS One 9(8):e105688 (2014).
Bruce, J., "In vivo protein complex topologies: Sights through a crosslinking lens." Proteomics 12:1565-1575 (2012).
Buchan et al., "Scalable web services for the PSIPRED Protein Analysis Workbench." Nucleic Acids Res 41:W349-357 (2013).
Cavadini et al., "Cullin-RING ubiquitin E3 ligase regulation by the COP9 signalosome." Nature 531:598-603 + Suppl (Mar. 31, 31 2016).
Chakrabarty et al., "Differential Tandem Mass Spectrometry-Based Cross-Linker: A New Approach for High Confidence in Identifying Protein Cross-Linking." Anal Chem 88:10215-10222 (2016).
Chavez et al., "A General Method for Targeted Quantitative Cross-Linking Mass Spectrometry." PLoS One 11(12):e0167547 (2016).
Cope et al., "Role of Predicted Metalloprotease Motif of Jab1/Csn5 in Cleavage of Nedd8 from Cul1." Science 298 (5593):608-611 (2002).
Cope et al., "COP9 signalosome: a multifunctional regulator of SCF and other cullin-based ubiquitin ligases." Cell 114(6):663-671 (2003).
Cope et al., "Targeted silencing of Jab1/Csn5 in human cells downregulates SCF activity through reduction of F-box protein levels." BMC Biochemistry 7:1 (2006).
Deshaies et al., "RING Domain E3 Ubiquitin Ligases." Annu. Rev. Biochem. 78:399-434 (2009).
Dubiel et al., "Diversity of COP9 signalosome structures and functional consequences." FEBS Letters 589:2507-2513 (2015).
Emberley et al., "Deconjugation of Nedd8 from Cul1 is Directly Regulated by Skp1-F-box and Substrate, and the COP9 Signalosome Inhibits Deneddylated SCF by a Noncatalytic Mechanism." The Journal of Biological Chemistry 287(35):29679-29689 (2012).
Enchev et al., "Structural Basis for a Reciprocal Regulation between SCF and CSN." Cell Reports 2:616-627 (2012).
Ezberger et al., "Molecular Architecture of the 40S,eIF1,eIF3 Translation Initiation Complex." Cell 158:1123-1135 (2014).
Faull et al., "Structural basis of Cullin 2 RING E3 ligase regulation by the COP9 signalosome." Nature Communications 10:3814 (Aug. 23, 2019).
Fernandez-Martinez et al., "Structure and Function of the Nuclear Pore Complex Cytoplasmic mRNA Export Platform." Cell 167(5):1215-1228 (2016).
Fischer et al., "The Molecular Basis of CRL4DDB2/CSA Ubiquitin Ligase Architecture, Targeting, and Activation." Cell 147:1024-1039 (2011).
Fischer et al., "Structure of the DDB1-CRBN E3 ubiquitin ligase in complex with thalidomide." Nature 512(7512):49-53 (2014).
Fuzesi-Levi et al., "CSNAP, the smallest CSN subunit, modulates proteostasis through cullin-RING ubiquitin ligases." bioRxiv preprint (Oct. 2, 2018).
Guela et al., "Structure-based Analysis of VDAC1 Protein Defining Oligomer Contact Sites." The Journal of Biological Chemistry 287(3):2179-2190 (2012).
Gunnoo et al., "Chemical Protein Modification through Cysteine." Chembiochem 17:529-553 (2016).
Heusel et al., "Complex-centric proteome profiling by SEC-SWATH-MS." Molecular Systems Biology 15: e8438 | (Jan. 14, 2019).
Jia et al., "SCF E3 Ubiquitin Ligases as Anticancer Targets." Curr Cancer Drug Targets 11(3): 347-356 (2011).
Kao et al., "Development of a Novel Cross-linking Strategy for Fast and Accurate Identification of Cross-linked Peptides of Protein Complexes." Molecular & Cellular Proteomics 11(12):1566-1577 (2012).
Knepp et al., "Rhodopsin forms a dimer with cytoplasmic helix 8 contacts in native membranes." Biochemistry 51 (9):1819-1821 (2012).
Lee et al., "Roles of COP9 signalosome in cancer." Cell Cycle 10(18):3057-3066 (2011).
Lee et al., "The Steady-State Repertoire of Human SCF Ubiquitin Ligase Complexes Does Not Require Ongoing Nedd8 Conjugation." Molecular & Cellular Proteomics 10(5):M110.006460-1 (2011).
Lee et al., "Molecular targeting of CSN5 in human hepatocellular carcinoma: a mechanism of therapeutic response." Oncogene 30(40):4175-4184 (2011).
Leitner et al., "Lysine-specific chemical cross-linking of protein complexes and identification of cross-linking sites using LC-MS/MS and the xQuest/xProphet software pipeline." Nature Protocols 9(1):120-137 (2013).
Leitner et al., "Cross-linking and other structural proteomics techniques: how chemistry is enabling mass spectrometry applications in structural biology." Chem. Sci. 7:4792-4803 (2016).
Lingaraju et al., "Crystal structure of the human COP9 signalosome." Nature 512:161-165 + Suppl (Aug. 14, 2014).
Liu et al., "Dissecting Fission Yeast Shelterin Interactions via MICro-MS Links Disruption of Shelterin Bridge to Tumorigenesis." Cell Reports 12, 2169-2180 (2015).
Liu et al., "The interactome of intact mitochondria by cross-linking mass spectrometry provides evidence for coexisting respiratory supercomplexes." Molecular & Cellular Proteomics 17(2):15473 (2017).
Liu et al., "Optimized fragmentation schemes and data analysis strategies for proteome-wide cross-link identification." Nature Communications 8:15473 (2017).
Lopiccolo et al., "Assembly and Molecular Architecture of the Phosphoinositide 3-Kinase p85a Homodimer." The Journal of Biological Chemistry 290(51):30390-30405 (2015).
Lu et al., "Ionic Reagent for Controlling the Gas-Phase Fragmentation Reactions of Cross-Linked Peptides." Anal. Chem. 80:9279-9287 (2008).
Luo et al., "An Integrated Chemical Cross-linking and Mass Spectrometry Approach to Study Protein Complex Architecture and Function." Molecular & Cellular Proteomics 11(2):M111.008318 (2012).
Luo et al., "Architecture of the human and yeast general transcription and DNA repair factor TFIIH." Mol Cell. 59(5):794-806 (2015).
Mosadeghi et al., "Structural and kinetic analysis of the COP9-Signalosome activation and the cullin-RING ubiquitin ligase deneddylation cycle." eLife 5:e12102 (2016).
Muller et al., "Cleavable Cross-Linker for Protein Structure Analysis: Reliable Identification of Cross-Linking Products by Tandem MS." Anal Chem 82:6958-6968 (2010).
Negin, Russel Scott, Non-Final Office Action for U.S. Appl. No. 13/471,365. Mailed Feb. 24, 2015.
Negin, Russel Scott, Notice of Allowance for U.S. Appl. No. 13/471,365. Mailed Aug. 3, 2015.
Negin, Russel Scott, Non-Final Office Action for U.S. Appl. No. 14/927,332. Mailed Oct. 29, 2015.

\* cited by examiner

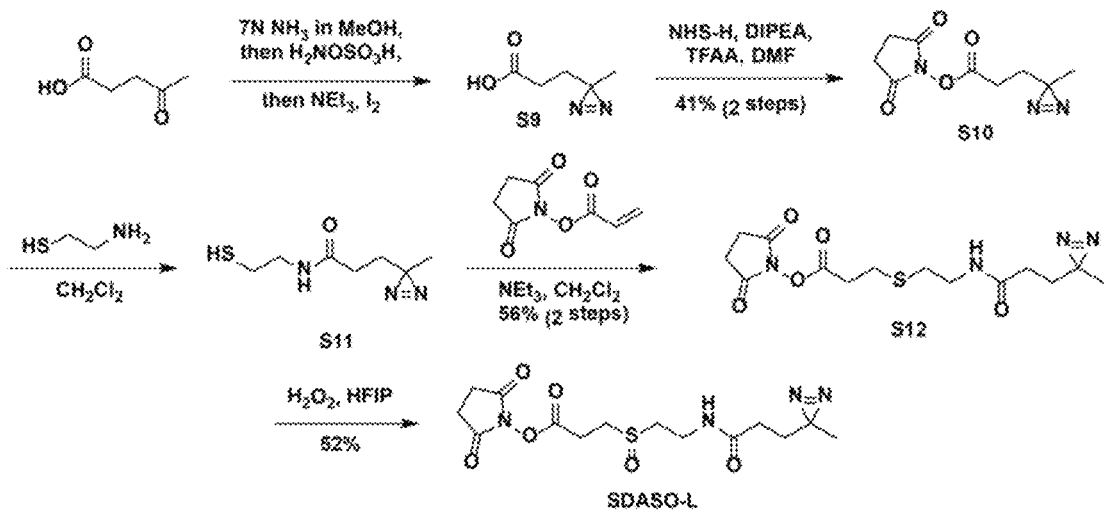
FIG. 1C
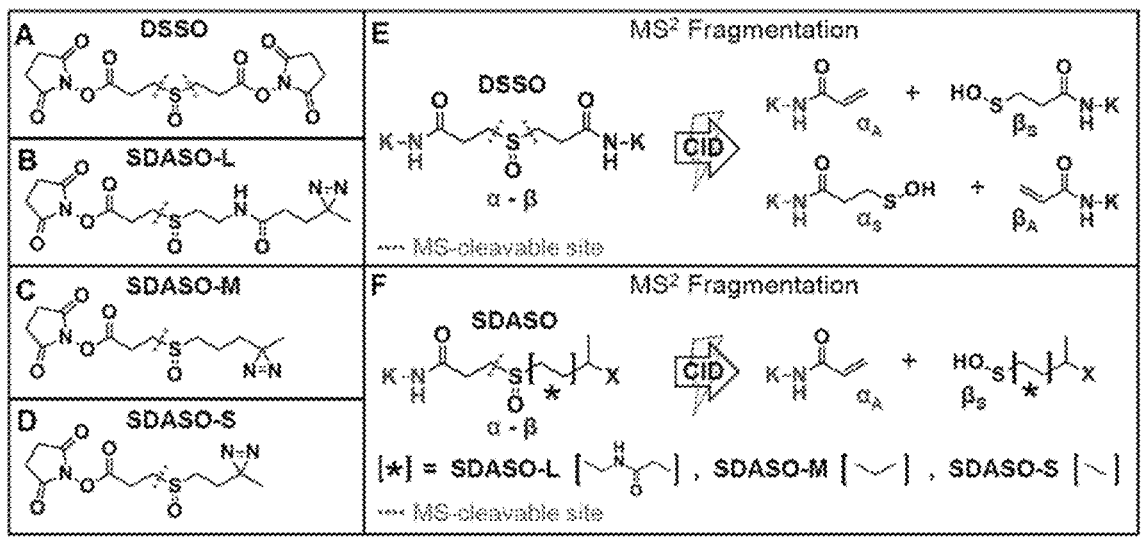
FIG. 2A-F

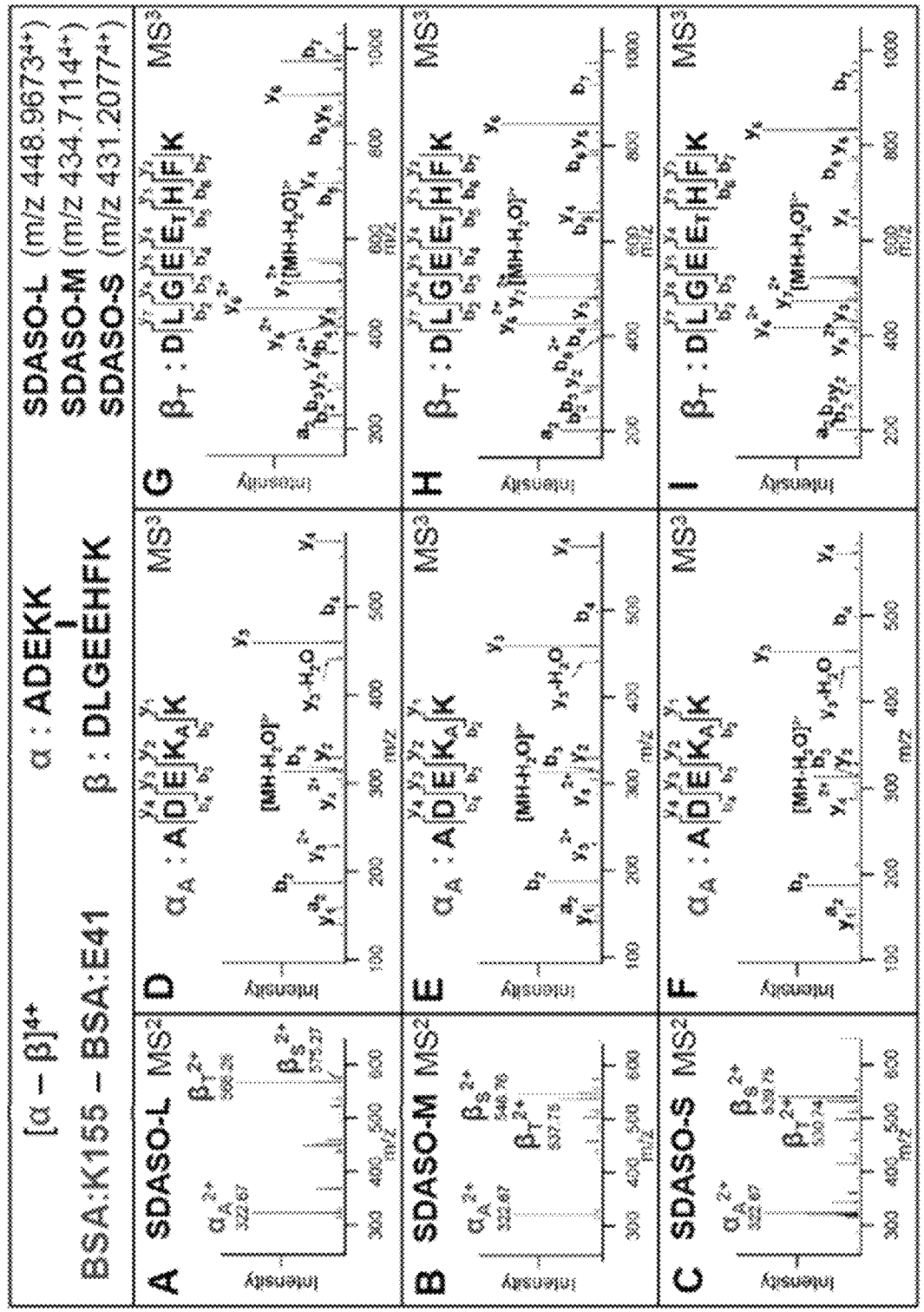
FIG. 3.4-1

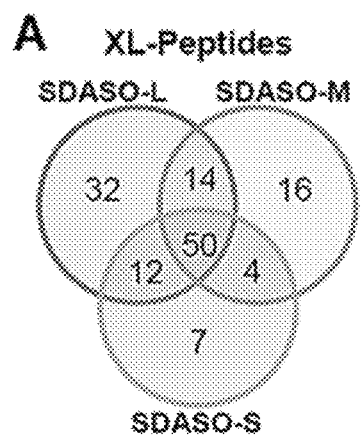
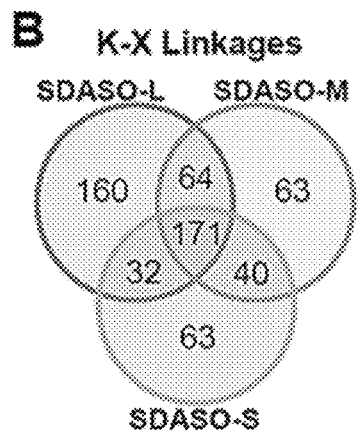
FIG. 4A
FIG. 4B
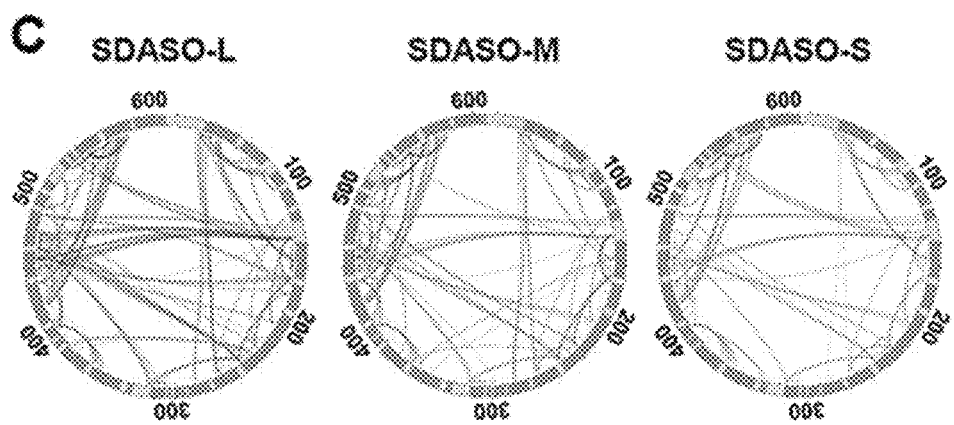
FIG. 4C
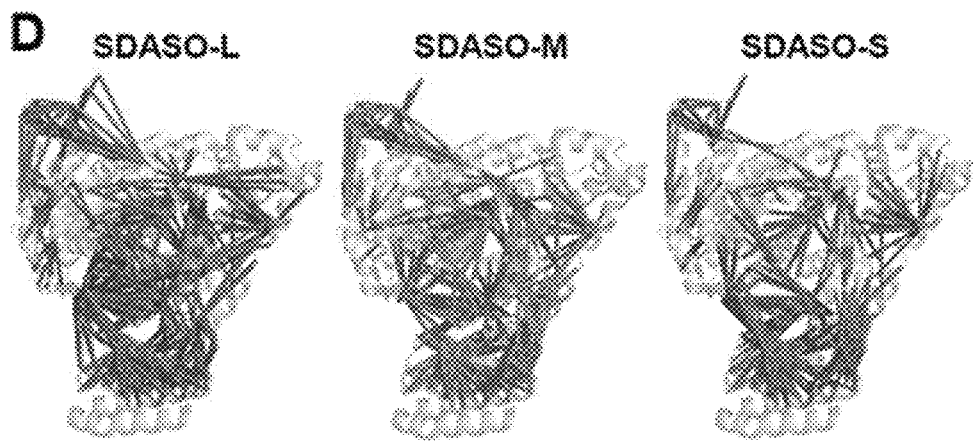
FIG. 4D

A    2-D XL-Maps

B    19S RP

••• 19S Base-Base    ••• 19S Lid-Base    ••• 19S Lid-Lid    ⋯ 20S -20S

C    20S CP

••• 19S Base-Base    ••• 19S Lid-Base    ••• 19S Lid-Lid    ⋯ 20S -20S

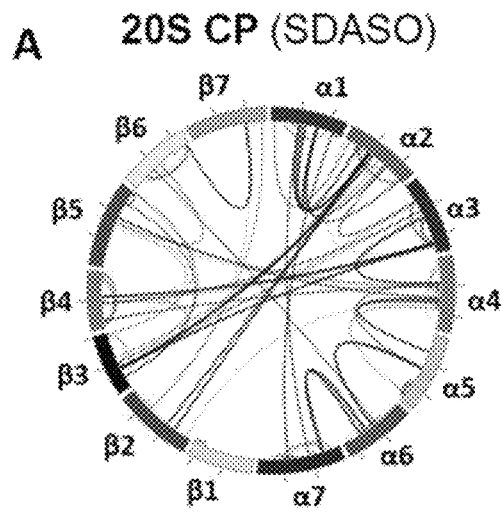
FIG. 8A
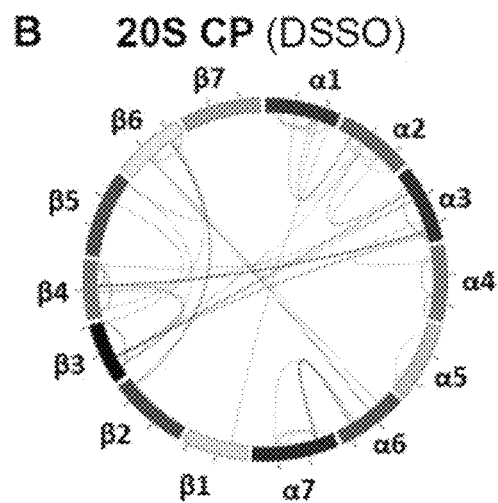
FIG. 8B
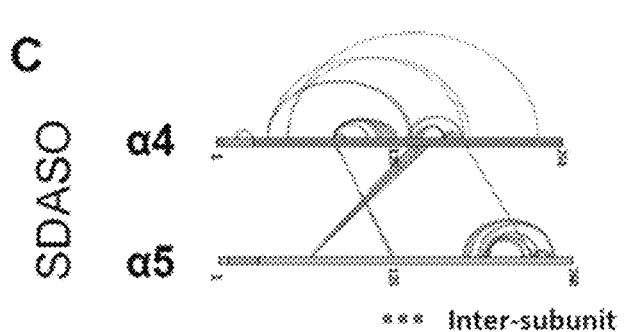
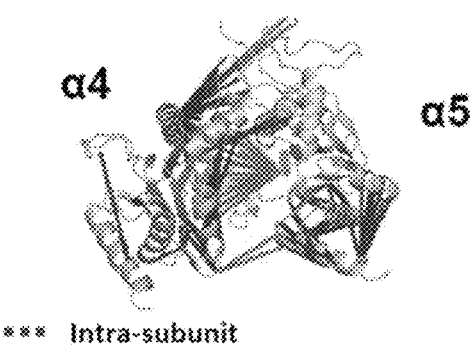
FIG. 8C
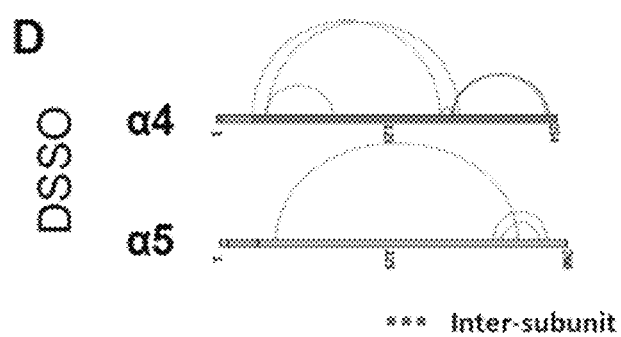
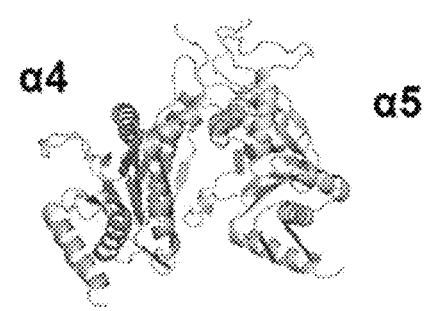
FIG. 8D

A Sulfenic → Thiol conversion

B DN α (NHS ester hydrolyzed) fragmentation

C DN α (diazirine hydrolyzed) fragmentation

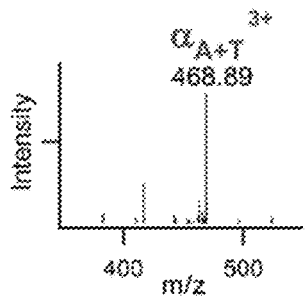
FIG. 11A
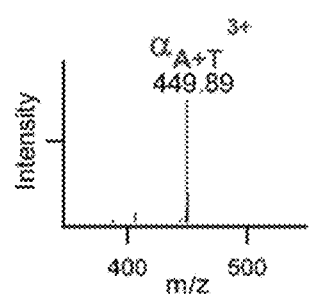
FIG. 11B
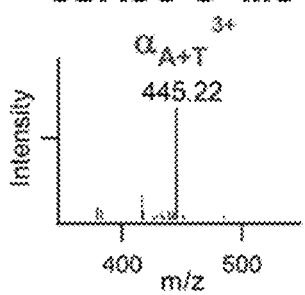
FIG. 11C
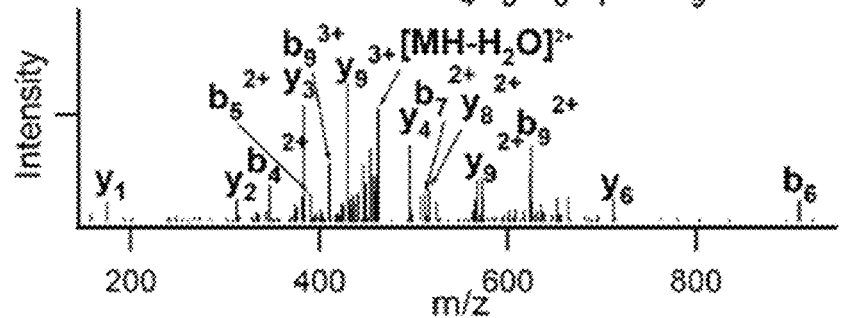
FIG. 11D
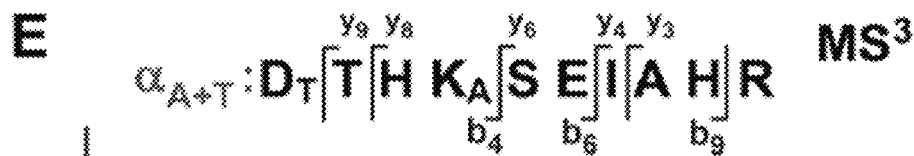
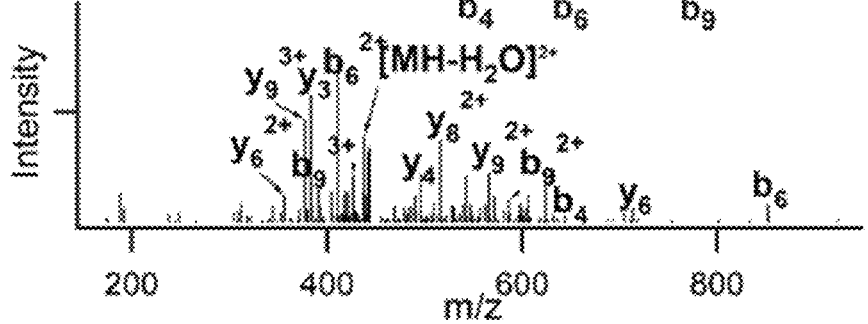
FIG. 11E BSA XL-Peptide Triplicate Reproducibility BSA K-X Linkage Triplicate Reproducibility

BSA 2-D XL-Maps

A DSSO

B DHSO

C BMSO

D SDASO (all)

26S XL-Peptide Triplicate Reproducibility

K-X Linkage Triplicate Reproducibility

26S Comparison of SDASO XL-Peptide Coverage

Reproducibility of Chymotrypsin Digested SDASO-L XL 26S

A XL-Peptide Triplicate

B K-X Linkage Triplicate

Comparison of Chymotrypsin vs. Trypsin Digested SDASO-L XL 26S

C XL-Peptides

D K-X Linkages

A s1 (PDB:4CR2)

B s2 (PDB:4CR3)

26S DSSO XL Reproducibility
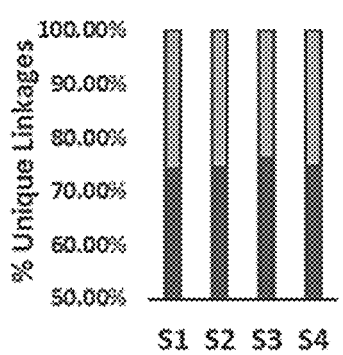
FIG. 21A
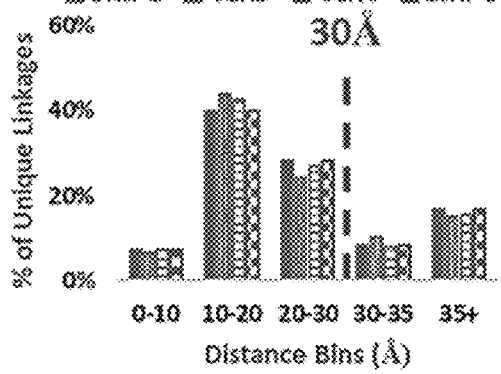
FIG. 21B
DSSO
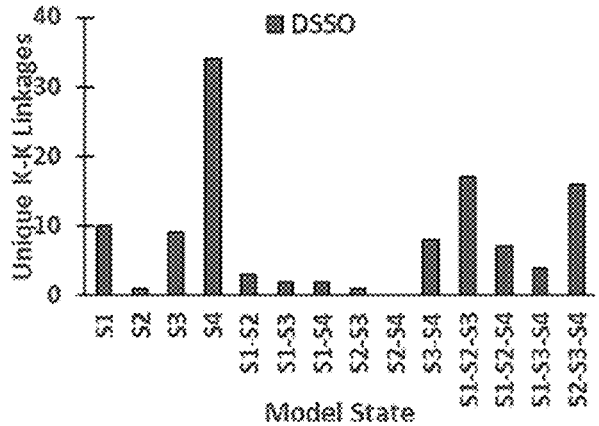
FIG. 22A
FIG. 22B
FIG. 22C

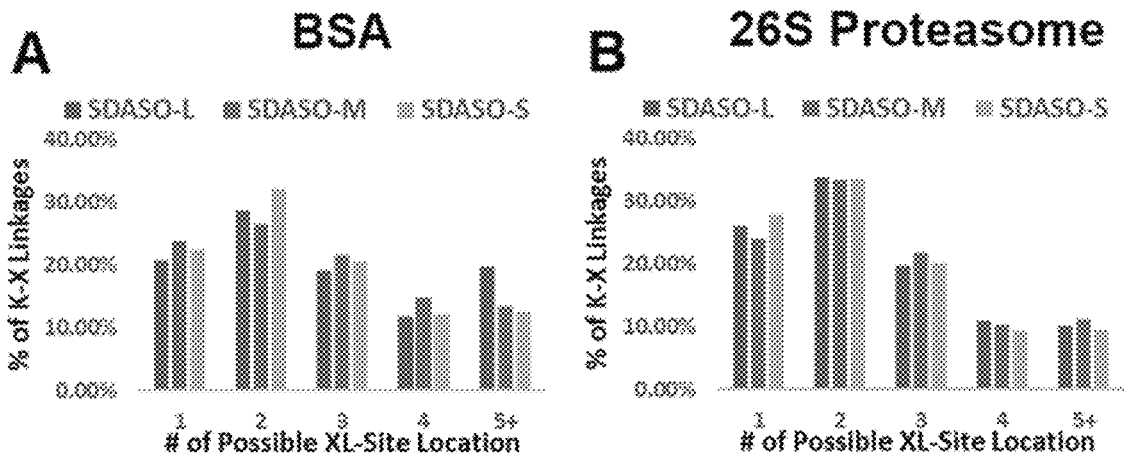
FIG. 25A
FIG. 25B
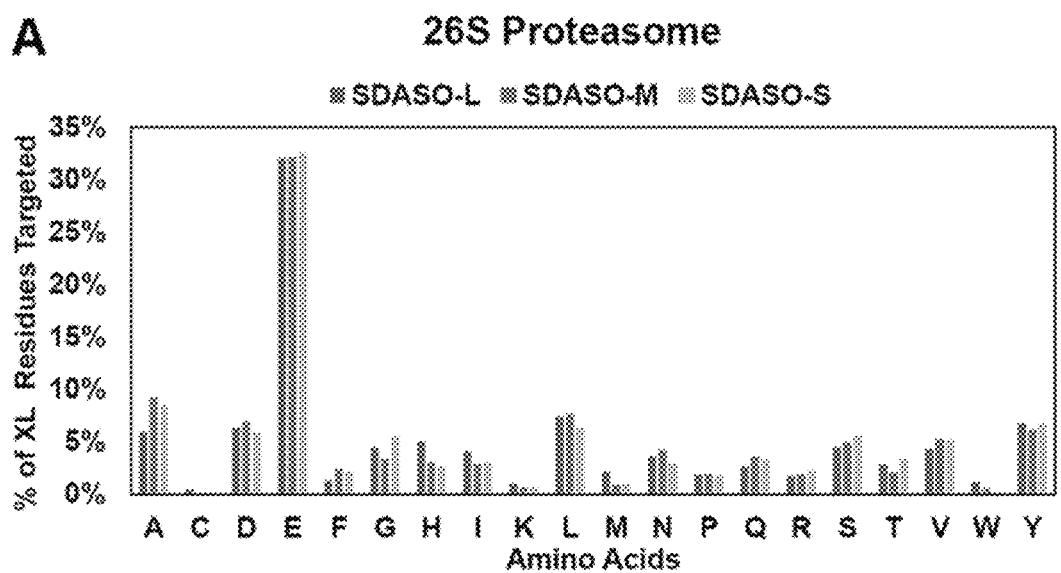
FIG. 26A

SEQUENCE LISTING

```
<160> NUMBER OF SEQ ID NOS: 5

<210> SEQ ID NO 1
<211> LENGTH: 5
<212> TYPE: PRT
<213> ORGANISM: Artificial Sequence
<220> FEATURE:
<223> OTHER INFORMATION: BSA cross-linked peptide 152-156

<400> SEQUENCE: 1

Ala Asp Glu Lys Lys
1               5

<210> SEQ ID NO 2
<211> LENGTH: 8
<212> TYPE: PRT
<213> ORGANISM: Artificial Sequence
<220> FEATURE:
<223> OTHER INFORMATION: BSA inter-linked peptide 37-44
```

```
<400> SEQUENCE: 2

Asp Leu Gly Glu Glu His Phe Lys
1               5

<210> SEQ ID NO 3
<211> LENGTH: 10
<212> TYPE: PRT
<213> ORGANISM: Artificial Sequence
<220> FEATURE:
<223> OTHER INFORMATION: Diazirine dead-end modified peptide of BSA
      35-44

<400> SEQUENCE: 3

Phe Lys Asp Leu Gly Glu Glu His Phe Lys
1               5                   10

<210> SEQ ID NO 4
<211> LENGTH: 16
<212> TYPE: PRT
<213> ORGANISM: Artificial Sequence
<220> FEATURE:
<223> OTHER INFORMATION: NHS ester dead-end modified peptide of BSA
      168-183

<400> SEQUENCE: 4

Arg His Pro Tyr Phe Tyr Ala Pro Glu Leu Leu Tyr Tyr Ala Asn Lys
1               5                   10                  15

<210> SEQ ID NO 5
<211> LENGTH: 10
<212> TYPE: PRT
<213> ORGANISM: Artificial Sequence
<220> FEATURE:
<223> OTHER INFORMATION: BSA interlinked peptide 25-34

<400> SEQUENCE: 5

Asp Thr His Lys Ser Glu Ile Ala His Arg
1               5                   10
```

MASS SPECTROMETRY CLEAVABLE HETEROBIFUNCTIONAL PHOTOACTIVATED CROSS-LINKERS

CROSS REFERENCE TO RELATED APPLICATIONS

This application claims priority under 35 U.S.C. § 119 from Provisional Application Ser. No. 63/143,344, filed Feb. 24, 2021 the disclosure of which is incorporated herein by reference.

STATEMENT OF GOVERNMENT SUPPORT

This invention was made with Government support under Grant Nos. R01GM074830 and R01GM130144, awarded by the National Institute of General Medicine Sciences and Grant No. CHE-1807612, awarded by the National Science Foundation. The Government has certain rights in the invention.

SEQUENCE LISTING

The instant application contains a Sequence Listing which has been submitted electronically in ASCII format and is hereby incorporated by reference in its entirety. Said ASCII copy, created on Feb. 24, 2022, is named Sequence_ST25.txt and is 1,436 bytes in size.

TECHNICAL FIELD

The disclosure provides for mass spectrometry (MS)-cleavable heterobifunctional photoactivated cross-linkers, and uses thereof, including for studying protein-protein interactions.

BACKGROUND

Protein-protein interactions (PPIs) are fundamental to the assembly, structure and function of protein complexes, which in turn exert control over a diverse array of biological processes integral to cell biology. Cross-linking mass spectrometry (XL-MS) is a unique structural tool capable of studying PPIs due to its ability to simultaneously capture and identify PPIs with interaction contacts from native cellular environment.

SUMMARY

Cross-linking mass spectrometry (XL-MS) is a powerful tool for studying protein-protein interactions and elucidating architectures of protein complexes. While residue-specific XL-MS studies have been very successful, accessibility of interaction regions non-targetable by specific chemistries remain difficult. Photochemistry has shown great potential in capturing those regions due to nonspecific reactivity, but low yields and high complexities of photo-crosslinked products have hindered their identification, limiting current studies predominantly to single proteins. Provided herein is the development of MS-cleavable heterobifunctional cross-linkers (e.g., Succinimidyl diazirine sulfoxide (SDASO)). The MS-cleavable heterobifunctional cross-linkers of the disclosure, provide for the fast and accurate identification of photo-crosslinked peptides by MS$^n$. In the studies presented herein, MS-cleavable heterobifunctional cross-linkers allowed for the analysis of the yeast 26S proteasome using an MS$^n$-based workflow, thus demonstrating the feasibility of photo-crosslinking large protein complexes. Comparative analyses have revealed that MS-cleavable heterobifunctional cross-linkers of the disclosure are robust and capture interactions complementary to residue-specific reagents, which enables their use in complex XL-MS studies.

In a particular embodiment, the disclosure provides a mass spectrometry (MS)-cleavable heterobifunctional photoactivated cross-linker comprising: a photo-activatable reactive chemical group; a N-Hydroxysuccinimide (NHS) group, a hydrazine group, or a maleimide group; a sulfoxide group; and a MS-cleavable bond; wherein the MS-cleavable cross-linker is configured for mapping intra-protein interactions in a protein, or inter-protein interactions in a protein complex, or combinations thereof. In a further embodiment, the photo-activatable reactive chemical group is a group selected from an optionally substituted aryl azide, an optionally substituted azido-methyl-coumarin, an optionally substituted benzophenone, an optionally substituted anthraquinone, am optionally substituted diazo compound, an optionally substituted diazirine, and an optionally substituted psoralen derivative. In another or a further embodiment herein, the photo-activatable reactive chemical group is an optionally substituted diazirine group that forms a carbene and/or a diazo intermediate when exposed to ultraviolet light. In another or a further embodiment herein, the MS-cleavable bond is a C—S bond adjacent to the at least one sulfoxide group. In another or a further embodiment herein, the mass spectrometry (MS)-cleavable heterobifunctional photoactivated cross-linker further comprises an asymmetric spacer arm, wherein one end of the asymmetric spacer arm comprises the NHS group, the hydrazine group, or the maleimide group, and wherein the other end of the asymmetric spacer arm comprises the photo-activatable reactive chemical group; and wherein the sulfoxide group is centrally located on the asymmetric spacer arm. In another or a further embodiment herein, the MS-cleavable heterobifunctional photoactivated cross-linker has the structure of Formula (I):

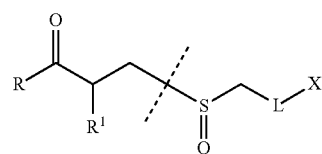

Formula I wherein, R is selected from:

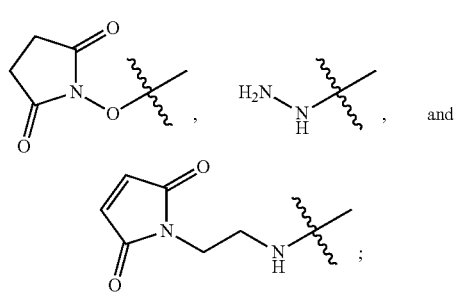

$R^1$ is H or an optionally substituted $(C_1\text{-}C_6)$alkyl; L is selected from an optionally substituted $(C_1\text{-}C_6)$alkyl, $R^2$—NH—C(O)—$R^3$, and $R^2$—C(O)—NH—$R^3$; $R^2$ and $R^3$ are independently selected $(C_1\text{-}C_6)$alkyls; X is a photo-activatable reactive chemical group; and wherein the dashed line indicates a MS-cleavable bond. In another or a further embodiment herein, the MS-cleavable heterobifunctional photoactivated cross-linker has the structure of Formula I(a):

Formula I(a)

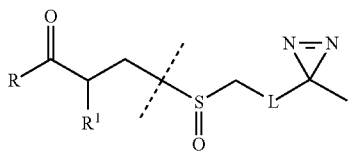

wherein, R is selected from:

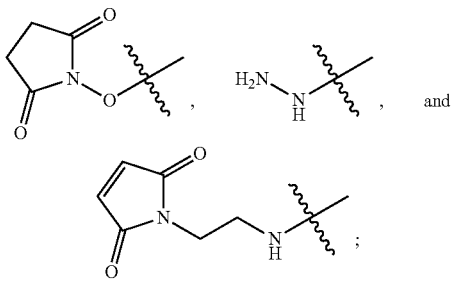

$R^1$ is H or an optionally substituted $(C_1-C_6)$alkyl; L is selected from an optionally substituted $(C_1-C_6)$alkyl, $R^2$—NH—C(O)—$R^3$, and $R^2$—C(O)—NH—$R^3$; $R^2$ and $R^3$ are independently selected $(C_1-C_6)$alkyls; and wherein the dashed line indicates a MS-cleavable bond. In another or a further embodiment herein, the MS-cleavable heterobifunctional photoactivated cross-linker has the structure of Formula I(b):

Formula I(b)

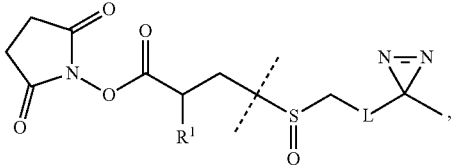

wherein, $R^1$ is H or an optionally substituted $(C_1-C_6)$ alkyl; L is selected from an optionally substituted $(C_1-C_6)$alkyl, $R^2$—NH—C(O)—$R^3$, and $R^2$—C(O)—NH—$R^3$; $R^2$ and $R^3$ are independently selected $(C_1-C_6)$alkyls; and wherein the dashed line indicates a MS-cleavable bond. In another or a further embodiment herein, the MS-cleavable heterobifunctional photoactivated cross-linker has a structure selected from:

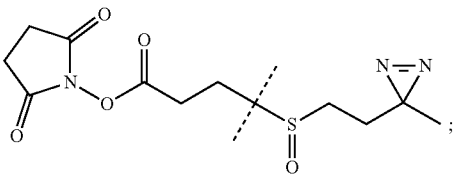

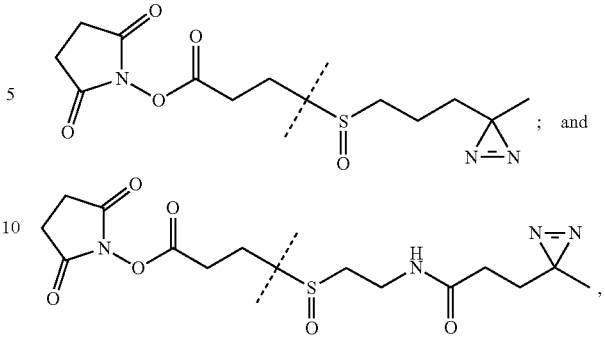

wherein the dashed line indicates a MS-cleavable bond.

In a certain embodiment, the disclosure also provides a method for mapping intra-protein interactions in a protein, inter-protein interactions in a protein complex, or combinations thereof, the method comprising: contacting the protein and/or the protein complex with the MS-cleavable heterobifunctional photoactivated cross-linker of claim 1 to form a first linked product; exposing the first linked product to ultraviolet light to form a crosslinked product; digesting the crosslinked product with one or more enzymes to form peptide fragments; identifying the one or more peptide fragments using tandem mass spectrometry ($MS^n$), thereby mapping intra-protein interactions in the protein and/or inter-protein interactions in the protein complex. In a further embodiment herein, the protein and/or the protein complex are contacted with the MS-cleavable heterobifunctional photoactivated cross-linker at a molar ratio of 1:5 to 1:500 (protein:crosslinker). In another or a further embodiment herein, the first linked product is exposed to ultraviolet light at a wavelength of 250 nm to 400 nm for at least 1 minute at 0° C. to 15° C. In another or a further embodiment herein, the crosslinked product is reduced/alkylated and digested with Lys-C/trypsin or chymotrypsin to form peptide fragments. In another or a further embodiment herein, prior to the use of $MS^n$, the peptide fragments are enriched by using size-exclusion chromatography.

In a certain embodiment, the disclosure further provides a method for cross-linking mass spectrometry (XL-MS) for identifying one or more cross-linked peptides, the method comprising: contacting the protein and/or the protein complex with the MS-cleavable heterobifunctional photoactivated cross-linker of claim 1 to form a first linked product; exposing the first linked product to ultraviolet light to form a crosslinked product; digesting the crosslinked product with one or more enzymes to form peptide fragments, wherein the peptide fragments are chemically cross-linked to the MS-cleavable heterobifunctional photoactivated cross-linker; performing a liquid chromatography-tandem mass spectrometry ($LC-MS^n$) analysis on the one or more cross-linked peptides, wherein the $LC-MS^n$ analysis comprises: detecting the one or more cross-linked peptides by $MS^1$ analysis; selecting the one or more cross-linked peptides detected by $MS^1$ for $MS^2$ analysis; selectively fragmenting the at least one CID cleavable bond and separating the one or more cross-linked peptides during $MS^2$ analysis; sequencing the one or more cross-linked peptides separated during $MS^2$ analysis by $MS^3$ analysis; and integrating data obtained during $MS^1$, $MS^2$ and $MS^3$ analyses to identify the one or more cross-linked peptides. In a further embodiment, the protein and/or the protein complex are contacted with the MS-cleavable heterobifunctional photoactivated crosslinker in a light excluded environment. In another or a further embodiment herein, the protein and/or the protein complex are contacted with the MS-cleavable heterobifunctional photoactivated cross-linker at a molar ratio of 1:5 to 1:500 (protein:crosslinker). In another or a further embodiment herein, the first linked product is exposed to ultraviolet light at a wavelength of 250 nm to 400 nm for at least 1 minute at 0° C. to 15° C. In another or a further embodiment herein, the crosslinked product is reduced/alkylated and digested with Lys-C/trypsin or chymotrypsin to form cross-linked peptides. In another or a further embodiment herein, prior to LC-MS$^n$, the cross-linked peptides are enriched by using size-exclusion chromatography.

In a certain embodiment, the disclosure provides a composition, a method or a kit as substantially described herein.

DESCRIPTION OF DRAWINGS

FIG. 1A-C provides the syntheses pathways of the SDASO linkers: (A) SDASO-S. (B) SDASO-M. (C) SDASO-L.

FIG. 2A-F presents MS$^2$ fragmentation characteristics of sulfoxide-containing MS-cleavable cross-linkers. Molecular structures of (A) DSSO, (B) SDASO-L, (C) SDASO-M and (D) SDASO-S. (E) MS$^2$ fragmentation of a DSSO inter-linked peptide [α-β], representing the characteristics of sulfoxide-containing MS-cleavable cross-linkers with symmetric structures. CID cleavage of either one of the two MS-cleavable C—S bonds physically separate α and β peptide constituents into single peptide chains modified with either alkene, A (i.e., $α_A$, $β_A$) or sulfenic acid (S) (i.e., $α_S$, $β_S$) moieties, the two complementary remnants of the cross-linker after cleavage. (F) MS$^2$ fragmentation of a SDASO inter-linked peptide [α-β], signifying the characteristics of sulfoxide-containing MS-cleavable heterobifunctional NHS-diazirine cross-linkers, namely, SDASO-L, -M and -S linkers (B-D). CID cleavage of the single MS-cleavable C—S bond in SDASO cross-linked peptides produces only one pair of cross-link fragment ions, $α_A/β_S$, in which α peptide is labeled by NHS ester, and β peptide is labeled by diazirine.

FIG. 3A-I provides MS$^n$ analyses of representative SDASO-L, SDASO-M and SDASO-S inter-linked peptides of BSA. MS$^1$ analyses determined the parent masses of the same peptides (α-β) cross-linked by SDASO-L (m/z 448.9673$^{4+}$), SDASO-M (m/z 434.7114$^{4+}$), SDASO-S (m/z 431.2077$^{4+}$), respectively. MS$^2$ spectra of the (A) SDASO-L, (B) SDASO-M, and (C) SDASO-S cross-linked peptides. MS$^3$ spectra of the SDASO-L MS$^2$ fragment ions: (D) $α_A$ (m/z 322.67$^{2+}$) and (E) $β_T$ (m/z 556.26$^{2+}$), the SDASO-M MS$^2$ fragment ions: (F) $α_A$ (m/z 322.67$^{2+}$) and (G) $β_T$ (m/z 537.75$^{2+}$), and the SDASO-S MS$^2$ fragment ions: (H) $α_A$ (m/z 322.67$^{2+}$) and (I) $β_T$ (m/z 530.74$^{2+}$). The selected BSA cross-linked peptide was identified as $^{152}$ADEKK$^{156}$ (SEQ ID NO:1) inter-linked to $^{37}$DLGEEHFK$^{44}$ (SEQ ID NO:2) by MS$^3$ analyses (A-I), in which the K155-E41 linkage was determined.

FIG. 4A-F provides comparisons of BSA cross-link data by the three SDASO linkers. Comparisons of (A) cross-linked peptide sequences and (B) residue-to-residue linkages of BSA obtained from SDASO-L, -M, and -S XL-MS experiments. (C) Circular 2-D SDASO XL-maps of BSA based on SDASO-L, -M and S cross-links respectively. Helical secondary structures are designated by dark gray regions. (D) 3-D SDASO XL-maps of BSA on its crystal structure (PDB: 4F5S) based on SDASO-L, SDASO-M, and SDASO-S cross-links, respectively. (E) 3-D XL-map of BSA (PDB: 4F5S) generated based on the combined cross-links from DSSO (medium grey)+DHSO (light gray)+BMSO (dark gray) XL-MS experiments. (F) Distance distribution plots of the identified SDASO cross-links to the BSA structure (PDB: 4F5S) (SDASO-L: ≤35 Å, SDASO-M and -S: ≤30 Å). Note: Colors schemes represent specific linkers: SDASO-L: light green, SDASO-M: light blue, and SDASO-S: gold orange.

Figure 1A:
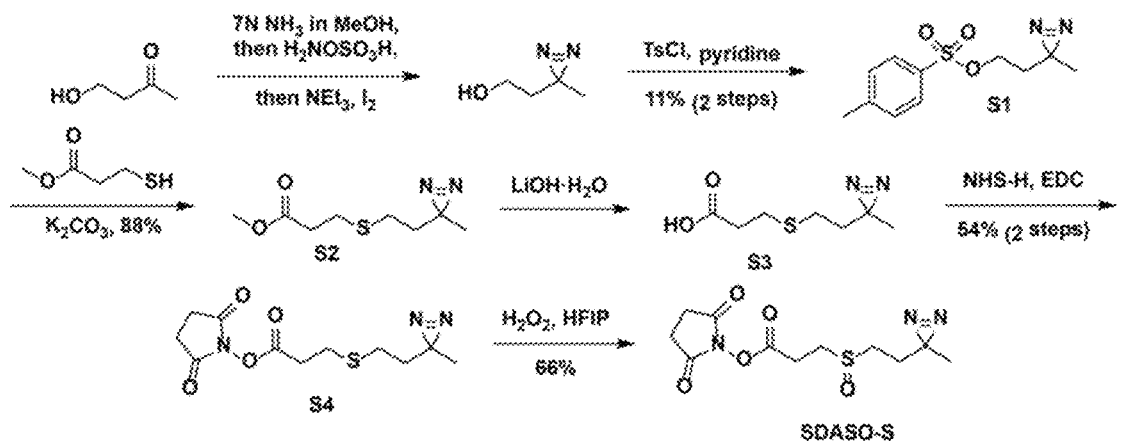

FIG. 8A-F SDASO and DSSO XL-maps of the 20S CP. (A) Circular 2-D SDASO XL-map of the 20S CP. (B) Circular 2-D DSSO XL-map of the 20S CP. 2-D and 3-D XL-maps of α4-α5 interaction based on (C) SDASO and (D) DSSO cross-links. 2-D and 3-D XL-maps of α1-α2 interaction based on (E) SDASO and (F) DSSO cross-links. Note: high-resolution structure of the yeast 26S proteasome (PDB: 4CR2 (s1)) was used here. For 2-D XL-maps, inter-subunit linkages are colored black and intra-subunit linkages are colored gray. For 3-D XL-maps, inter-subunit linkages are shown in light-medium gray, while intra-subunit linkages are medium gray.

FIG. 9A-D presents the $MS^2$ fragmentation characteristics of SDASO linkers. (A) The conversion of sulfenic acid modified fragment αS to unsaturated thiol modified fragment $α_T$. During $MS^2$-CID analysis, the sulfenic acid moiety loses water (—$H_2O$) to form the more stable unsaturated thiol (T) moiety, which is often detected as the dominant form. (b-c) Predicted $MS^2$ fragmentation of SDASO-L, -M and -S dead-end modified peptides ($α_{DN}$). Two types of dead-end products can be formed for SDASO linkers, depending on which reactive group is hydrolyzed. The products (αDN) with a hydrolyzed NHS ester (B) or a hydrolyzed diazirine end (C) are illustrated. During $MS^2$-CID, the former only generates a thiol modified fragment $α_T$, whereas the latter only produces an alkene modified fragment $α_A$. (D) Predicted $MS^2$ fragmentation of SDASO-L, -M and -S intra-linked peptides ($α_{intra}$), yielding one fragment containing both alkene and thiol modifications ($α_A$+T).

FIG. 10A-L presents $MS^n$ analyses of representative SDASO-L, -M and -S dead-end modified peptides of BSA. $MS^2$ spectra of the diazirine dead-end modified peptides αDN: (A) SDASO-L: m/z $499.5673^{3+}$, (B) SDASO-M: m/z $480.2411^{3+}$, (C) SDASO-S: m/z $475.8982^{3+}$. $MS^2$ spectra of the NHS ester dead-end modified peptides αDN of BSA: (D) SDASO-L: m/z $765.0415^{3+}$, (E) SDASO-M: m/z $745.7052^{3+}$; (F) SDASO-S: m/z $741.0337^{3+}$. $MS^3$ spectra of (G) $α_A$ (m/z $652.32^{2+}$) detected in (A) and (J) $α_T$ (m/z $734.70^{2+}$) detected in (D) from SDASO-L dead-end modified peptides. $MS^3$ spectra of (H) αA (m/z $652.32^{2+}$) detected in (B), and αT (m/z $715.69^{2+}$) detected in (E) from SDASO-M dead-end modified peptides. $MS^3$ spectra of (H) $α_A$ (m/z $652.32^{2+}$) detected in (C), and αT (m/z $711.02^{2+}$) detected in (F) from SDASO-S dead-end modified peptides. The diazirine dead-end modified peptides of BSA were determined as $^{35}$FKDLGEEHFK$^{44}$ (SEQ ID NO:3), in which K36 was modified for all SDASO linkers (G-I). The NHS ester dead-end modified peptides of BSA were identified as $^{168}$RHPYFYAPELLYYANK$^{183}$ (SEQ ID NO:4) (J), in which E176 was modified for SDASO-L, and P175 or E176 were modified for SDASO-M and SDASO-S (K, L).

FIG. 11A-F provides $MS^n$ analyses of representative SDASO-L, -M and -S intra-linked peptides of BSA. $MS^2$ spectra of the intra-linked αintra peptides (A) SDASO-L: m/z $474.8992^{3+}$, (B) SDASO-M: m/z $455.8924^{3+}$, (C) SDASO-S: m/z $451.2183^{3+}$. $MS^3$ spectra of: (D) SDASO-L MS2 fragment ion $α_{A+T}$(m/z $468.89^{3+}$), (E) SDASO-M $MS^2$ fragment ion $α_{A+T}$(m/z $449.89^{3+}$), (F) SDASO-S $MS^2$ fragment ion $α_{A+T}$ (m/z $445.22^{3+}$). The intra-linked peptides were determined as $^{25}$DTHKSEIAHR$^{34}$ (SEQ ID NO:5) with D25 linked to K28 for all three linkers.

Figure 12:
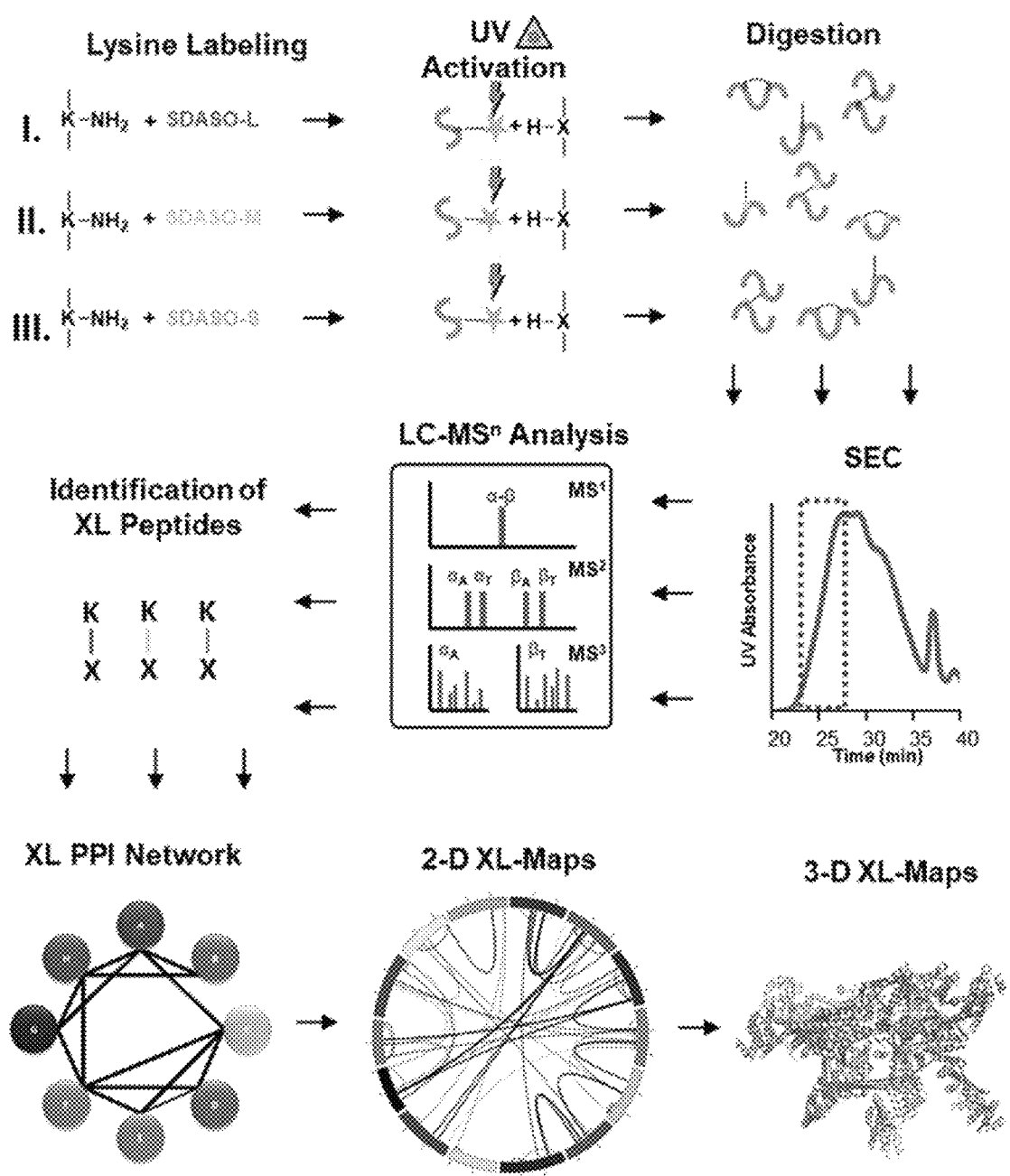
Figure 13A:
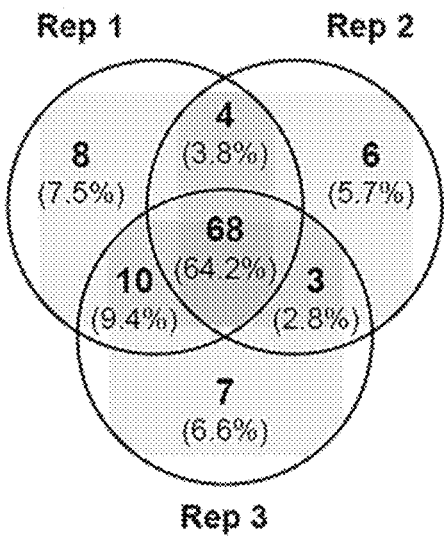
Figure 13B:
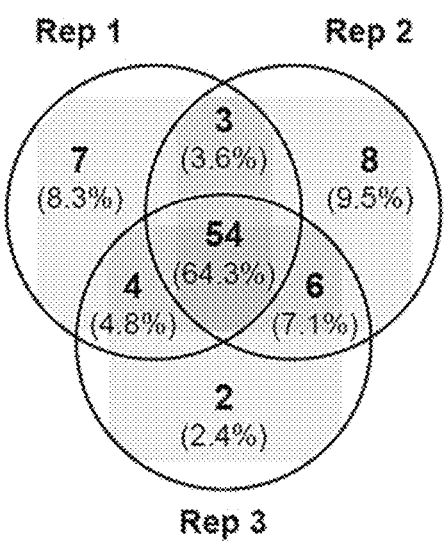
Figure 13C:
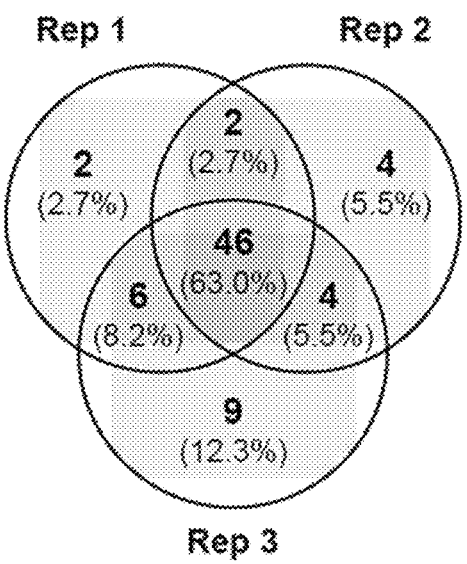
Figure 13D:
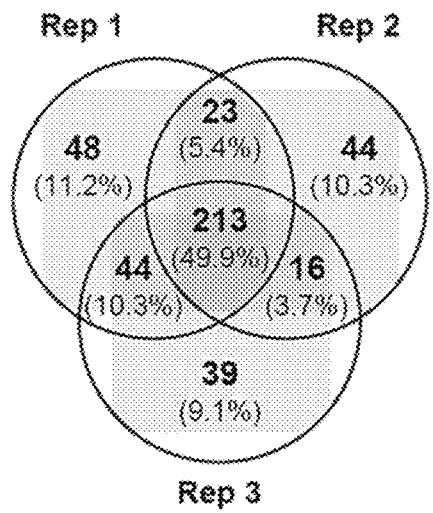
Figure 13E:
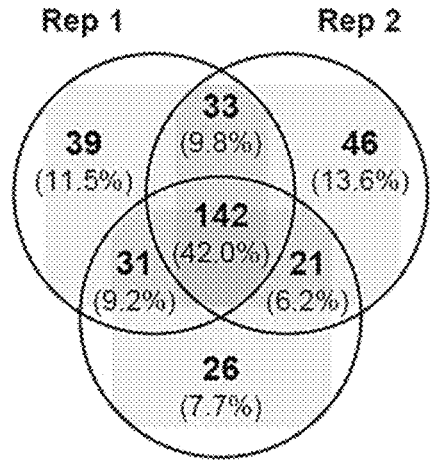
Figure 13F:
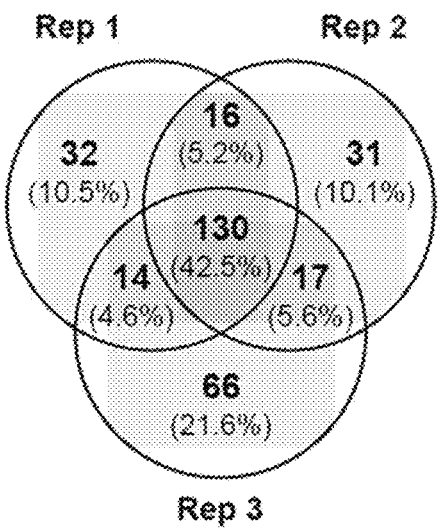
Figure 14A:
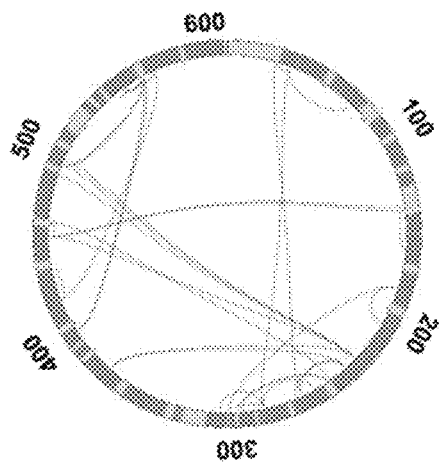
Figure 14B:
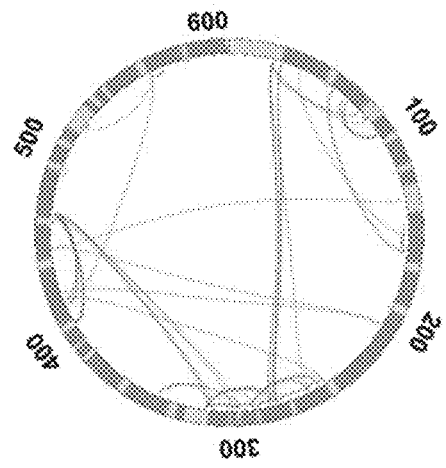
Figure 14C:
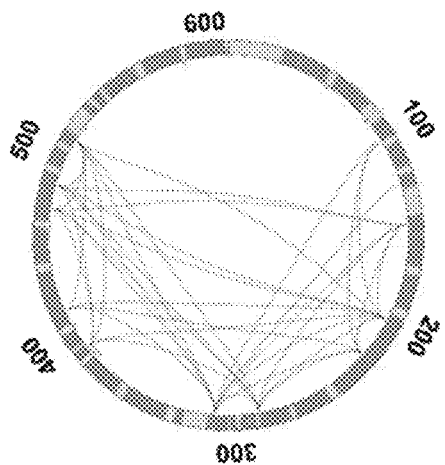
Figure 14D:
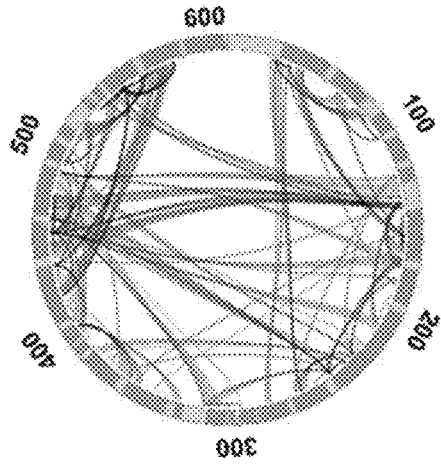
Figure 15A:
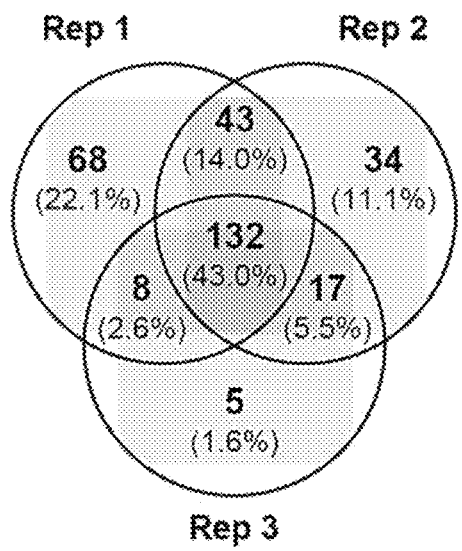
Figure 15B:
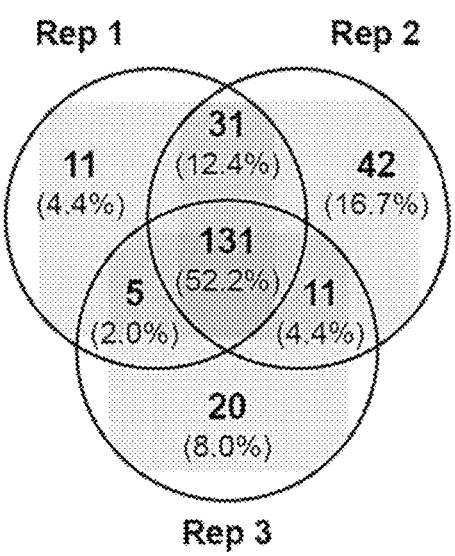
Figure 15C:
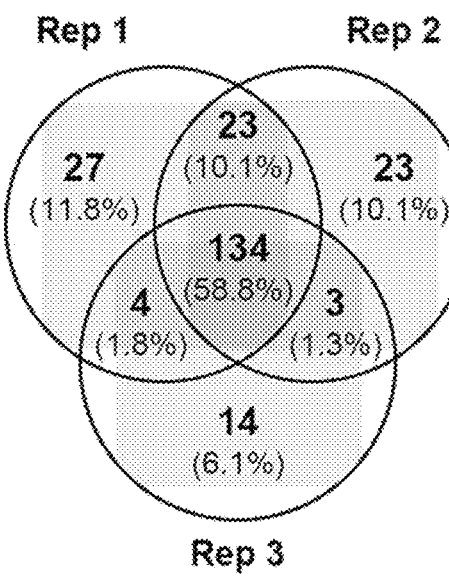
Figure 15D:
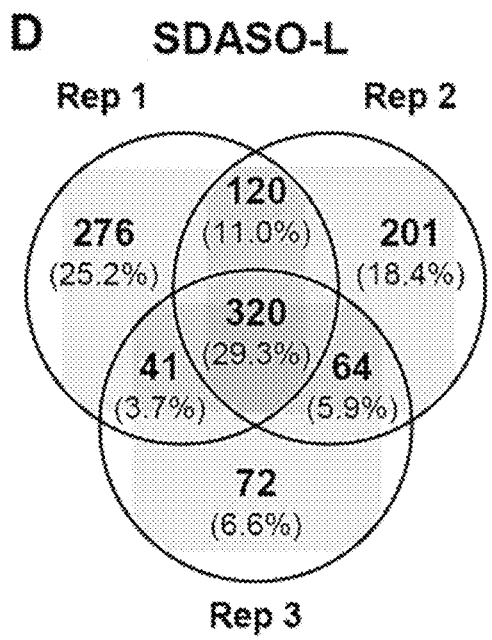
Figure 15E:
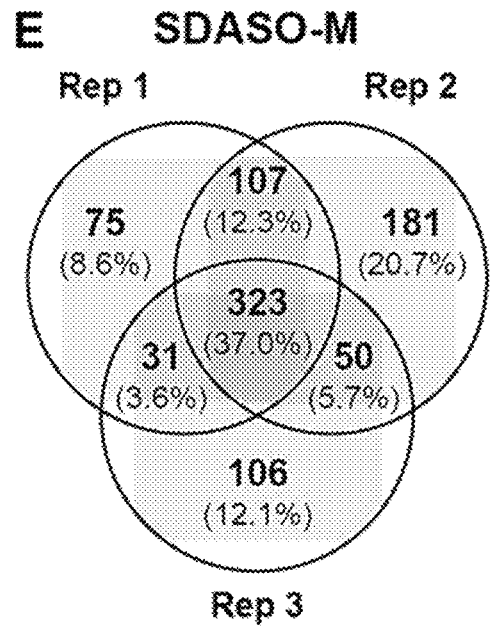
Figure 15F:
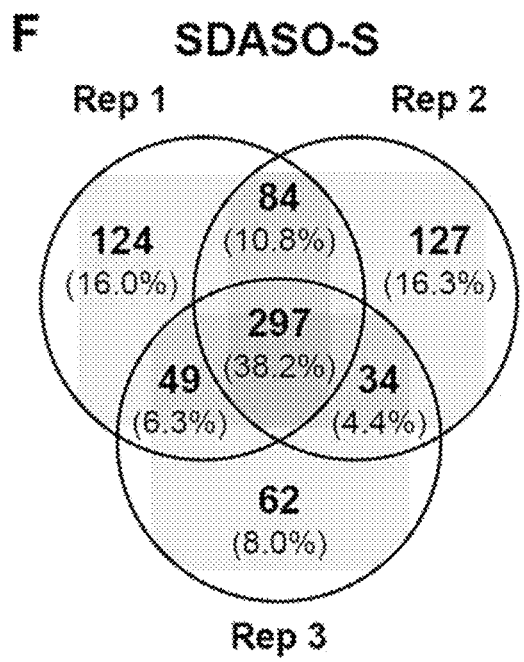

FIG. 12 shows the SDASO XL-MS analysis workflow. SDASO cross-linking involves two steps: (1) lysine labeling by NHS ester; (2) photoactivated diazirine cross-linking of any AAs upon UV irradiation. path I-SDASO-L, path II-SDASO-M, and path III-SDASO-S.

FIG. 13A-F demonstrates the reproducibility of SDASO XL-MS data for BSA. Comparisons of SDASO cross-linked peptide sequences among the three biological replicates for (A) SDASO-L, (B) SDASO-M, and (C) SDASO-S. Comparisons of SDASO K-X linkages among the three biological replicates for (D) SDASO-L, (E) SDASO-M, and (F) SDASO-S.

FIG. 14A-D presents circular 2-D XL-maps of BSA. The maps were generated based on cross-links of BSA using (A) DSSO, (B) DHSO, (C) BMSO and (D) the three SDASO linkers presented herein.

FIG. 15A-F demonstrates the reproducibility of SDASO XL-MS data for the 26S proteasome. Comparisons of SDASO cross-linked peptide sequences among the three biological replicates for (A) SDASO-L, (B) SDASO-M, and (C) SDASO-S. Comparisons of SDASO K-X linkages among the three biological replicates for (D) SDASO-L, (E) SDASO-M, and (F) SDASO-S. Note: the XL-MS data were generated from tryptic digests only.

Figure 16:
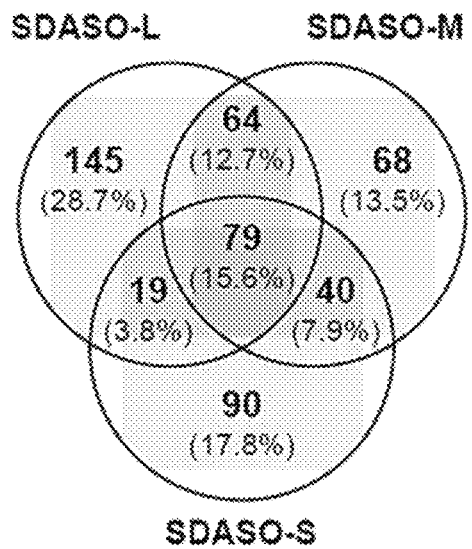
Figure 17A:
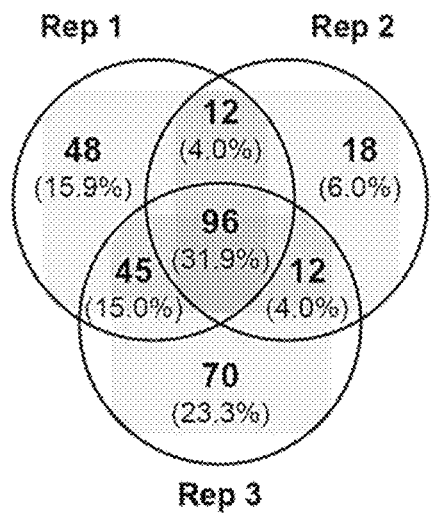
Figure 17B:
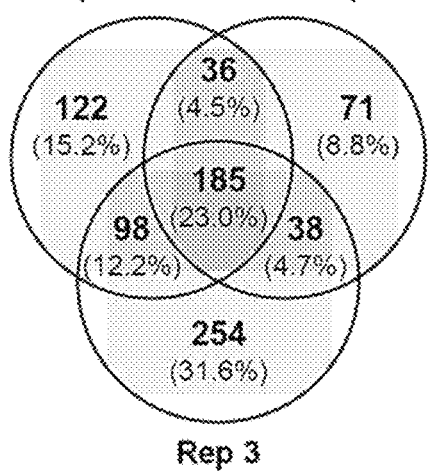
Figure 17C:
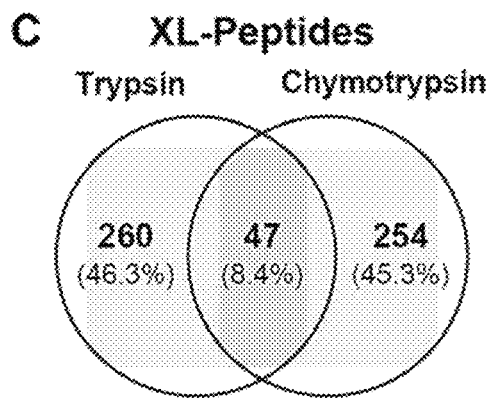
Figure 17D:
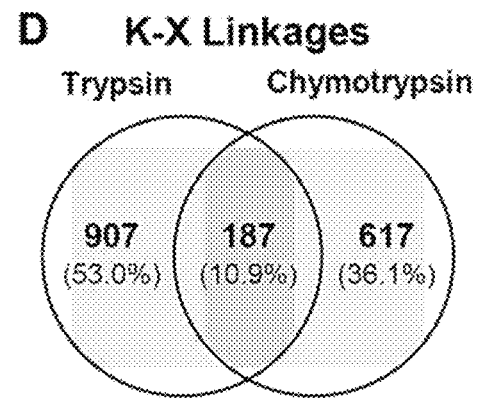
Figure 18A:
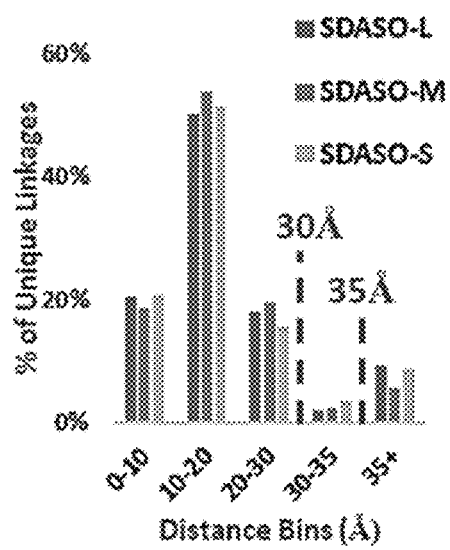
Figure 18B:
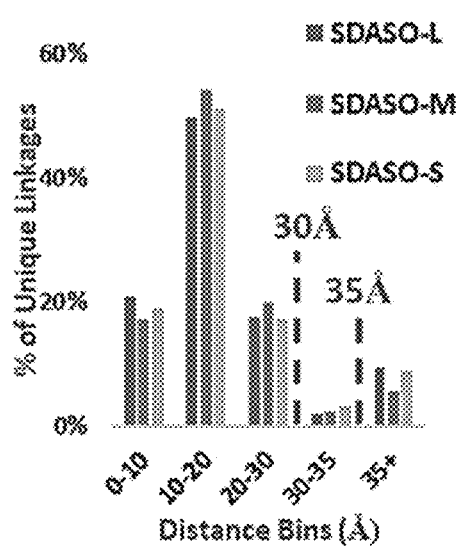
Figure 18C:
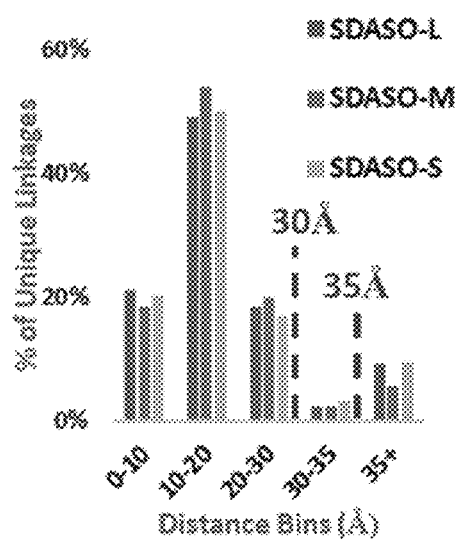
Figure 18D:
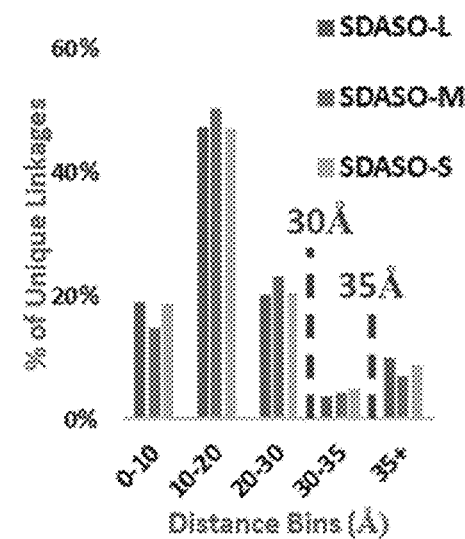
Figure 19A:
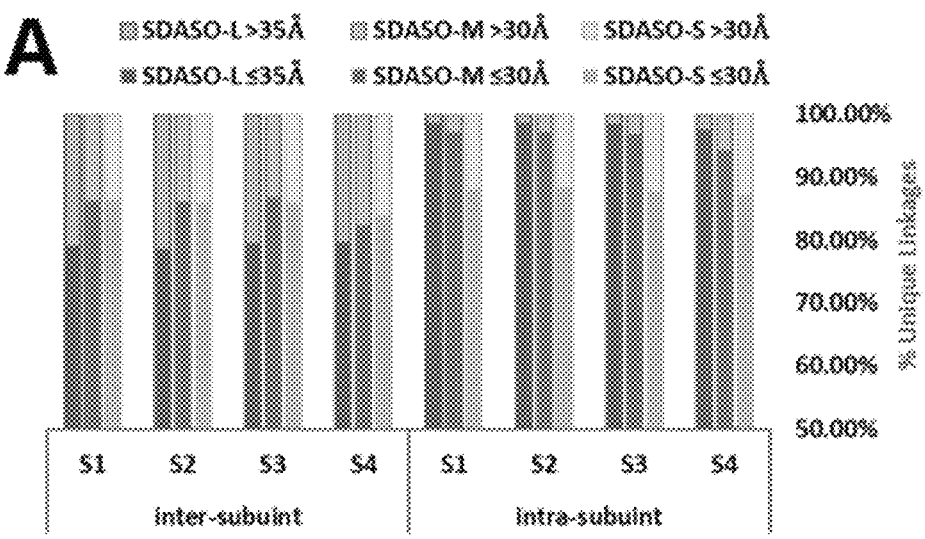
Figures 19B, 19C, 19D, 19E, 19F, 19G, 19H, 19I, 19J:
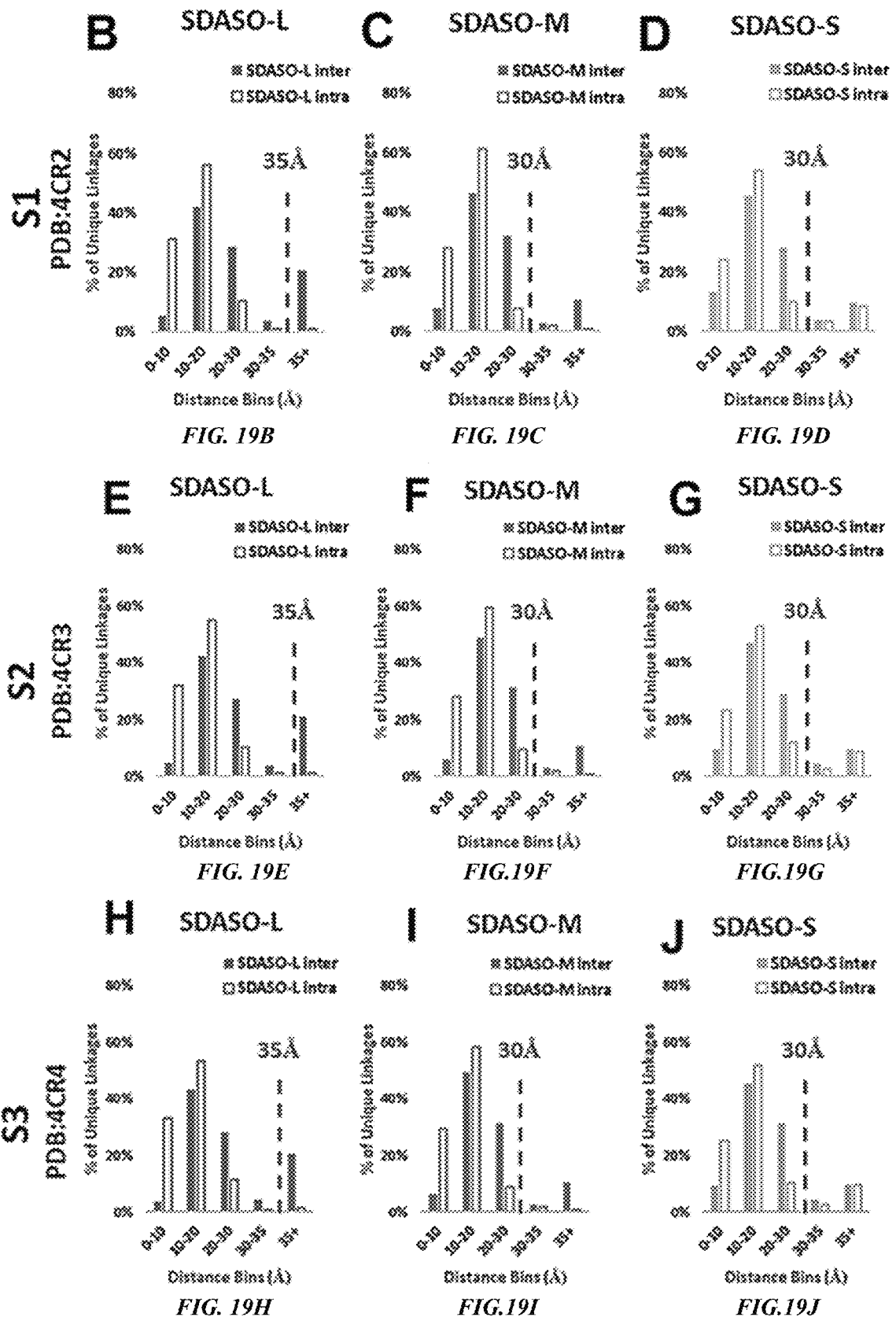
Figures 19K, 19L, 19M:
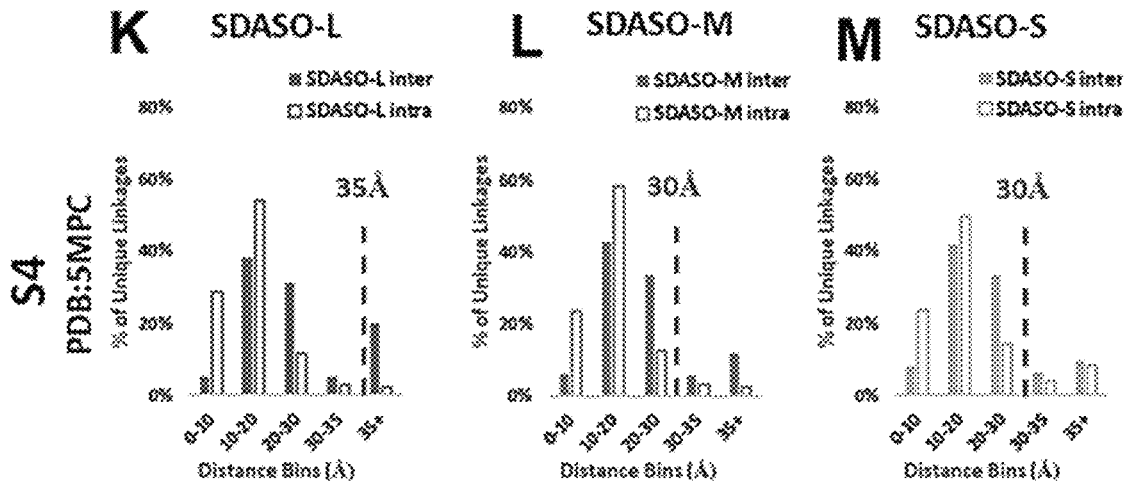
Figure 20A:
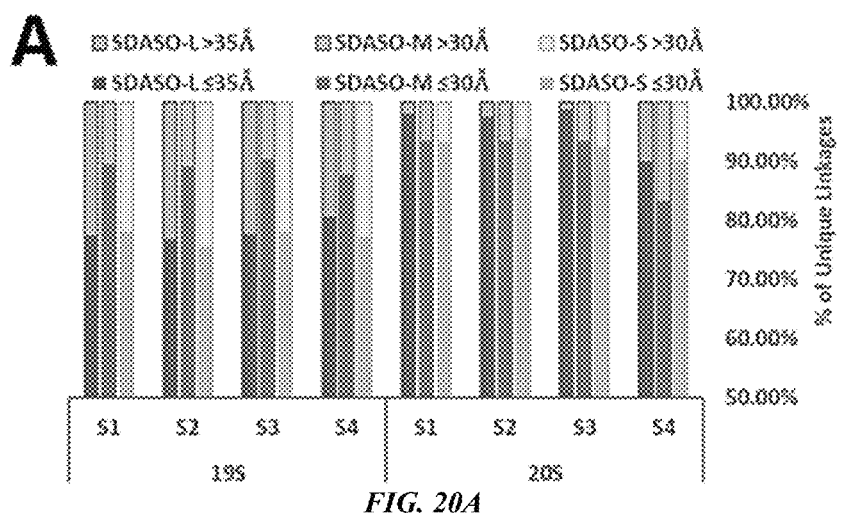
Figures 20B, 20C, 20D:
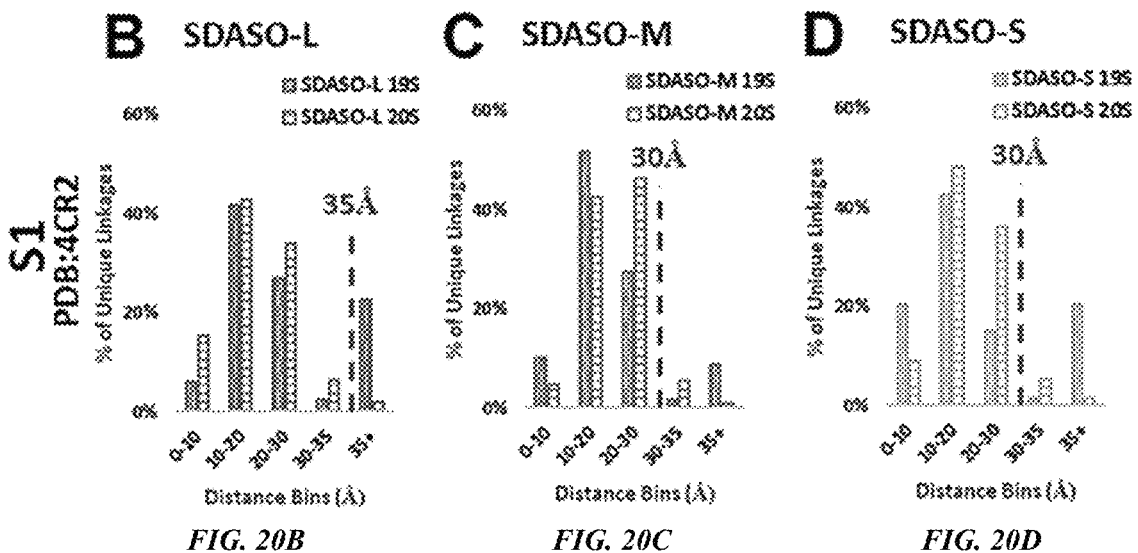
Figures 20E, 20F, 20G, 20H, 20I, 20J, 20K, 20L, 20M:
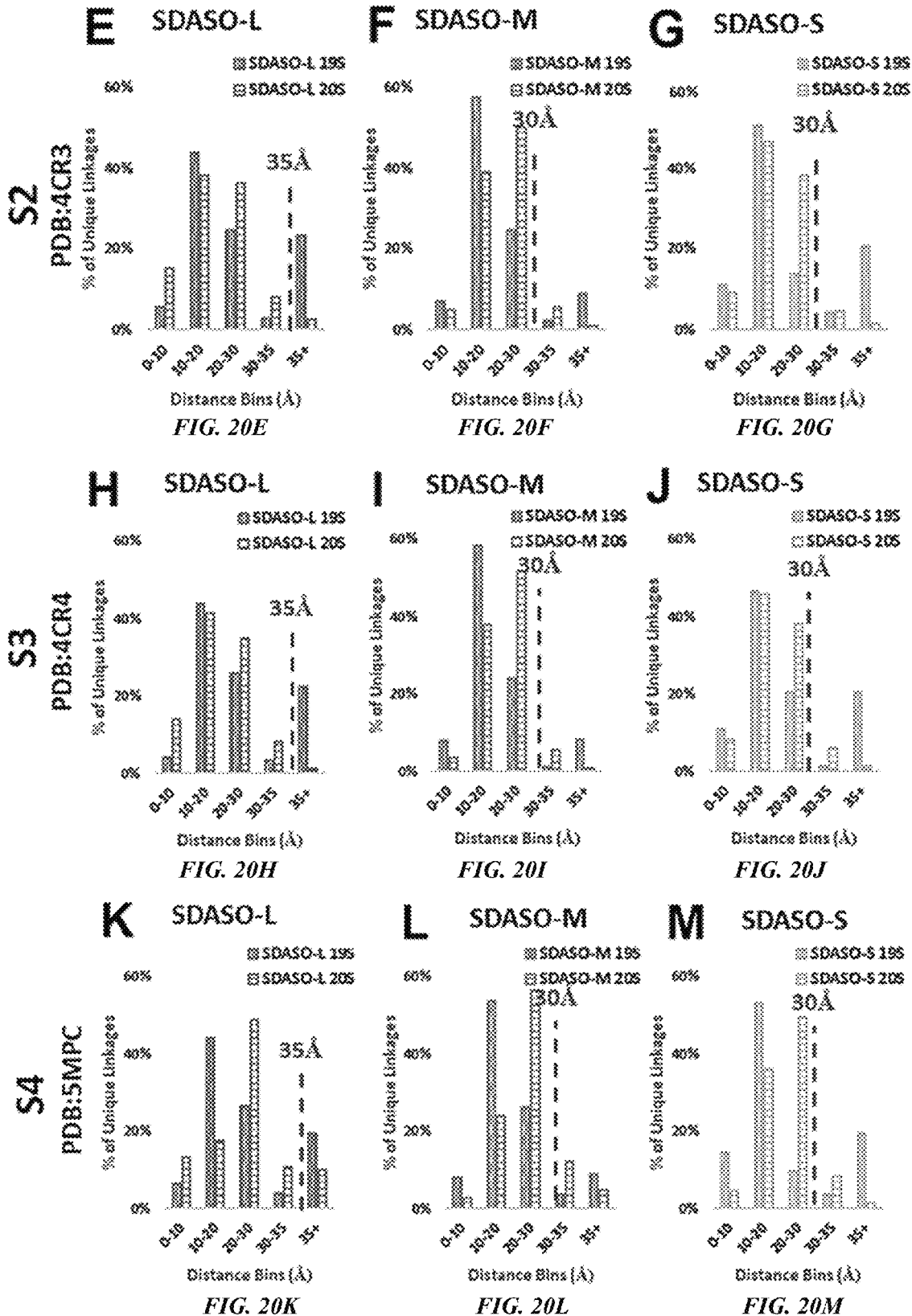

FIG. 16 provides a comparison of SDASO XL-MS data for the 26S proteasome. Overlaps of the identified cross-linked peptide sequences using SDASO-L, SDASO-M, and SDASO-S respectively. Note: the XL-MS data were generated from tryptic digests only.

FIG. 17A-D demonstrates the reproducibility of SDASO-L XL-MS data from chymotryptic digests of the 26S proteasome and comparison of data from trypsin and chymotrypsin digests of the 26S proteasome. Comparisons of SDASO-L (A) cross-linked peptide sequences and (B) K-X linkages among the three biological replicates of chymotryptic digests. Overlaps of the identified SDASO-L (C) cross-linked peptide sequences and (D) K-X linkages using trypsin and chymotrypsin digestions respectively. SDASO-L: tryptic digests; SDASO-Lc: chymotryptic digests.

FIG. 18A-D provides distance distribution plots of SDASO cross-links mapped to the four known states of the yeast 26S proteasome structures (s1-s4). Respective cross-link distance distribution plots for SDASO-L, -M and -S cross-link data mapped onto (A) s1 (PDB: 4CR2), (B) s2 (PDB:4CR3), (C) s3 (PDB:4CR4) and (D) s4 (PDB:5MPC). Distance satisfaction thresholds are ≤30 Å for SDASO-M and -S, and ≤35 Å for SDASO-L.

FIG. 19A-M provides distance distribution plots of the inter-subunit and intra-subunit K-X linkages mapped to the yeast 26S proteasome structures (s1-s4). (A) Average cross-link distance satisfaction rates across the four state models (s1: 4CR2, s2:4CR3, s3:4CR4, and s4:5MPD) for SDASO-L, -M, and -S, respectively. Respective distance distribution plots of SDASO inter-subunit and intra-subunit cross-links mapped onto (B-D) state s1 (PDB: 4CR2), (E-G) state s2 (PDB: 4CR3), (H-J) state s3 (PDB: 4CR4), and (K-M) state s4 (PDB: 5MPC) based on SDASO-L (B, E, H, K), SDASO-M (C, F, I, L) and SDASO-S (D, G, J, M) XL-MS data. Distance satisfaction thresholds are ≤30 Å for SDASO-M and -S, and ≤35 Å for SDASO-L.

FIG. 20A-M provides distance distribution plots of the 19S RP and 20S CP K-X linkages mapped to the yeast 26S proteasome structures (s1-s4). (A) Average distance satisfaction rates across the four state models (s1: 4CR2, s2:4CR3, s3:4CR4, and s4:5MPD) for SDASO-L, -M, and -S K-X linkages of the 19S RP and 20S CP, respectively. Respective distance distribution plots of the 19S and 20S cross-links mapped onto (B-D) state s1 (PDB: 4CR2), (E-G) state s2 (PDB: 4CR3), (H-J) state s3 (PDB: 4CR4), and (K-M) state s4 (PDB: 5MPC) based on SDASO-L (B, E, H, K), SDASO-M (C, F, I, L) and SDASO-S (D, G, J, M) XL-MS data. Distance satisfaction thresholds are ≤30 Å for SDASO-M and -S, and ≤35 Å for SDASO-L.

FIG. 21A-B demonstrates the reproducibility of DSSO XL-MS data for the 26S proteasome. Comparisons of DSSO (A) cross-linked peptide sequences and (B) K-K linkages among the two biological replicates of tryptic digests.

FIG. 22A-M provides distance distribution analysis of DSSO cross-links of the 26S proteasome. (A) Average distance satisfaction rates of DSSO cross-links across the four state models (s1: 4CR2, s2:4CR3, s3:4CR4, and s4:5MPD) (distance satisfaction threshold for DSSO cross-links ≤30 Å). (B) Respective distance distribution plots of DSSO cross-links mapped to the four states of the 26S proteasome structures. (C) Distribution of state-specific K-K linkages among the 14 possible state combinations. (D) Average distance satisfaction rates of inter-subunit and intra-subunit K-K linkages across the four state models. (E) Average distance satisfaction rates of the 19S and 20S K-K linkages across the four state models. (F-I) Respective distance distribution plots of inter-subunit and intra-subunit DSSO cross-links mapped to the four state models: (F) s1 (PDB: 4CR2), (G) s2 (PDB: 4CR3), (H) s3 (PDB: 4CR4) and (I) s4 (PDB: 5MPC). (J-M) Respective distance distribution plots of the 19S and 20S cross-links mapped to the four state models: (J) s1 (PDB: 4CR2), (K) s2 (PDB: 4CR3), (L) s3 (PDB: 4CR4) and (M) s4 (PDB: 5MPC).

Figure 23A:
Figure 23B:
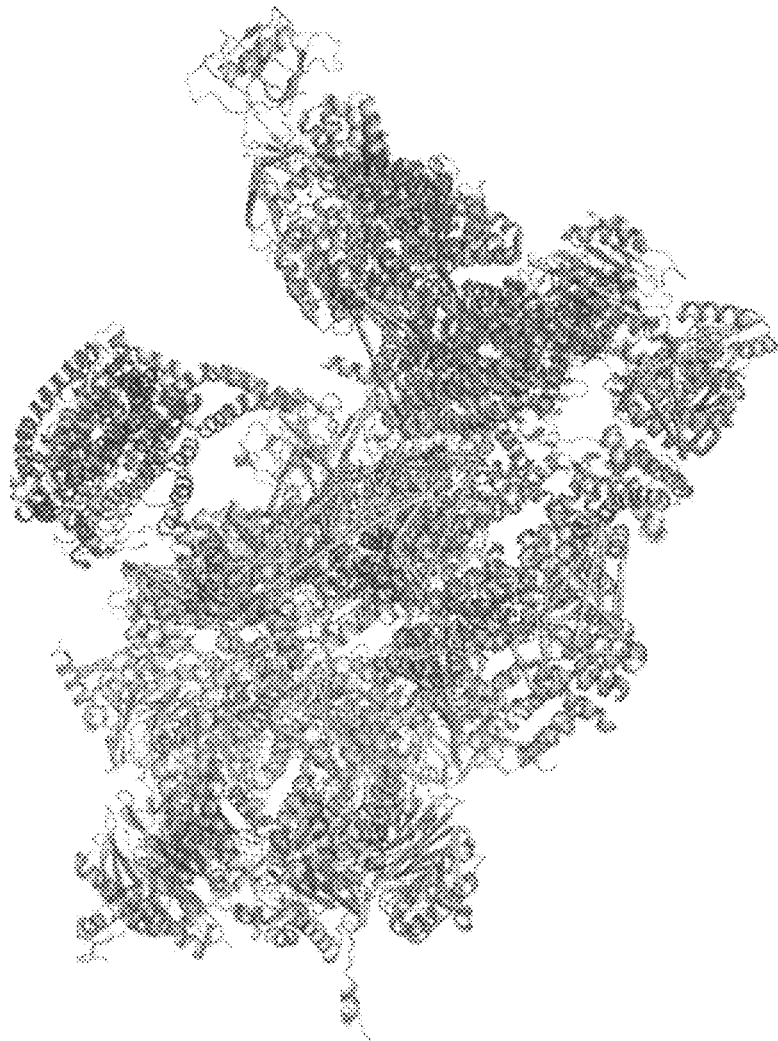

FIG. 23A-B presents 3-D XL-Maps of SDASO and DSSO intra-subunit linkages of the 26S proteasome. (A) SDASO and (B) DSSO intra-subunit linkages (shown in lightest gray) mapped to s1 (PDB:4CR2).

Figure 24A:
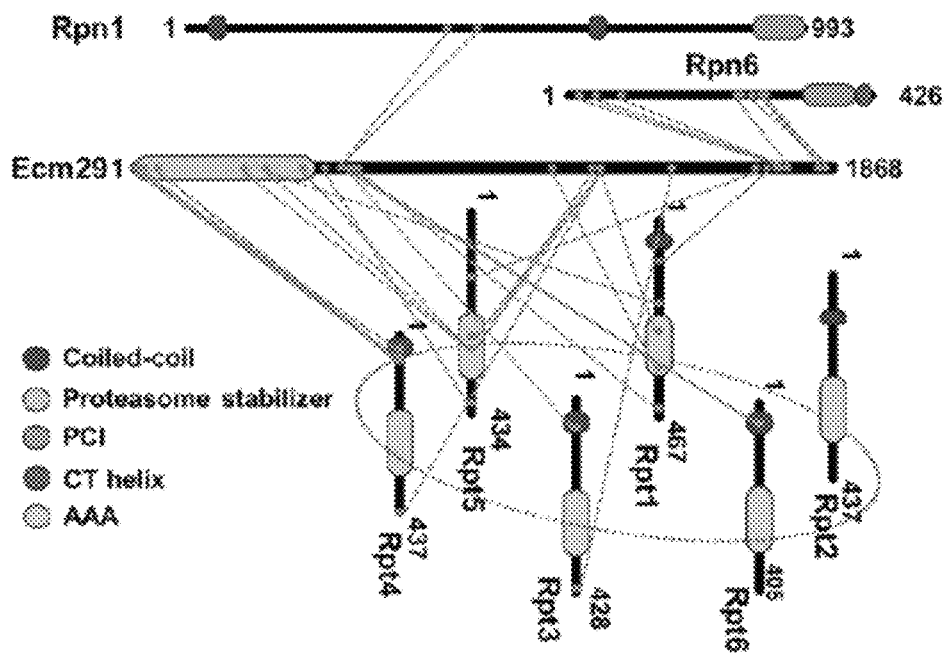
Figure 24B:
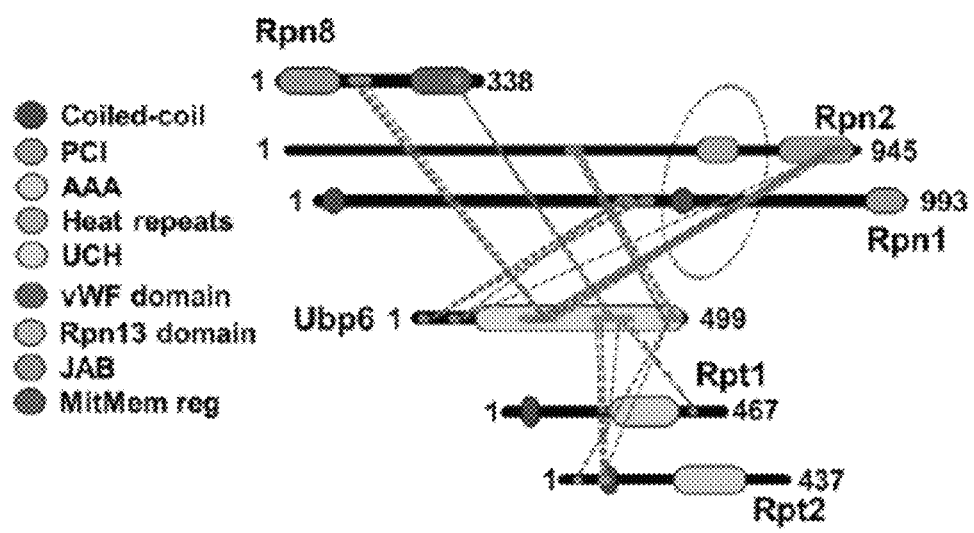

FIG. 24A-B presents XL-maps of the Ecm29- and Ubp6-26S interactions. (A) 2-D XL-map describing the interactions of Ecm29 with Rpn1, Rpn6, Rpt1, and Rpt3-6. (B) 2-D XL-map illustrating the interactions of Ubp6 with Rpn1, Rpn2, Rpn8, Rpt1 and Rpt2. (Note: DSSO inter-subunit linkages are shown in medium gray and SDASO inter-subunit linkages are shown in medium-light gray.)

FIG. 25A-B demonstrates the variance in SDASO cross-linked sites. Distributions of the number of possible cross-linked site locations in the identified SDASO cross-links due to ambiguity in site identification for (A) BSA and (B) 26S Proteasome.

Figure 26B:
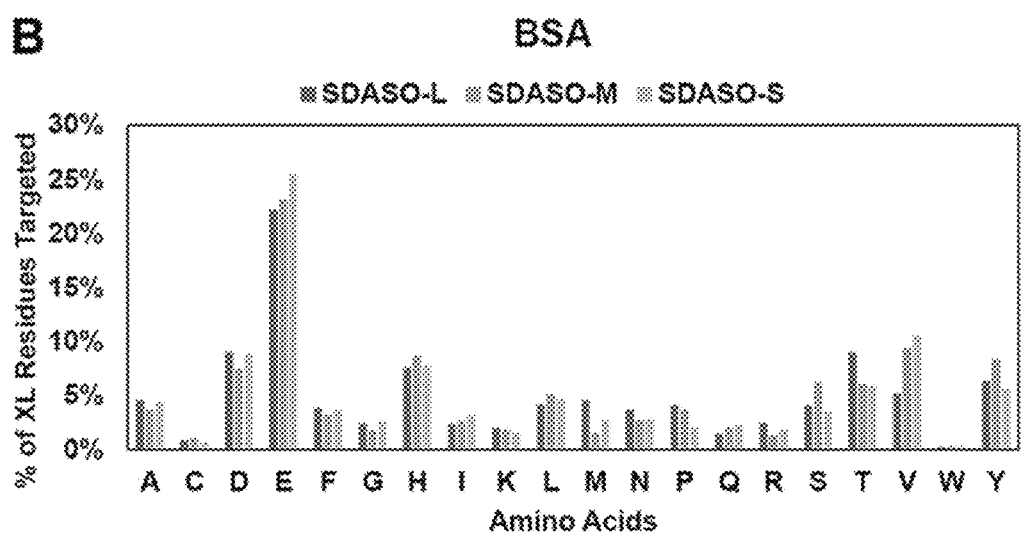

FIG. 26A-B presents the respective distribution of amino acids targeted by diazirine based on the identified SDASO cross-links in (A) 26S proteasome and (B) BSA for SDASO-L, -M, and S linkers.

DETAILED DESCRIPTION

As used herein and in the appended claims, the singular forms "a," "an," and "the" include plural referents unless the context clearly dictates otherwise. Thus, for example, reference to "a crosslinker" includes a plurality of such crosslinkers and reference to "the sulfoxide group" includes reference to one or more sulfoxide groups and equivalents thereof known to those skilled in the art, and so forth.

Unless defined otherwise, all technical and scientific terms used herein have the same meaning as commonly understood to one of ordinary skill in the art to which this disclosure belongs. Although many methods and reagents are similar or equivalent to those described herein, the exemplary methods and materials are disclosed herein.

All publications mentioned herein are incorporated by reference in full for the purpose of describing and disclosing methodologies that might be used in connection with the description herein. The publications are provided solely for their disclosure prior to the filing date of the present application. Nothing herein is to be construed as an admission that the inventors are not entitled to antedate such disclosure by virtue of prior disclosure. Moreover, with respect to any term that is presented in one or more publications that is similar to, or identical with, a term that has been expressly defined in this disclosure, the definition of the term as expressly provided in this disclosure will control in all respects.

Protein-protein interactions (PPIs) are fundamental to the assembly, structure and function of protein complexes, which in turn exert control over a diverse array of biological processes integral to cell biology. Cross-linking mass spectrometry (XL-MS) is a unique structural tool capable of studying PPIs due to its ability to simultaneously capture and identify PPIs with interaction contacts from native cellular environment. In addition, the residue-specific cross-linkable distances defined by cross-linkers can function as restraints to assist structural modeling and to elucidate architectures of large protein complexes. To date, amine-reactive homobifunctional NHS ester cross-linkers have been the most popular reagents in XL-MS studies. This is due to the relatively high occurrence of lysines—particularly at the surfaces of protein structures—as well as the specificity and efficiency of amine-reactive chemistries. Although effective, these reagents alone cannot yield complete PPI maps, as profiling of interaction regions lacking lysines would be difficult. Thus, to complement lysine-reactive reagents, additional amino acid-specific cross-linkers have been developed, including carboxyl-, sulfhydryl-, arginine-, and multi-residue targeting ones, clearly expanding PPI coverage. In addition, integration of multiple cross-linkers has improved characterization of PPIs and increased the depth and accuracy of structural analysis, demonstrating the benefits of multi-chemistry based combinatory XL-MS approaches. However, despite these successes, mapping interaction regions lacking targetable residues by specific chemistry remains challenging.

In recent years, photochemistry has shown great potential in capturing regions inaccessible to residue-specific cross-linkers due to its nonspecific reactivity. Various types of photoreactive reagents have been explored in XL-MS studies, almost all of which have been heterobifunctional cross-linkers with an amine-reactive specific end and a nonspecific end. Among the commonly used photoreactive groups, alkyl diazirine is most attractive due to its small size, long excitation wavelength, photostability, reactivity, and proven success in XL-MS studies. Diazirines are activated by UV light to yield: (1) highly reactive carbenes which then react with an X—H bond (X: C, N, O, S); and/or (2) highly reactive diazo intermediates that reacts with carboxyl groups of amino acids. While promising, the indiscriminate nature of photo-crosslinking often results in highly complex and low abundance cross-linked products that complicate MS analysis and database searching, thus limiting its application predominantly to single proteins. Therefore, to advance photo-reactive XL-MS studies for complex PPI mapping, it is important to develop novel reagents that permit effective MS detection and accurate identification of photo-cross-linked peptides.

MS-cleavable cross-linking reagents have significantly facilitated MS analysis of cross-linked peptides in complex mixtures, due to their unique capability of eliminating the "n-square" problem and permitting effective sequencing of cross-linked peptides. In current cross-linking mass spectrometry (XL-MS) studies, residue-specific cross-linkers have proven to be the most popular and successful compounds for protein structural elucidation. This is due to an effective and specific cross-linking chemistry, as well as the frequent occurrence of targetable residues in protein sequences and at the surface-exposed regions of protein structures. However, it remains challenging to characterize protein interaction interfaces lack of targetable residues by specific chemistry. As such, the development of non-specific cross-linking chemistries in order to increase the coverage of structural information obtainable from XL-MS experiments would be advantageous, particularly in systems where protein interacting regions are refractive to residue-specific cross-linking.

The disclosure provides for mass spectrometry-cleavable heterobifunctional photoactivated cross-linkers (e.g., disuccinimidyl sulfoxide (DSSO) (see FIG. 2A)). The mass spectrometry-cleavable heterobifunctional photoactivated cross-linkers of the disclosure simplify MS analysis and facilitate the identification of photo-crosslinked peptides. Additionally, the mass spectrometry-cleavable heterobifunctional photoactivated cross-linkers of the disclosure allow for photo-cross-linking of complex samples.

In a particular embodiment, the disclosure provides for mass spectrometry-cleavable heterobifunctional photoactivated cross-linkers which comprise sulfoxide groups. In a further embodiment, the mass spectrometry-cleavable heterobifunctional photoactivated cross-linkers are NHS-diazirine-based heterobifunctional cross-linkers with varied linker lengths to facilitate the identification of photo-cross-linked peptides, e.g., SDASO (succinimidyl diazirine sulfoxide)-L (long), -M (medium) and -S (short). The mass spectrometry-cleavable heterobifunctional photoactivated cross-linkers disclosed herein are robust and provide for unambiguous identification of cross-linked peptides via XL-MS$^n$ workflow. The mass spectrometry-cleavable heterobifunctional photoactivated cross-linkers disclosed herein provide invaluable insights for structural elucidation of protein complexes by XL-MS. The mass spectrometry-cleavable heterobifunctional photoactivated cross-linkers disclosed herein define protein-protein interactions at the global scale, and therefore can elucidate structural dynamics of protein complexes and their mechanistic functions in cells.

Although photo-induced diazirine labeling is nonspecific, the observed reproducibility of cross-linked peptide sequences was comparable to residue-specific cross-linkers, supporting the reliability of photoactivated cross-linked products. All of the common AAs were detected as cross-linked sites in studies presented herein using the MS-cleavable heterobifunctional photoactivated cross-linkers of the disclosure.

Reported herein is the development and characterization of MS-cleavable heterobifunctional photoactivated cross-linkers. In a particular embodiment, the MS-cleavable heterobifunctional photoactivated cross-linkers are sulfoxide-containing MS-cleavable heterobifunctional photoactivated cross-linkers, including SDASO-L, -M and -S. The unique designs of MS-cleavable heterobifunctional photoactivated cross-linkers disclosed herein enable a single labile bond to be preferentially cleaved over a peptide backbone, leading to only one pair of MS$^2$ fragment ions and enhancing analysis sensitivity. Importantly, peptides crosslinked by the MS-cleavable heterobifunctional photoactivated cross-linkers disclosed herein possess robust and predictable MS$^2$ fragmentation characteristics similar to sulfoxide-containing homobifunctional cross-linkers, thus permitting fast and accurate identification using MS$^n$-based XL-MS workflow. Although MS$^2$-based approaches have been widely used in XL-MS studies, MS$^n$ analysis is important for effective database searching to identify photo-crosslinked peptides and localize nonspecific cross-linked sites with speed and accuracy, especially for complex samples. Owing to their unique capabilities, the MS-cleavable heterobifunctional photoactivated cross-linkers of the disclosure have been successfully employed to study PPIs of not only a single protein BSA, but also the affinity purified yeast 26S proteasome complex. Thus, the MS-cleavable heterobifunctional photoactivated cross-linkers allow for photoactivated cross-linking for PPI mapping of large protein assemblies. The development of the MS-cleavable heterobifunctional photoactivated cross-linkers disclosed herein further demonstrates the robustness and potential of the XL-MS technology based on MS-cleavable cross-linkers and provides a viable analytical platform to generate a complete PPI map of cellular systems.

In a particular embodiment, the mass spectrometry-cleavable heterobifunctional photoactivated cross-linkers disclosed herein comprise sulfoxide group(s). For such a cross-linker, the MS-labile C—S bonds adjacent to the sulfoxide can be preferentially fragmented prior to peptide backbone cleavage upon collision-induced dissociation (CID), physically separating the two cross-linked peptide constituents for individual sequencing. Notably, this predictable fragmentation occurs independent of cross-linking chemistry, peptide charge and peptide sequence. These unique characteristics allow straightforward and unambiguous identification of cross-linked peptides by MS$^n$ analysis coupled with conventional database searching tools.

In a certain embodiment, the disclosure provides a mass spectrometry (MS)-cleavable heterobifunctional photoactivated cross-linker comprising: a photo-activatable reactive chemical group; a N-hydroxysuccinimide (NHS) group, a hydrazine group, or a maleimide group; a sulfoxide group; and a MS-cleavable bond; wherein the MS-cleavable cross-linker is configured for mapping intra-protein interactions in a protein, or inter-protein interactions in a protein complex, or combinations thereof. In a further embodiment, the photo-activatable reactive chemical group is a group selected from an aryl azide, an azido-methyl-coumarin, a benzophenone, an anthraquinone, a diazo compound, a diazirine, and a psoralen derivative.

In a particular embodiment, the disclosure provides for a mass spectrometry (MS)-cleavable heterobifunctional photoactivated cross-linker which comprises an aryl azide as a photo-activatable reactive chemical group. When an aryl azide is exposed to UV light (250 to 350 nm), it forms a nitrene group that can initiate addition reactions with double bonds, insertion into C—H and N—H sites, or subsequent ring expansion to react with a nucleophile (e.g., primary amines) (see Scheme 1). The latter reaction path dominates when primary amines are present in the sample. Three basic forms of aryl azides exist: simple phenyl azides, hydroxyphenyl azides, and nitrophenyl azides. Generally, short-wavelength UV light (e.g., 254 nm; 265 to 275 nm) is needed to efficiently activate simple phenyl azides, while long-UV light (e.g., 365 nm; 300 to 460 nm) is sufficient for nitrophenyl azides. Because short-wave UV light can be damaging to other molecules, nitrophenyl azides are usually preferable for crosslinking experiments.

Scheme I

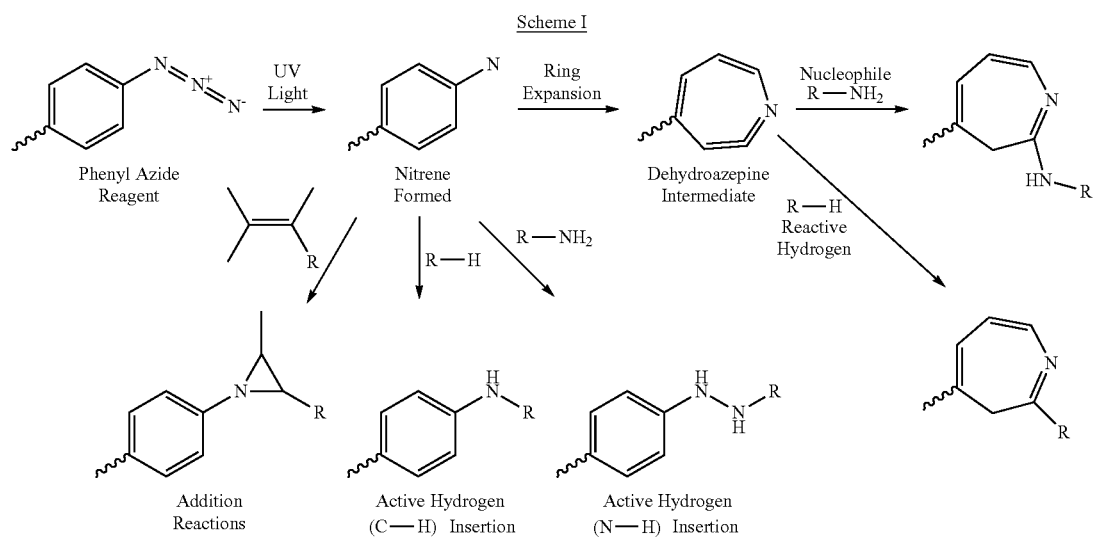

Aryl azide reaction scheme for light-activated photochemical conjugation. Squiggle bonds represent the connection of the group to the larger (MS)-cleavable heterobifunctional photoactivated cross-linker disclosed herein; R represents a protein or other molecule that contains nucleophilic or active hydrogen groups. Bold arrows indicate the dominant pathway. Halogenated aryl azides react directly (without ring-expansion) from the activated nitrene state.

In a further embodiment, the disclosure provides for a mass spectrometry (MS)-cleavable heterobifunctional photoactivated cross-linker which comprises a phenyl azide, a hydroxyphenyl azide, a fluorophenyl azide or a nitrophenyl azide as a photo-activatable reactive chemical group. Examples of such groups include, but are not limited to,

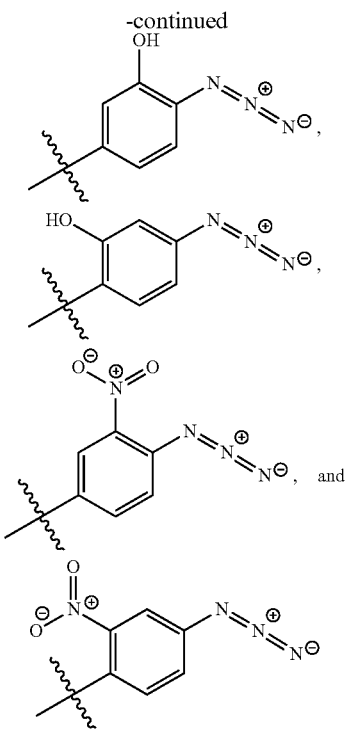

In an alternate embodiment, the disclosure provides for a mass spectrometry (MS)-cleavable heterobifunctional photoactivated cross-linker which comprises an azido-methylcoumarin as a photo-activatable reactive chemical group. An example of such a group is

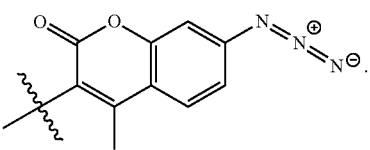 [SMILES: *c1c(C)c2ccc(N=[N+]=[N-])cc2oc1=O]

In yet another alternate embodiment, the disclosure provides for a mass spectrometry (MS)-cleavable heterobifunctional photoactivated cross-linker which comprises a psoralen derivative as a photo-activatable reactive chemical group. An example of such a group is

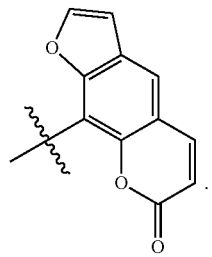 [SMILES: *c1c2occc2cc2ccc(=O)oc12]

In yet another alternate embodiment, the disclosure provides for a mass spectrometry (MS)-cleavable heterobifunctional photoactivated cross-linker which comprises a benzophenone as a photo-activatable reactive chemical group. An example of such a group is

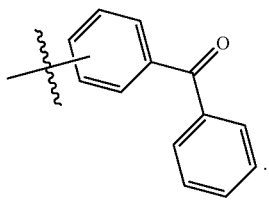

In yet another alternate embodiment, the disclosure provides for a mass spectrometry (MS)-cleavable heterobifunctional photoactivated cross-linker which comprises a diazirine as a photo-activatable reactive chemical group. An example of such a group is

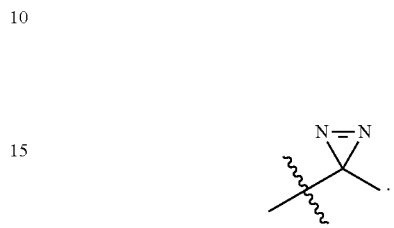

Diazirines are a newer class of photo-activatable chemical groups that are being incorporated into various kinds of crosslinking and labeling reagents. The diazirine (azipentanoate) moiety has better photostability than phenyl azide groups, and it is more easily and efficiently activated with long-wave UV light (330 to 370 nm). Photo-activation of diazirine creates reactive carbene and/or diazo intermediates. Carbene intermediates can form covalent bonds through addition reactions with any amino acid side chain or peptide backbone at distances corresponding to the spacer arm lengths of the particular reagent; while diazo intermediates react with carboxyl groups of amino acids, or with side chains of amino acids which comprise carboxyl groups, such as glutamic acid (see Scheme II).

Scheme II

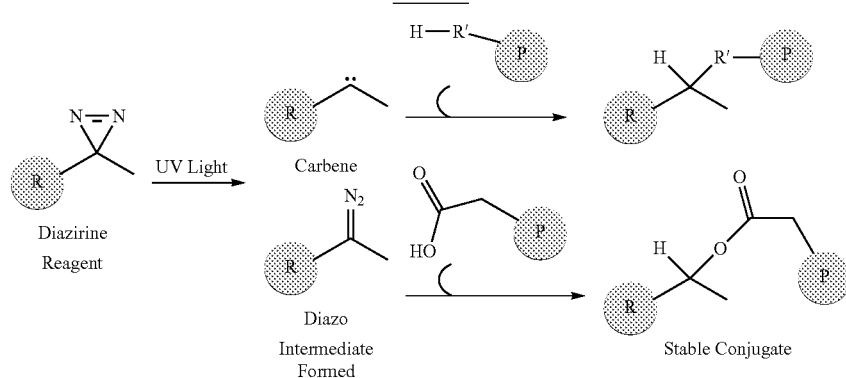

Diazirine reaction scheme for light-activated photochemical conjugation. R represents the connection the group to the larger (MS)-cleavable heterobifunctional photoactivated cross-linker disclosed herein; (P) represents a protein or other molecule that contains nucleophilic or active hydrogen groups R'.

The stability and very small size of the diazirine group also enables crosslinking experiments that involve metabolic labeling. For example, Photo-L-Leucine and Photo-L-Methionine are analogs of native amino acids that contain the diazirine group in their side chains. When these compounds are added to culture media instead of their native counterparts, protein synthesis machinery will use the photoreactive versions to build proteins. In this way, proteins themselves become the crosslinking reagents in the methods disclosed herein.

In a particular embodiment, the disclosure provides a MS-cleavable heterobifunctional photoactivated cross-linker that comprises an asymmetric spacer arm, wherein one end of the asymmetric spacer arm comprises a NHS group, a hydrazine group, or a maleimide group, and wherein the other end of the asymmetric spacer arm includes a photo-activatable reactive chemical group as disclosed herein, and a centrally located sulfoxide group on the asymmetric spacer arm. In a further embodiment, MS-cleavable bond is a C—S bond adjacent to the at least one sulfoxide group.

In another embodiment, the disclosure provides for a mass spectrometry-cleavable heterobifunctional photoactivated cross-linker having the structure of Formula I.

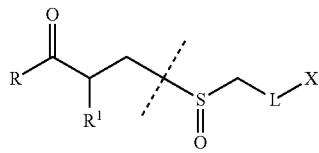

Formula I wherein,
R is selected from:

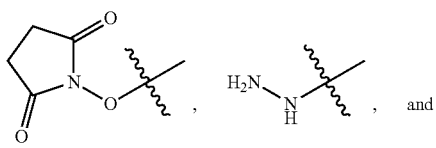

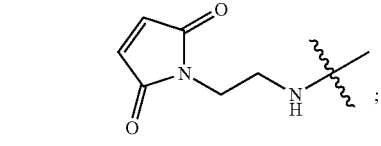

$R^1$ is H or an optionally substituted $(C_1$-$C_6)$alkyl;
L is selected from an optionally substituted $(C_1$-$C_6)$ alkyl, $R^2$—NH—C(O)—$R^3$, and $R^2$—C(O)—NH—$R^3$;
$R^2$ and $R^3$ are independently selected $(C_1$-$C_6)$alkyls;
X is a photo-activatable reactive chemical group; and wherein the dashed line indicates a MS-cleavable bond.'

In a further embodiment, X is selected from an optionally substituted aryl azide, an optionally substituted azidomethyl-coumarin, an optionally substituted benzophenone, an optionally substituted anthraquinone, am optionally substituted diazo compound, an optionally substituted diazirine, and an optionally substituted psoralen derivative. In yet a further embodiment, X is a phenyl azide, a hydroxyphenyl azide, a fluorophenyl azide or a nitrophenyl azide. In another embodiment, X has a structure selected from:

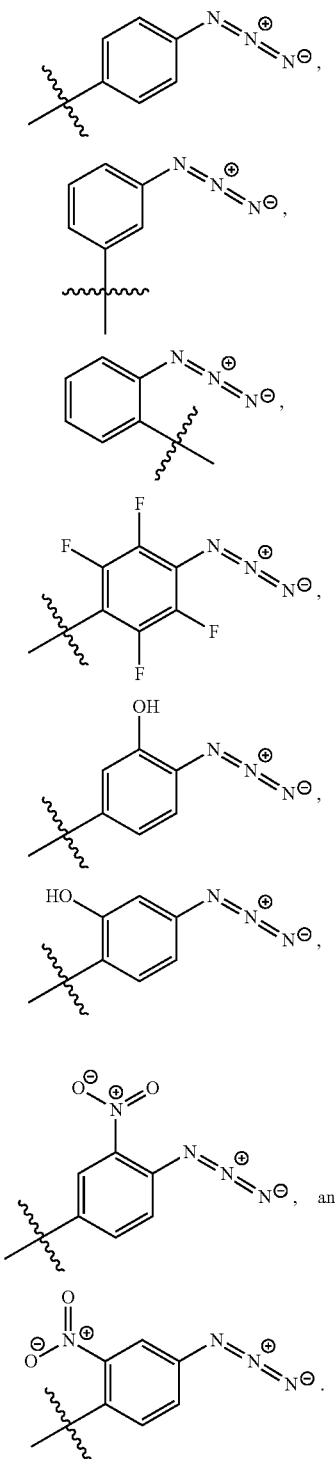

In an alternate embodiment, X has the structure of:

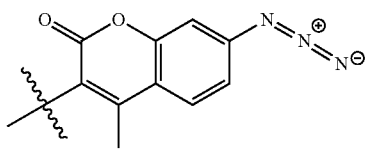

In yet another alternate embodiment, X has the structure of:

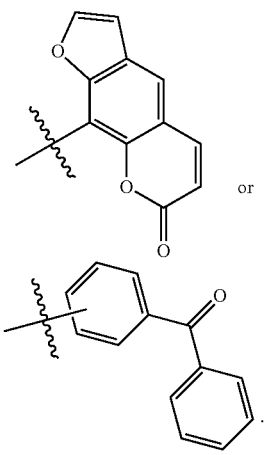

or

In a certain embodiment, the disclosure also provides for a mass spectrometry-cleavable heterobifunctional photoactivated cross-linker having the structure of Formula I(a):

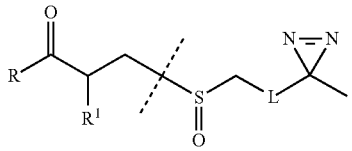

Formula I(a)

wherein,
R is selected from:

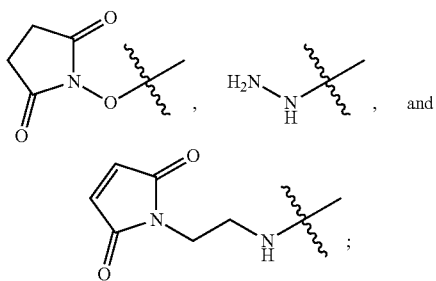

and $R^1$ is H or an optionally substituted $(C_1-C_6)$alkyl;
L is selected from an optionally substituted $(C_1-C_6)$ alkyl, $R^2$—NH—C(O)—$R^3$, and $R^2$—C(O)—NH—$R^3$;
$R^2$ and $R^3$ are independently selected $(C_1-C_6)$alkyls; and wherein the dashed line indicates a MS-cleavable bond.

In a particular embodiment, the disclosure further provides for a mass spectrometry-cleavable heterobifunctional photoactivated cross-linker having the structure of Formula I(b):

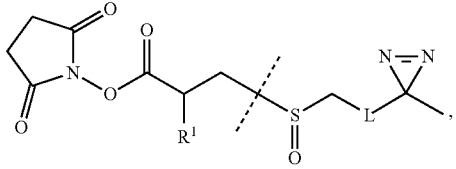

Formula I(b)

wherein,
$R^1$ is H or methyl;
L is selected from an optionally substituted $(C_1-C_6)$ alkyl, $R^2$—NH—C(O)—$R^3$, and $R^2$—C(O)—NH—$R^3$; and
$R^2$ and $R^3$ are independently selected $(C_1-C_6)$alkyls.

In yet a further embodiment, the disclosure provides for one or more mass spectrometry-cleavable heterobifunctional photoactivated cross-linkers having a structure selected from:

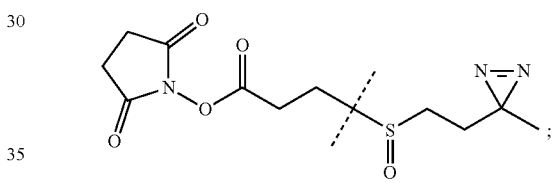

;

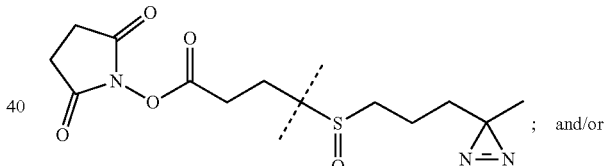

; and/or

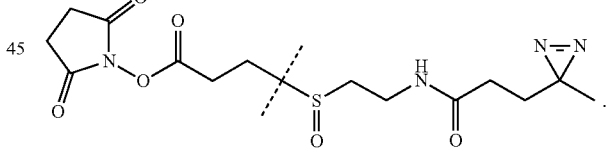

.

In yet a further embodiment, the disclosure provides for a mass spectrometry-cleavable heterobifunctional photoactivated cross-linker disclosed herein that further comprises a group or moiety that allows for enrichment and purification of the mass spectrometry-cleavable heterobifunctional photoactivated cross-linker from other components. Examples of such groups or moieties, include but are not limited to, biotin moieties, phosphate tags, alkyne tags, and aptamers.

A MS-cleavable heterobifunctional photoactivated cross-linker of the disclosure, SDASO, displayed preferential labeling of glutamic acids and certain other amino acids. Although aspartic acids are in comparable abundance to glutamic acids in BSA and proteasomes, they were targeted noticeably less by SDASO. In comparison, acidic residue-reactive cross-linkers such as DHSO do not appear to have noticeable differences in reactivity towards these two AAs. Therefore, the preferential labeling of glutamic acids over aspartic acids displayed by SDASO may be due to differences in physiochemical properties of their side-chains and short-lived photoactivated reaction. In addition to acidic residues, several AAs including tyrosine, valine, leucine, threonine and histidine have been detected as SDASO cross-linked sites more often than other AAs, in which tyrosine and histidine residues have exhibited favored carbene insertion in the past. The preferred reactivity of SDASO-based crosslinkers towards a subset of AAs including ones that cannot be easily targeted by specific cross-linking chemistries is beneficial to XL-MS studies, as it helps enhance the analysis of the resulting photoactivated cross-linked peptides and expand PPI coverage.

The disclosure further provides that the complementarity in PPI mapping using MS-cleavable heterobifunctional photoactivated cross-linkers disclosed herein with various linker lengths indicates that variable linker lengths are beneficial for complex PPI profiling. In comparison to residue-specific cross-linkers such as DSSO, DHSO and BMSO, the MS-cleavable heterobifunctional photoactivated cross-linkers disclosed herein (e.g., SDASO) with BSA yielded the highest number of cross-linked peptides and the most comprehensive interaction maps using XL-MS analyses. The high-density XL-maps of BSA illustrates the effectiveness of MS-cleavable heterobifunctional photoactivated cross-linkers disclosed herein for mapping a diverse range of interactions. XL-maps of the 26S proteasome with MS-cleavable heterobifunctional photoactivated cross-linkers disclosed herein contain much more residue-to-residue connectivity than DSSO. Variance in PPI coverages is mostly attributed to the reactivity and kinetics of the MS-cleavable heterobifunctional photoactivated cross-linkers of the disclosure, as opposed to specific linker lengths. Collectively, the results presented herein, demonstrate the value and utility in probing PPIs of both simple and complex samples with the MS-cleavable heterobifunctional photoactivated cross-linkers of the disclosure.

In a certain embodiment, the mass spectrometry-cleavable heterobifunctional photoactivated cross-linker is SDASO (see FIGS. 1-2). SDASO is a heterobifunctional NHS ester-diazirine photoactivated cross-linker with MS-cleavability. Three SDASO cross-linkers were synthesized and characterized herein with simple model proteins and protein complexes. SDASO cross-linking of proteins involved two steps, (1) amine labeling and (2) UV-activated photo-cross-linking of amino acids. The resulting cross-linked peptides were analyzed herein by multistage tandem mass spectrometry ($MS^n$). SDASO (Succinimidyl diazirine sulfoxide) linkers represent the first generation of MS-cleavable heterobifunctional NHS ester-diazirine cross-linkers that carry an amine-reactive end and a non-specific reactive end. They contain a single robust MS-cleavable bond, i.e., the C—S bond adjacent to the center sulfoxide group at the NHS ester side, which enables fast, effective, and accurate identification of SDASO cross-linked peptides. Based upon the studies with BSA, it was found herein that SDASO provided a much higher number of cross-linked peptides and residue-to-residue linkages than residue-specific cross-linkers, like DSSO. The results demonstrate that SDASO cross-linked peptides possess the same characteristics distinctive to peptides cross-linked by other sulfoxide-containing amine reactive cross-linkers. The results presented herein, demonstrate that the SDASO cross-linked peptides are facile identified by $MS^n$ analysis. SDASO photo-crosslinks any amino acid found in proteins, including amino acids in large, complex protein complexes. Comparison of SDASO and DSSO cross-linked data confirmed the advantages of expanding the coverage of protein interactions using cross-linkers which target different residues, as the distribution of specific amino acids is uneven in most protein samples. Comparative analyses have revealed that SDASO cross-linking is robust and captures interactions complementary to residue-specific reagents. The SDASO XL-MS data generated herein was extensive, and provided for a better assessment of cross-linking in probing PPIs at different scales than existing diazirine crosslinkers.

In some embodiments, mass spectrometry-cleavable heterobifunctional photoactivated cross-linked peptides display predictable and characteristic fragmentation pattern during collision induced dissociation permitting their simplified analysis and unambiguous identification by $MS^n$. Additionally, in some embodiments, the mass spectrometry-cleavable heterobifunctional photoactivated cross-linkers disclosed herein can provide complimentary data to amine reactive reagents. The present disclosure expands the range of the application of XL-MS approaches, but also further demonstrates the robustness and applicability of sulfoxide-based MS-cleavability in conjunction with various reactive chemistries.

In some embodiments, an integrated XL-MS platform to determine composition-dependent conformational changes of proteins and/or protein complexes is provided. In some embodiments, it is expected that the mass spectrometry-cleavable heterobifunctional photoactivated cross-linker-based XL-MS strategies are an invaluable tool in providing a complementary subset of cross-linking data towards a comprehensive structural elucidation of protein complexes by XL-MS.

In some embodiments, the number of unique peptides obtained using the mass spectrometry-cleavable heterobifunctional photoactivated cross-linkers of the disclosure depends on several factors, including but not limited to, size, complexity, conformation, subunits, domains, etc., of the protein and/or protein complex. In some embodiments, the number of unique peptides range from about 5 to about 5,000. In some embodiments, the number of unique peptides range from about 10 to about 10,000. In some embodiments, the number of unique peptides range from about 50 to about 50,000. In some embodiments, the number of unique peptides range from about 100 to about 100,000. Collectively, the results presented thus far indicate that the mass spectrometry-cleavable heterobifunctional photoactivated cross-linkers of the disclosure can effectively cross-link peptides and proteins. More importantly, in some embodiments, the results demonstrate that the mass spectrometry-cleavable heterobifunctional photoactivated cross-linked peptides indeed exhibit the same characteristic $MS^2$ fragmentation patterns as expected to allow their facile and accurate identification.

Kits and articles of manufacture are also described herein. Such kits can comprise a carrier, package, or container that is compartmentalized to receive one or more containers such as vials, tubes, and the like, each of the container(s) comprising one of the separate elements to be used in a method described herein. Suitable containers include, for example, bottles, vials, syringes, and test tubes. The containers can be formed from a variety of materials such as glass or plastic.

For example, the container(s) can comprise one or more MS-cleavable heterobifunctional photoactivated cross-linkers disclosed herein, optionally in a composition or in combination with another agent as disclosed herein. The container(s) typically are made to exclude or limit light exposure for the contents of the container. Such kits optionally comprise a MS-cleavable heterobifunctional photoactivated cross-linker disclosed herein with an identifying description or label or instructions relating to its use in the methods described herein.

A kit will typically comprise one or more additional containers, each with one or more of various materials (such as reagents, optionally in concentrated form, and/or devices) desirable from a commercial and user standpoint for use of a MS-cleavable heterobifunctional photoactivated cross-linker described herein. Non-limiting examples of such materials include, but are not limited to, buffers, diluents; carrier, package, container, vial and/or tube labels listing contents and/or instructions for use, and package inserts with instructions for use. A set of instructions will also typically be included.

A label can be on or associated with the container. A label can be on a container when letters, numbers or other characters forming the label are attached, molded or etched into the container itself; a label can be associated with a container when it is present within a receptacle or carrier that also holds the container, e.g., as a package insert. A label can be used to indicate that the contents are to be used for a specific analytical application. The label can also indicate directions for use of the contents, such as in the methods described herein.

The disclosure further provides that the methods and devices described herein can be further defined by the following aspects (aspects 1 to 40):

1. A mass spectrometry (MS)-cleavable heterobifunctional photoactivated cross-linker comprising:
   a photo-activatable reactive chemical group;
   a N-Hydroxysuccinimide (NHS) group, a hydrazine group, or a maleimide group;
   a sulfoxide group; and
   a MS-cleavable bond;
   wherein the MS-cleavable cross-linker is configured for mapping intra-protein interactions in a protein, or inter-protein interactions in a protein complex, or combinations thereof.

2. The MS-cleavable heterobifunctional photoactivated cross-linker of aspect 1, wherein the photo-activatable reactive chemical group is a group selected from an optionally substituted aryl azide, an optionally substituted azido-methyl-coumarin, an optionally substituted benzophenone, an optionally substituted anthraquinone, am optionally substituted diazo compound, an optionally substituted diazirine, and an optionally substituted psoralen derivative.

3. The MS-cleavable heterobifunctional photoactivated cross-linker of or aspect 2, wherein the optionally substituted aryl azide is selected from a phenyl azide, a hydroxyphenyl azide, a fluorophenyl azide or a nitrophenyl azide.

4. The MS-cleavable heterobifunctional photoactivated cross-linker of aspect 3, wherein the optionally substituted aryl azide has a structure selected from:

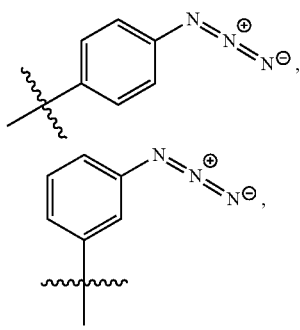

-continued

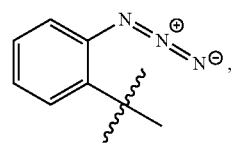

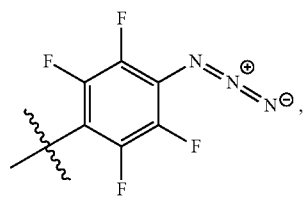

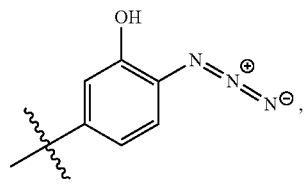

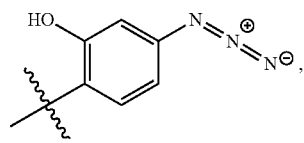

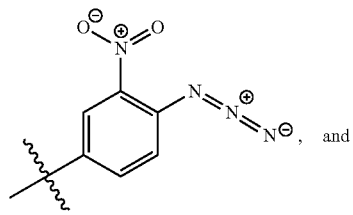

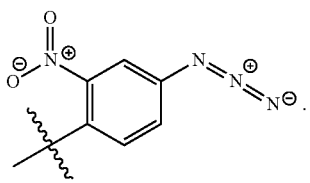

5. The MS-cleavable heterobifunctional photoactivated cross-linker of or aspect 2, wherein the optionally substituted azido-methyl-coumarin has the structure of:

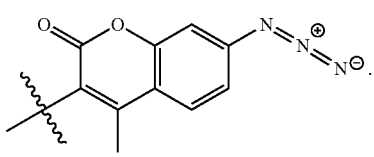 [SMILES: *c1c(C)c2ccc(N=[N+]=[N-])cc2oc1=O]

6. The MS-cleavable heterobifunctional photoactivated cross-linker of or aspect 2, wherein the optionally substituted psoralen derivative has the structure of:

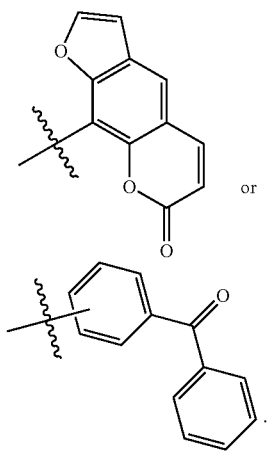

or

.

7. The MS-cleavable heterobifunctional photoactivated cross-linker of or aspect 2, wherein the optionally substituted diazirine has the structure of:

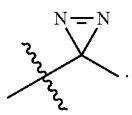

.

8. The MS-cleavable heterobifunctional photoactivated cross-linker of aspect 1, wherein the photo-activatable reactive chemical group is an optionally substituted diazirine group that forms a carbene and/or a diazo intermediate when exposed to ultraviolet light.

9. The MS-cleavable heterobifunctional photoactivated cross-linker of any one of the preceding aspects, wherein the MS-cleavable bond is a C—S bond adjacent to the at least one sulfoxide group.

10. The MS-cleavable heterobifunctional photoactivated cross-linker of any one of the preceding aspects, wherein the mass spectrometry (MS)-cleavable heterobifunctional photoactivated cross-linker further comprises an asymmetric spacer arm,
   wherein one end of the asymmetric spacer arm comprises the NHS group, the hydrazine group, or the maleimide group, and wherein the other end of the asymmetric spacer arm comprises the photo-activatable reactive chemical group; and
   wherein the sulfoxide group is centrally located on the asymmetric spacer arm.

11. The MS-cleavable heterobifunctional photoactivated cross-linker of aspect 10, wherein the MS-cleavable heterobifunctional photoactivated cross-linker has the structure of Formula (I):

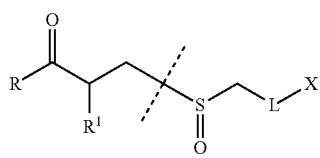

Formula I wherein,
R is selected from:

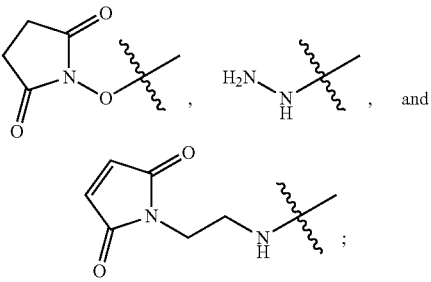

, and

;

$R^1$ is H or an optionally substituted $(C_1-C_6)$alkyl;
L is selected from an optionally substituted $(C_1-C_6)$ alkyl, $R^2$—NH—C(O)—$R^3$, and $R^2$—C(O)—NH—$R^3$;
$R^2$ and $R^3$ are independently selected $(C_1-C_6)$alkyls;
X is a photo-activatable reactive chemical group; and
wherein the dashed line indicates a MS-cleavable bond.

12. The MS-cleavable heterobifunctional photoactivated cross-linker of aspect 11, wherein X is selected from an aryl azide, an azido-methyl-coumarin, a benzophenone, an anthraquinone, a diazo compound, a diazirine, and a psoralen derivative.

13. The MS-cleavable heterobifunctional photoactivated cross-linker of aspect 12, wherein X is a phenyl azide, a hydroxyphenyl azide, a fluorophenyl azide or a nitrophenyl azide.

14. The MS-cleavable heterobifunctional photoactivated cross-linker of aspect 13, wherein the X has a structure selected from:

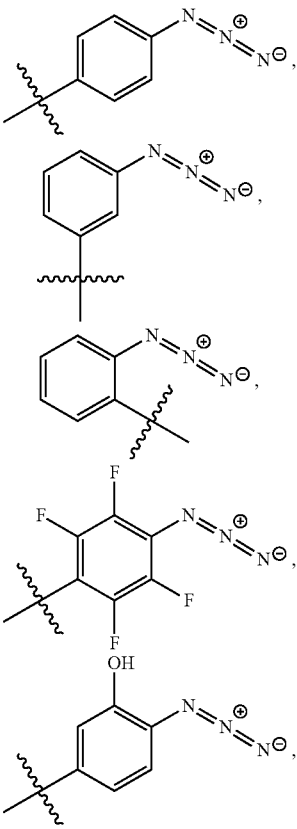

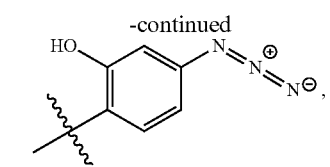

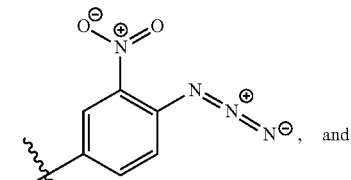, and

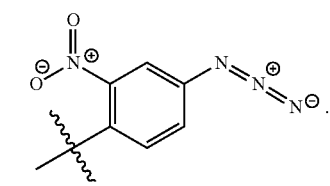

15. The MS-cleavable heterobifunctional photoactivated cross-linker of or aspect 12, wherein X has the structure of:

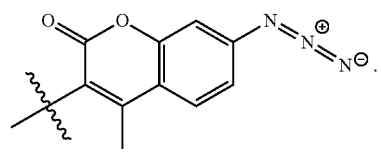

16. The MS-cleavable heterobifunctional photoactivated cross-linker of or aspect 12, wherein the X has the structure of:

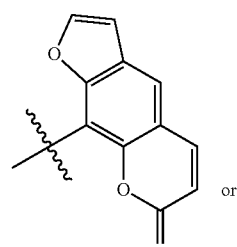 or

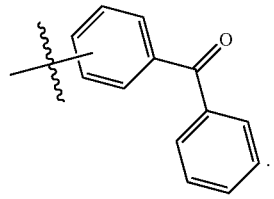

17. The MS-cleavable heterobifunctional photoactivated cross-linker of aspect 11 or aspect 12, wherein the MS-cleavable heterobifunctional photoactivated cross-linker has the structure of Formula I(a):

Formula I(a)

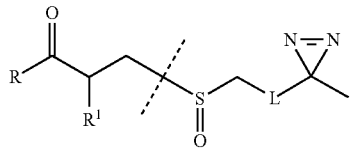

wherein,

R is selected from:

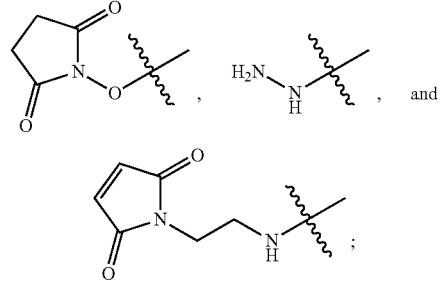

$R^1$ is H or an optionally substituted $(C_1\text{-}C_6)$alkyl;

L is selected from an optionally substituted $(C_1\text{-}C_6)$ alkyl, $R^2$—NH—C(O)—$R^3$, and $R^2$—C(O)—NH—$R^3$;

$R^2$ and $R^3$ are independently selected $(C_1\text{-}C_6)$alkyls; and wherein the dashed line indicates a MS-cleavable bond.

18. The MS-cleavable heterobifunctional photoactivated cross-linker of aspect 17, wherein the MS-cleavable heterobifunctional photoactivated cross-linker has the structure of Formula I(b):

Formula I(b)

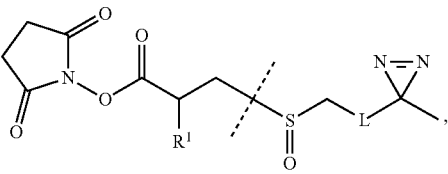

wherein, $R^1$ is H or an optionally substituted $(C_1\text{-}C_6)$alkyl;

L is selected from an optionally substituted $(C_1\text{-}C_6)$ alkyl, $R^2$—NH—C(O)—$R^3$, and $R^2$—C(O)—NH—$R^3$;

$R^2$ and $R^3$ are independently selected $(C_1\text{-}C_6)$alkyls; and wherein the dashed line indicates a MS-cleavable bond.

19. The MS-cleavable heterobifunctional photoactivated cross-linker of aspect 17 or aspect 18, wherein the MS-cleavable heterobifunctional photoactivated cross-linker has a structure selected from:

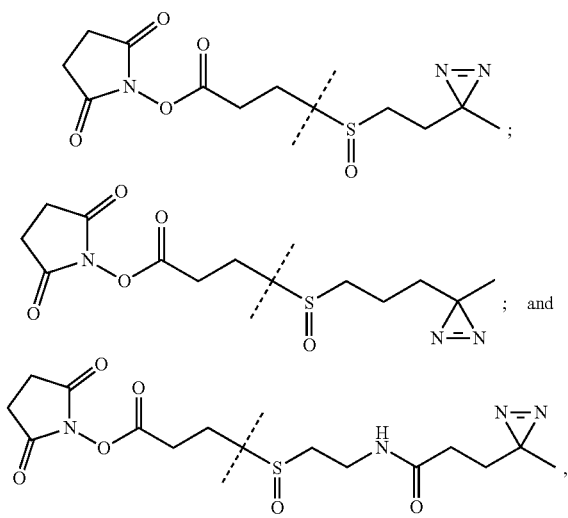

wherein the dashed line indicates a MS-cleavable bond.

20. A method for mapping intra-protein interactions in a protein, inter-protein interactions in a protein complex, or combinations thereof, the method comprising:
contacting the protein and/or the protein complex with the MS-cleavable heterobifunctional photoactivated cross-linker of any one of aspects 1 to 19 to form a first linked product;
exposing the first linked product to ultraviolet light to form a crosslinked product;
digesting the crosslinked product with one or more enzymes to form peptide fragments;
identifying the one or more peptide fragments using tandem mass spectrometry ($MS^n$), thereby mapping intra-protein interactions in the protein and/or inter-protein interactions in the protein complex.

21. The method of aspect 20, wherein the protein and/or the protein complex are contacted with the MS-cleavable heterobifunctional photoactivated cross-linker at a molar ratio of 1:5 to 1:500 (protein:crosslinker).

22. The method of aspect 21, wherein the protein and/or the protein complex are contacted with the MS-cleavable heterobifunctional photoactivated cross-linker at a molar ratio of 1:10 to 1:100 (protein:crosslinker).

23. The method of aspect 22, wherein the protein and/or the protein complex are contacted with the MS-cleavable heterobifunctional photoactivated cross-linker at a molar ratio of 1:20 to 1:80 (protein:crosslinker).

24. The method of any one of aspects 20 to 23, wherein the first linked product is exposed to ultraviolet light at a wavelength of 250 nm to 400 nm for at least 1 minute at 0° C. to 15° C.

25. The method of aspect 24, wherein the first linked product is exposed to ultraviolet light at a wavelength of 320 nm to 380 nm for 15 minutes to 45 minutes at 0° C. to 15° C.

26. The method of any one of aspects 20 to 25, wherein the crosslinked product is reduced/alkylated and digested with one or more proteases to form peptide fragments.

27. The method of aspect 26, wherein the crosslinked product is reduced/alkylated using dithiothreitol (DTT).

28. The method of aspect 26 or aspect 27, wherein the crosslinked product is digested with Lys-C/trypsin and/or chymotrypsin.

29. The method of any one of aspects 20 to 28, wherein prior to the use of $MS^n$, the peptide fragments are enriched by using size-exclusion chromatography.

30. A method for cross-linking mass spectrometry (XL-MS) for identifying one or more cross-linked peptides, the method comprising:
contacting the protein and/or the protein complex with the MS-cleavable heterobifunctional photoactivated cross-linker of any one of aspects 1 to 19 to form a first linked product;
exposing the first linked product to ultraviolet light to form a crosslinked product;
digesting the crosslinked product with one or more enzymes to form peptide fragments, wherein the peptide fragments are chemically cross-linked to the MS-cleavable heterobifunctional photoactivated cross-linker;
performing a liquid chromatography-tandem mass spectrometry (LC-$MS^n$) analysis on the one or more cross-linked peptides, wherein the LC-$MS^n$ analysis comprises:
detecting the one or more cross-linked peptides by $MS^1$ analysis;
selecting the one or more cross-linked peptides detected by $MS^1$ for $MS^2$ analysis;
selectively fragmenting the at least one CID cleavable bond and separating the one or more cross-linked peptides during $MS^2$ analysis;
sequencing the one or more cross-linked peptides separated during $MS^2$ analysis by $MS^3$ analysis; and
integrating data obtained during $MS^1$, $MS^2$ and $MS^3$ analyses to identify the one or more cross-linked peptides.

31. The method of aspect 30, wherein the protein and/or the protein complex are contacted with the MS-cleavable heterobifunctional photoactivated cross-linker in a light excluded environment.

32. The method of aspect 30 or aspect 31, wherein the protein and/or the protein complex are contacted with the MS-cleavable heterobifunctional photoactivated cross-linker at a molar ratio of 1:5 to 1:500 (protein:crosslinker).

33. The method of aspect 32, wherein the protein and/or the protein complex are contacted with the MS-cleavable heterobifunctional photoactivated cross-linker at a molar ratio of 1:10 to 1:100 (protein:crosslinker).

34. The method of aspect 33, wherein the protein and/or the protein complex are contacted with the MS-cleavable heterobifunctional photoactivated cross-linker at a molar ratio of 1:20 to 1:80 (protein:crosslinker).

35. The method of any one of aspects 30 to 34, wherein the first linked product is exposed to ultraviolet light at a wavelength of 250 nm to 400 nm for at least 1 minute at 0° C. to 15° C.

36. The method of any one of aspect 35, wherein the first linked product is exposed to ultraviolet light at a wavelength of 320 nm to 380 nm for 15 minutes to 45 minutes at 0° C. to 15° C.

37. The method of any one of aspects 30 to 36, wherein the crosslinked product is reduced/alkylated and digested with one or more proteases to form peptide fragments.

38. The method of aspect 37, wherein the crosslinked product is reduced/alkylated using dithiothreitol (DTT).

39. The method of aspect 37 or aspect 38, wherein the crosslinked product is digested with Lys-C/trypsin and/or chymotrypsin.

40. The method of any one of aspects 30 to 39, wherein prior to the use of MS", the peptide fragments are enriched by using size-exclusion chromatography.

The following examples are intended to illustrate but not limit the disclosure. While they are typical of those that might be used, other procedures known to those skilled in the art may alternatively be used.

EXAMPLES

Materials and Reagents. All chemicals were purchased from Sigma-Aldrich, Acros Organics, Alfa Aesar, TCI, VWR International or Fisher Scientific and used without further purification. Deuterated solvents were purchased from Cambridge Isotope Laboratories. Solvents were purchased as ACS grade or better and as HPLC-grade and passed through a solvent purification system equipped with activated alumina columns prior to use.

Synthesis and Characterization of SDASO Cross-linkers. All reactions were carried out in oven-dried glassware, under an atmosphere of argon unless otherwise noted. Reactions were monitored by thin layer chromatography (TLC) or electrospray ionization mass spectrometry (ESI-MS). Thin layer chromatography (TLC) was carried out using glass plates coated with a 250 μm layer of 60 Å silica gel. TLC plates were visualized with a UV lamp at 254 nm, or by staining with potassium permanganate, cerium molybdate, or ninhydrin. ESI-MS was analyzed in positive mode with flow injection. Liquid chromatography was performed using a Teledyne ISCO CombiFlash® forced flow with an automated purification system on prepacked silica gel ($SiO_2$) columns or prepacked C18 columns. Proton NMRs were recorded at 500 MHz or 600 MHz using either a Bruker DRX500 (cryoprobe) or a Bruker AVANCE600 (cryoprobe) NMR, respectively. Carbon NMRs were recorded at 126 MHz or 151 MHz on the Bruker DRX500 or Bruker AVANCE600 NMR, respectively. All NMRs were taken at 25° C. Chemical shifts (δ) are reported in parts per million (ppm) and referenced to residual solvent peak at 7.26 ppm (1H) or 77.16 ppm (13C) for deuterated chloroform (CDCl3), 2.50 ppm (1H) or 39.52 ppm (13C) for deuterated dimethyl sulfoxide (DMSO-$d_6$), 3.31 ppm (1H) or 49.00 ppm (13C) for deuterated methanol ($CD_3OD$). NMR data are reported as the following: chemical shift, multiplicity (s=singlet, d=doublet, t=triplet, q=quartet, m=multiplet, br=broad), coupling constants (J) in hertz (Hz), and integration. High-resolution mass spectrometry (HRMS) was performed using a Waters LCT Premier TOF spectrometer with ESI source.

SDASO-S

2-(3-Methyl-3H-diazirin-3-yl)ethyl 4-methylbenzenesulfonate (S1)

As shown in FIG. 1A, the starting material, 4-hydroxy-2-butanone (3.0 mL, 34.5 mmol, 1.0 equiv), was cooled to 0° C. and then 7N $NH_3$ in MeOH (35 mL) was added dropwise. After stirring for 3 h at 0° C., a solution of hydroxylamine-O-sulfonic acid ($H_2NOSO_3H$; 4.25 g, 37.5 mmol, 1.1 equiv) in MeOH (15 mL) was added dropwise then solution was allowed to warm to rt. After stirring for 17 h the reaction solution was concentrated in vacuo. Next, $NEt_3$ (7.5 mL, 53.8, 1.6 equiv) was added to a solution of the residue in MeOH (25 mL) at 0° C. After stirring for 10 min at 0° C., iodine was added in aliquots until a dark brown color persisted in the solution. The reaction solution was diluted in EtOAc, washed with 1.0 M aq. HCl, sat. aq. $Na_2S_2O_3$ solution, and brine. Finally, the combined organic phase was dried over $MgSO_4$ and concentrated in vacuo. The resulting crude product was dissolved in pyridine (10.0 mL, 124 mmol, 3.6 equiv) and cooled to 0° C. Next, p-toluenesulfonyl chloride (TsCl; 1.86 g, 10.0 mmol, 0.3 equiv) was added to the solution. After stirring for 1 h at rt, the reaction solution was diluted with EtOAc, washed with 1N HCl, a sat. aq. $NaHCO_3$ solution, and brine. The combined organic phase was then dried over $MgSO_4$ and concentrated in vacuo. The resulting residue was purified by flash chromatography (15% EtOAc in hexanes) to obtain tosylate S1 (971 mg, 11% over two steps). S1: 1H NMR (500 MHz, CDCl3): δ 7.82 (d, J=8.5 Hz, 2H), 7.36 (d, J=8.5 Hz, 2H), 3.96 (t, J=6.4 Hz, 2H), 2.46 (s, 3H), 1.67 (t, J=6.4 Hz, 2H), 1.00 (s, 3H); 13C NMR (126 MHz, CDCl3): δ 145.2, 132.9, 130.1, 128.1, 65.2, 34.3, 23.5, 21.8, 19.9. Spectral data were consistent with those previously reported for the compound 1

Methyl 3-((2-(3-methyl-3H-diazirin-3-yl)ethyl)thio)propanoate (S2)

As shown in FIG. 1A, $K_2CO_3$ (477 mg, 3.5 mmol, 1.5 equiv) was added to a solution of tosylate S1 (579 mg, 2.3 mmol, 1.0 equiv,) and methyl-3-mercaptopropionate (0.50 mL, 4.6 mmol, 2 equiv) in MeOH (2.3 mL). After stirring for 3 h at rt, the reaction solution was filtered to remove solids. The filtrate was concentrated in vacuo and the resulting residue was purified by flash chromatography (20% EtOAc in hexanes) to obtain ester S2 (408 mg, 88%). S2: $^1$H NMR (500 MHz, CDCl3): δ 3.70 (s, 3H), 2.73 (t, J=7.4 Hz, 2H), 2.56 (t, J=7.4 Hz, 2H), 2.35 (t, J=8.0 Hz, 2H), 1.61 (t, J=8.0 Hz, 2H), 1.02 (s, 3H); $^{13}$C NMR (126 MHz, $CDCl_3$): δ 172.3, 51.9, 34.64, 34.61, 27.1, 26.6, 25.3, 19.9; HRMS (ESI, MeOH) m/z: $[M+Na]^+$ calcd for $C_8H_{14}N_2O_2SNa$ 225.0669, found 225.0677.

3-((2-(3-Methyl-3H-diazirin-3-yl)ethyl)thio)propanoic acid (S3)

As shown in FIG. 1A, LiOH·$H_2O$ (79 mg, 1.9 mmol, 1.0 equiv) was added to a solution of ester S2 (382 mg, 1.9 mmol, 1.0 equiv) in THF:$H_2O$ (4:1, 12.7 mL). After stirring at rt for 1 h, an additional aliquot of LiOH·$H_2O$ (79 mg, 1.9 mmol, 1.0 equiv) was added. After stirring for an additional 2 h at rt, the reaction mixture was partitioned between hexanes and $H_2O$. The aqueous phase was acidified to pH=1 with 1N HCl and extracted with EtOAc five times. The combined organic layers were dried with $MgSO_4$, and concentrated in vacuo. The crude product (acid S3) was subjected to the next step without further purification.

2,5-Dioxopyrrolidin-1-yl 3-((2-(3-methyl-3H-diazirin-3-yl)ethyl)thio)propanoate (S4)

As shown in FIG. 1A, N-hydroxysuccinimide (NHS-H; 219 mg, 1.9 mmol, 1.0 equiv) was added to a solution of acid S3 (358 mg, 1.9 mmol, 1.0 equiv) in $CH_2Cl_2$ (4.0 mL) followed by addition of 1-(3-dimethylaminopropyl)-3-ethylcarbodiimide hydrochloride (EDC·HCl; 401 mg, 2.1 mmol, 1.1 equiv). After stirring at rt for 16 h, the reaction solution was diluted in $CH_2Cl_2$, washed with $H_2O$, then brine. The combined organic phase was dried with $MgSO_4$ and concentrated in vacuo. The resulting residue was purified by flash chromatography (50% EtOAc in hexanes) to obtain NHS ester S4 (308 mg containing 5 wt % EtOAc by 1H NMR, 292 mg, 54% over two steps). S4: $^1$H NMR (500

MHz, CDCl3): δ 2.93-2.78 (m, 8H), 2.42 (t, J=8.0, 2H), 1.65 (t, J=8.0, 2H), 1.05 (s, 3H); $^{13}$C NMR (126 MHz, CDCl$_3$): δ 169.0, 167.2, 34.6, 32.1, 26.9, 26.6, 25.7, 25.3, 19.9.

2,5-Dioxopyrrolidin-1-yl 3-((2-(3-methyl-3H-diazirin-3-yl)ethyl)sulfinyl)propanoate (SDASO-S)

Finally, as shown in FIG. 1A, 30% aq. H$_2$O$_2$ (72 µL, 0.70 mmol, 2.0 equiv) was added to a solution of NHS ester S4 (100 mg, 0.35 mmol, 1.0 equiv) in 1,1,1,3,3,3-hexafluoro-2-propanol (HFIP; 0.9 mL). After stirring at rt for 20 min, the reaction was quenched with dimethyl sulfide (DMS; 0.15 mL) and the mixture was allowed to stir for an additional 10 min. The reaction mixture was concentrated in vacuo, partitioned between CHCl$_3$ and H$_2$O, and then the aqueous phase was extracted with CHCl$_3$. The combined organic phase was washed with H$_2$O and the combined aqueous phase was again extracted with CHCl$_3$. The combined organic phase was washed with brine, dried with MgSO$_4$, and concentrated in vacuo to obtain SDASO-S as a white solid (75 mg, 93% purity by 1H NMR, 70 mg, 66%). SDASO-S: $^1$H NMR (500 MHz, CDCl3): δ 3.21-3.05 (m, 3H), 3.01-2.91 (m, 1H), 2.84 (s, 4H), 2.65-2.56 (m, 1H), 2.56-2.47 (m, 1H), 1.95-1.79 (m, 2H), 1.09 (s, 3H); $^{13}$C NMR (126 MHz, CDCl3): δ 168.8, 167.1, 47.0, 46.2, 28.0, 25.7, 24.9, 24.2, 19.8; HRMS (ESI, MeOH) m/z: [M+Na]$^+$ calc'd for C$_{11}$H$_{15}$N$_3$O$_5$SNa 324.0625, found 324.0636.
SDASO-M 3-(3-Methyl-3H-diazirin-3-yl)propyl 4-methylbenzenesulfonate (S5)

Figure 1B:
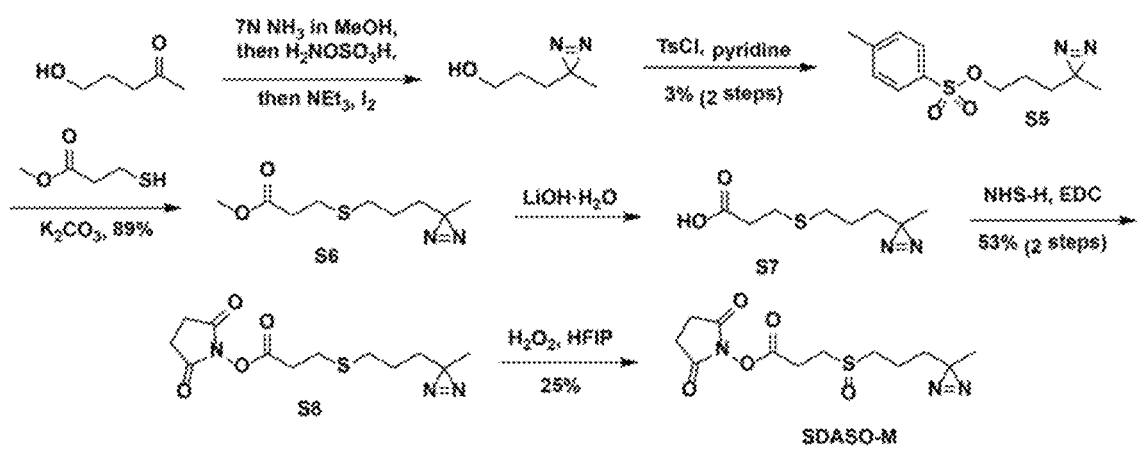

As shown in FIG. 1B, the staring material, 5-hydroxy-2-pentanone (1.5 mL, 14.6 mmol, 1.0 equiv), was cooled to 0° C. and 7N NH$_3$ in MeOH (15 mL) was added dropwise. After stirring for 3 h at 0° C., a solution of H$_2$NOSO$_3$H (1.90 g, 16.8 mmol, 1.15 equiv) in MeOH (12.4 mL) was added dropwise and the solution was allowed to warm to rt. After stirring for 17.5 h the reaction solution was concentrated in vacuo. Next, NEt$_3$ (3.3 mL, 23.4, 1.6 equiv) was added to a solution of the residue in MeOH (15 mL) at 0° C. After stirring for 10 min at 0° C., iodine was added in aliquots until a dark brown color persisted in the solution. The reaction solution was diluted in EtOAc, washed with 1.0 M aq. HCl, sat. aq. Na$_2$S$_2$O$_3$ solution, and brine. The combined organic phase was dried over MgSO4 and concentrated in vacuo. The resulting crude product was dissolved in pyridine (4.2 mL, 52.6 mmol, 3.6 equiv) and cooled to 0° C. Next, TsCl (835 mg, 4.38 mmol, 0.3 equiv) was added to the solution. After stirring for 1 h at rt, the reaction solution was diluted with EtOAc, washed with 1N HCl, a sat. aq. NaHCO$_3$ solution, and brine. The combined organic phase was dried over MgSO$_4$ and concentrated in vacuo. The resulting residue was purified by flash chromatography (0% to 15% EtOAc in hexanes) to obtain tosylate S5 (102 mg, 3% over two steps). S5: $^1$H NMR (500 MHz, CDCl3): δ 7.75 (d, J=8.2 Hz, 2H), 7.33 (d, J=8.0 Hz, 2H), 3.97 (t, J=6.2 Hz, 2H), 2.43 (s, 3H), 1.55-1.42 (m, 2H), 1.42-1.31 (m, 2H), 0.95 (s, 3H); $^{13}$C NMR (126 MHz, CDCl$_3$): δ 145.0, 133.0, 130.0, 127.9, 69.5, 30.4, 25.1, 23.6, 21.7, 19.8.

Methyl 3-((3-(3-methyl-3H-diazirin-3-yl)propyl)thio)propanoate (S6)

As shown in FIG. 1B, K$_2$CO$_3$ (79 mg, 0.57 mmol, 1.5 equiv) was added to a solution of tosylate S5 (102 mg, 0.38 mmol, 1.0 equiv,) and methyl-3-mercaptopropionate (84 µL, 0.76 mmol, 2 equiv) in MeOH (0.4 mL). After stirring for 3 h at rt, the reaction mixture was filtered to remove solids. The filtrate was concentrated in vacuo and the resulting residue was purified by flash chromatography (0% to 20% EtOAc in hexanes) to obtain ester S6 (95 mg, containing 6 wt % of EtOAc and 17 wt % methyl-3-mercaptopropionate by $^1$H NMR; 73 mg, 89%). S6: $^1$H NMR (500 MHz, CDCl$_3$): δ 3.69 (s, 3H), 2.81-2.72 (m, 2H), 2.59 (t, J=7.3 Hz, 2H), 2.53-2.45 (m, 2H), 1.51-1.41 (m, 2H), 1.00 (s, 3H).

3-((3-(3-Methyl-3H-diazirin-3-yl)propyl)thio)propanoic acid (S7)

As shown in FIG. 1B, LiOH·H$_2$O (16 mg, 0.38 mmol, 1.05 equiv) was added to a solution of ester S6 (73 mg, 0.36 mmol, 1.0 equiv) in THF:H$_2$O (4:1, 2.5 mL). After stirring at rt for 1 h, an additional aliquot of LiOH·H$_2$O (16 mg, 0.38 mmol, 1.05 equiv) was added. After stirring for an additional 2 h at rt, the reaction mixture was partitioned between hexanes and H$_2$O. The aqueous phase was acidified to pH=1 with 1N HCl and extracted with EtOAc five times. The combined organic layers were dried with MgSO$_4$, and concentrated in vacuo. The crude product (acid S7) was subjected to the next step without further purification.

2,5-Dioxopyrrolidin-1-yl 3-((3-(3-methyl-3H-diazirin-3-yl)propyl)thio)propanoate (S8)

As shown in FIG. 1B, NHS-H (40 mg, 0.35 mmol, 1.0 equiv) was added to a solution of crude acid S7 (70 mg, 0.35 mmol, 1.0 equiv) in CH$_2$Cl$_2$ (0.7 mL) followed by an addition of EDC·HCl (74 mg, 0.39 mmol, 1.1 equiv). After stirring at rt for 15 h, the reaction solution was diluted in CH$_2$Cl$_2$, washed with H$_2$O, then brine. The combined organic phase was dried with MgSO$_4$ and concentrated in vacuo to obtain crude NHS ester S8 (56 mg). S8: $^1$H NMR (500 MHz, CDCl3): δ 2.95-2.76 (m, 8H), 2.54-2.41 (m, 2H), 1.48-1.37 (m, 4H), 0.99 (s, 3H); $^{13}$C NMR (126 MHz, CDCl3): δ 169.1, 167.2, 33.3, 32.1, 31.6, 26.3, 25.7, 25.5, 24.0, 19.9.

2,5-Dioxopyrrolidin-1-yl 3-((3-(3-methyl-3H-diazirin-3-yl)propyl)sulfinyl)propanoate (SDASO-M)

Finally, as shown in FIG. 1B, 30% aq. H$_2$O$_2$ (38 µL, 0.37 mmol, 2.0 equiv) was added to a solution of crude NHS ester S8 (56 mg, 0.19 mmol, 1.0 equiv) in HFIP (0.5 mL). After stirring at rt for 20 min, the reaction was quenched with dimethyl sulfide (DMS; 80 µL) and the solution was allowed to stir for an additional 10 min. The reaction mixture was concentrated in vacuo, then partitioned between CHCl$_3$ and H$_2$O and the aqueous phase was extracted CHCl$_3$. The combined organic phase was washed with H$_2$O and the combined aqueous phase was again extracted with CHCl$_3$. The combined organic phase was washed with brine, dried with MgSO$_4$, and concentrated in vacuo to obtain crude SDASO-M (15 mg). SDASO-M: $^1$H NMR (500 MHz, CDCl$_3$): δ 3.23-2.92 (m, 4H), 2.85 (s, 4H), 2.77-2.57 (m, 2H), 1.82-1.62 (m, 2H), 1.62-1.43 (m, 2H), 1.04 (s, 3H); $^{13}$C NMR (126 MHz, CDCl3): δ 168.8, 167.2, 51.7, 46.0, 33.4, 25.72, 25.69, 24.2, 19.7, 17.8.
SDASO-L 3-(3-Methyl-3H-diazirin-3-yl)propanoic acid (S9)

Figure 7A:
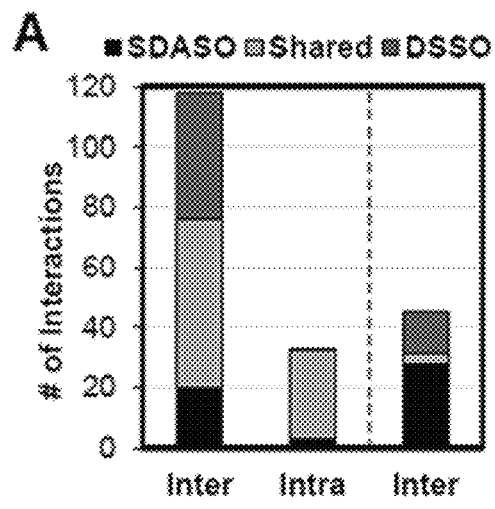
FIG. 7A-E provides XL-PPI Analysis of the Yeast 26S proteasome. (A) Comparison of the total number of SDASO and DSSO XL-PPIs (inter- and intra-subunit) within the 26S Proteasome itself and with proteasome interaction proteins (PIPs). (B) Distribution of the total number of SDASO and DSSO inter-subunit interactions within the 26S proteasome. (C) Comparison of the distribution of SDASO and DSSO XL-PPIs among the six types of inter- and intra-subcomplex interactions within the 26S proteasome. (D) SDASO and (E) DSSO XL-PPI networks of the 26S proteasome and its interacting proteins, in which protein nodes are colored as follows: 19S lid subunits (light gray), 19S base subunits (light-medium gray), 20S α subunits (lightest gray), 20S β subunits (medium gray), known PIPs (dark gray), and novel PIPs (light gray). The edges are colored as: 19S lid-lid (medium gray), 19S base-base (medium-light gray), 19S lid-base (dark gray), 19S lid-20S core (lighter gray), 19S base-20S core (light gray), 20S-20S (lighter gray), and 26S-PIP (black).

As shown in FIG. 1C, 7N NH$_3$ in MeOH (14.8 mL) was added to a solution of levulinic acid (2.0 mL, 19.5 mmol, 1.0 equiv) in MeOH (4.5 mL, 4.30 M) cooled to 0° C. After stirring for 3 h at 0° C., a solution of $H_2NOSO_3H$ (2.54 g, 22.4 mmol, 1.15 equiv) in MeOH (13 mL) was added and the reaction was allowed to warm to rt. The milky white solution was concentrated in vacuo after stirring for 19 h. Next, $NEt_3$ (4.7 mL, 33.6 mmol, 1.5 equiv) was added to a solution of the white oil in MeOH (14 mL) at 0° C. After stirring for 10 min at 0° C., iodine was added in aliquots (10.2 g, 40.3 mmol, 1.8 equiv) until a dark brown color persisted in the solution. The brown mixture was diluted in EtOAc, washed with 1.0 M aq. HCl, sat. aq. $Na_2S_2O_3$ solution, and brine. The aqueous phases were combined and extracted three times with EtOAc. The combined organic phase was dried over $Na_2SO_4$ and concentrated in vacuo to obtain a yellow solid which was subject to the next reaction without further purification. Spectral data were consistent with those previously reported for the compound 2.

2,5-Dioxopyrrolidin-1-yl 3-(3-methyl-3H-diazirin-3-yl)propanoate (S10)

As shown in FIG. 1C, trifluoroacetic anhydride (TFAA; 4.1 mL, 29.4 mmol, 2.0 equiv) was added dropwise to a solution of acid S9 (1.88 g, 14.7 mmol, 1.0 equiv), NHS-H (3.38 g, 29.4 mmol, 2.0 equiv), and N,N-diisopropylethylamine (DIPEA; 10.2 mL, 58.7 mmol, 4.0 equiv) in DMF (75.0 mL, 0.20 M) cooled to 0° C. The orange solution was stirred for 3 h at 0° C., and then partitioned between EtOAc and brine. The organic phase was washed with brine five times, dried over $Na_2SO_4$, and concentrated in vacuo to obtain an orange oil. The oil was purified by flash chromatography (20 to 70% EtOAc in hexanes) to obtain NHS ester S10 as a tan powder (1.65 g, 50% over two steps). Spectral data were consistent with those previously reported for the compound.

N-(2-mercaptoethyl)-3-(3-methyl-3H-diazirin-3-yl) propenamide (S11)

As shown in FIG. 1C, NHS ester S10 (1.00 g, 4.44 mmol, 1.0 equiv) was added to a solution of 2-aminoethanethiol (343 mg, 4.44 mmol, 1.0 equiv) in $CH_2Cl_2$ (22.2 mL, 0.20 M). After stirring for 20 min at rt, the reaction solution was concentrated in vacuo. The crude product (thiol S11) was subject to the next step without further purification.

2,5-Dioxopyrrolidin-1-yl acrylate (S12)

As shown in FIG. 1C, $NEt_3$ (6.30 mL, 45.0 mmol, 1.0 equiv) was added to a solution of NHS-H (5.18 g, 45.0 mmol, 1.0 equiv) in $CH_2Cl_2$ (90 mL, 0.50 M) cooled to 0° C. followed by an addition of acryloyl chloride (4.0 mL, 49.5 mmol, 1.1 equiv). The reaction was stirred for 3 h at 0° C., and then vacuum filtered to collect the white precipitate. The filtrate was washed with $H_2O$ then brine, dried over $Na_2SO_4$, and concentrated in vacuo to obtain NHS ester S12 as a white solid (5.52 g, 72%). Spectral data were consistent with those previously reported for the compound 3.

2,5-Dioxopyrrolidin-1-yl 3-((2-(3-(3-methyl-3H-diazirin-3-1) propanamido)ethyl)thio)propanoate (S13)

As shown in FIG. 1C, a solution of thiol S11 (832 mg, 4.44 mmol, 1.0 equiv) in $CH_2Cl_2$ (22.2 mL, 0.20 M) was added to NHS ester S12 (751 mg, 4.44 mmol, 1.0 equiv) followed by an addition of $NEt_3$ (0.680 mL, 4.88 mmol, 1.1 equiv). After stirring at rt for 20 min, the reaction solution was washed with $H_2O$ then brine, dried with $Na_2SO_4$, and concentered in vacuo. The crude mixture was purified by flash chromatography (20 to 100% EtOAc in hexanes) to obtain sulfide S13 (887 mg, 56% over two steps). S13: $^1H$ NMR (500 MHz, $CDCl_3$): δ 6.32 (s, br, 1H), 3.42 (q, J=6.0 Hz, 2H), 2.96-2.80 (m, 8H), 2.70 (t, J=6.0 Hz, 2H), 2.00 (t, J=7.7 Hz, 2H), 1.72 (t, J=7.7 Hz, 2H), 1.00 (s, 3H); $^{13}C$ NMR (125 MHz, CDCl3): δ 171.7, 169.2, 167.3, 38.4, 32.4, 32.2, 30.6, 30.1, 26.5, 25.7, 25.6, 20.0; HRMS (ESI, MeOH) m/z calcd for $C_{14}H_2ON_4O_5SNa$ (M+Na)$^+$ 379.1047, found 379.1043.

2,5-Dioxopyrrolidin-1-yl 3-((2-(3-(3-methyl-3H-diazirin-3-yl)propanamido)ethyl)sulfinyl) propanoate (SDASO-L)

Finally, as shown in FIG. 1C, 30% aq. $H_2O_2$ solution (0.11 mL, 1.11 mmol, 2.0 equiv) was added to a solution of sulfide S12 (200 mg, 0.561 mmol, 1.0 equiv) in HFIP (2.80 mL, 0.20 M). The reaction was stirred for 10 min at rt, and then quenched with DMS (0.20 mL) and the mixture was concentrated in vacuo to obtain the cross linker SDASO (247 mg containing 23 wt % HFIP and 4 wt % DMSO; 181 mg, 87%). SDASO: $^1H$ NMR (600 MHz, $CDCl_3$): δ 6.77 (s, br, 1H), 3.85-3.65 (m, 2H), 3.20-3.04 (m, 4H), 2.95-2.80 (m, 4H), 2.63 (s, 4H), 2.04 (t, J=7.6 Hz, 2H), 1.73 (t, J=7.6 Hz, 2H), 1.01 (s, 3H); $^{13}C$ NMR (151 MHz, $CDCl_3$): δ 172.6, 168.9, 167.0, 51.3, 45.9, 34.4, 30.6, 30.0, 25.7, 25.6, 24.3, 19.9; HRMS (ESI, MeOH) m/z calcd for $C_{14}H_2ON_4O_6SNa$ (M+Na)$^+$ 395.0996, found 395.0995.

Purification of the Yeast 26S Proteasome Complexes. PN11-TAP strain was used for yeast proteasome purification as previously described in Wang et al. (*Sci Signal* 3:ra88 (2010)). Briefly, the yeast strain was cultured in YEPD medium (1% yeast extract, 2% peptone, and 2% dextrose) at 30° C. until stationary phase, then the cells were collected and washed with ice-cold water. The yeast cells were loaded into 20 mL syringe and pushed into liquid nitrogen to get yeast frozen "noodles" which were ground in a Cryomill into frozen powder. The yeast frozen powder was resuspended in a lysis buffer containing 50 mM Sodium phosphate (pH 8.0), 5 mM magnesium chloride, 1 mM ATP, 1× protease inhibitor (Sigma), then sonicated at 15 watts with 30 s on and 30 s off for three cycles and pellet was spun down at 15,000 rpm for 15 min. The supernatant was bound to IgG resin (MP Biomedical #55961) for 2 hours at 4° C. with rotation. The IgG resin was washed with 50 bed volume of wash buffer (50 mM Sodium phosphate (pH 7.4), 100 mM NaCl, 5 mM magnesium chloride, 1 mM ATP, then 20 bed volume of TEV cleavage buffer (50 mM Sodium phosphate (pH 7.4), 10% glycerol, 1 mM EDTA, 1 mM DTT and 1 mM ATP and the bound proteasome was cleaved overnight with TEV at 4° C. The resulting proteasome was concentrated with 30K cutoff Centricon devices (EMD Millipore UFC903024).

Identification of Cross-linked Peptides. MSn data extraction and analysis were performed in the same way as previously described in Gutierrez et al. (*Proceedings of the National Academy of Sciences* 117:4088 (2020)). MS$^3$ data was subjected to a developmental version of Protein Prospector (v.6.0.0) for database searching, using Batch-Tag against limited to custom random concatenated databases. For BSA and the 26S proteasome data, the database consisted of BSA plus 493 *Saccharomyces cerevisiae* proteins (494 entries) with mass tolerances for parent ions and fragment ions set as ±20 ppm and 0.6 Da, respectively.

Trypsin or Chymotrypsin was set as the enzyme with three or four maximum missed cleavages allowed, respectively. A maximum of four variable modifications were allowed, including cysteine carbamidomethylation, protein N-terminal acetylation, methionine oxidation, and N-terminal conversion of glutamine to pyroglutamic acid. In addition, three defined modifications representing alkene on uncleaved lysines, thiol and sulfenic fragment moieties on any AAs were selected for each respective SDASO cross-linker. Specifically, for SDASO-L cross-links: alkene ($C_3H_2O$; +54 Da), sulfenic acid ($C_7H_{13}NO_2S$; +175 Da), and thiol ($C_7H_{11}NOS$; +157 Da). For SDASO-M cross-links: alkene ($C_3H_2O$; +54 Da), sulfenic acid ($C_5H_{10}OS$; +118 Da), and thiol ($C_5H_8S$; +100 Da). For SDASO-S cross-links: alkene ($C_3H_2O$; +54 Da), sulfenic acid ($C_4H_8OS$; +104 Da), and thiol ($C_4H_6S$; +86 Da). For DSSO cross-links, three defined modifications on uncleaved lysines are: alkene ($C_3H_2O$; +54 Da), sulfenic acid ($C_3H_4O_2S$; +104 Da), and thiol ($C_3H_2SO$; +86 Da). Due to the conversion of the SDASO sulfenic acid moiety to the thiol moiety alongside backbone fragmentation during $MS^3$ analysis, such neutral loss has been incorporated in Batch-tag to facilitate the identification of sulfenic acid-modified peptides during database searching using Protein prospector. The in-house program xl-Tools was used to validate and summarize cross-linked peptides based on $MS^n$ data and database searching. Following integration of $MS^n$ data, there were no decoy hits found in the final lists of identified cross-linked peptides for all XL-MS experiments except for the tryptic digests of SDASO-L cross-linked 26S proteasome with a FDR ≤0.08%. Raw data has been deposited at the PRIDE Archive proteomics data repository (ID: PXD022690).

Analysis of the Identified Cross-links. Circular 2-D XL-maps were constructed using the CX-Cirus online application (cx-circos.cloudapp.net) and linear 2-D XL-maps were created using the online application xiNET Crosslink Viewer (crosslinkviewer.org). 3-D maps were generated based on BSA (PDB: 4F5S), 26S proteasome structures (PDB:4CR2(s1), 4CR3(s2), 4CR4(s3), and 5MPD(s4)). The state-specific cross-links of the 26S proteasome were determined by mapping them onto s1-s4 state models.

Analysis of Amino Acid Preference for Diazirine Labeling. The unique K-X linkages identified for both BSA and 26S were used to determine diazirine labeling frequency at specific amino acids, in which only the peptide constituents labeled by diazirine were used for evaluation. The weighted occurrence values of diazirine labeled AAs were determined based on their localization precision, equal to 1 divided by the # of possible site locations (n) in the identified peptides. The resulting values for each AAs were summed to derive their labeling frequency by diazirine (see FIG. 26).

XL-MS Analysis of BSA and 26S Proteasomes. Protein cross-linking was performed similarly to those described in Gutierrez et al. 2018 (*Analytical chemistry* 90(12):7600-7607 (2018)) and Belsom et al. (*Molecular & cellular proteomics: MCP* 15(3):1105-16 (2016)) with some modifications. Briefly, for SDASO cross-linking of BSA, 50 µL of 50 µM protein solution in PBS buffer (pH 7.4) was reacted in triplicate with SDASO-L, SDASO-M or SDASO-S in molar ratio of 1:50, respectively, for 1 h at 25° C. in the dark. The NHS reactive ends were quenched with the addition of ammonium bicarbonate at a 50-fold excess for 10 minutes at 25° C. in the dark. Then NHS ester labeled proteins were transferred into Millipore Microcon Ultracel PL-30 (30-kDa filters) and washed 3 times with 300 µL PBS buffer. Diazirine cross-linking was activated by UV irradiation, which was carried out on ice ~5 cm from the light source in an UV light chamber (Analytikjena™ UVP Cross-linker CL-1000L) and irradiated at 365 nm for 30 mins.

The yeast 26S proteasome was affinity purified as described in Wang et al. (*Sci Signal* 3(151):ra88 2010) and cross-linked by SDASO linkers similarly as described above. Specifically, 100 µg of the 26S proteasome in PBS buffer (pH 7.4) was cross-linked in triplicate with 20 mM SDASO-L, SDASO-M and SDASO-S, respectively. In addition, 100 µg of the yeast 26S proteasome in PBS buffer (pH 7.4) was cross-linked with 2.5 mM or 5 mM DSSO for 1 hr at 25° C. temp similarly as described in Gutierrez et al. 2020 (*Proceedings of the National Academy of Sciences of the United States of America* 111(24):9455-60 (2020)), and the reactions were quenched with the addition of ammonium bicarbonate at a 50-fold excess for 10 minutes. Then cross-linked proteins were transferred into Millipore Microcon Ultracel PL-30 (30-kDa filters) for digestion.

Digestion of Cross-linked Proteins. The resulting cross-linked products were subjected to enzymatic digestion using a FASP protocol described in Wisniewski et al. (*Nat Methods* 6(5):359-62 (2009)). Briefly, cross-linked proteins on the filter-aided sample preparation (FASP) filters were reduced/alkylated, and digested with Lys-C/trypsin or chymotrypsin as described in Kao et al. (*Molecular & cellular proteomics: MCP* 10(1):M110.002212 (2011)) and Gutierrez et al. 2020. The resulting digests were desalted and cross-linked peptides were enriched by size-exclusion chromatography prior to LC $MS^n$ analysis.

LC-$MS^n$ Analysis and Identification of Cross-linked Peptides. Cross-linked peptides were analyzed by LC-$MS^n$ using a Thermo Scientific™ Dionex UltiMate 3000 system online coupled with an Orbitrap Fusion Lumos™ mass spectrometer. A 50 cm×75 µm Acclaim™ PepMap™ C18 column was used to separate peptides over a gradient of 1% to 25% ACN in 106 mins for BSA, and in 166 mins for the 26S proteasome at a flow rate of 300 nL/min. $MS^1$ scans (375-1500 m/z, resolution at 120,000) was performed with the AGC target set to 4e5 in top speed mode with a cycle time of 5 s. For $MS^n$ analysis, 3+ and up charged ions were selected for $MS^2$-CID in FT mode, followed by top 4 data-dependent $MS^3$ acquisition method. A targeted $MS^3$ acquisition was also used for DSSO cross-linked peptides by utilizing the mass difference between alkene- and thiol-modified ion pairs (31.9721 Da). For $MS^2$ scans, the resolution was set to 30,000, the AGC target 5e4, the precursor isolation width was 1.6 m/z, and the maximum injection time was 100 ms for CID. The CID-$MS^2$ normalized collision energy was 25%. For $MS^3$ scans, CID was used with a collision energy of 35%, the AGC target was set to 2e4, and the maximum injection time was set to 120 ms. $MS^n$ data were extracted using MSConvert (ProteoWizard 3.0.10738) and subjected to database searching using a developmental version of Protein Prospector (v.6.0.0). Cross-linked peptides were identified by the integration of $MS^n$ data with database search results using the in-house software xl-Tools.

Designs of MS-cleavable NHS-Diazirine Heterobifunctional Cross-linkers. In order to advance photoreactive cross-linkers for complex PPI mapping, novel sulfoxide-containing MS-cleavable NHS-diazirine heterobifunctional cross-linking reagents were developed to cross-link lysines to any nearby amino acids (AAs). Sulfoxide-containing MS-cleavable cross-linkers that are homobifunctional carry two symmetric MS-cleavable C—S bonds adjacent to the central sulfoxide (see FIG. 2A, E). This symmetry is not retained in heterobifunctional cross-linkers due to the structural differences in reactive groups and their targeted residues. The effects of spacer arm structures on MS-cleavability of sulfoxide-containing cross-linkers were examined. From which, an asymmetric spacer arm structure was found which maintains the characteristic and predictable fragmentation expected of symmetric sulfoxide-containing MS-cleavable cross-linkers. This unique asymmetric spacer arm region carries a sulfoxide group that divides the spacer arm into two halves, i.e., a fixed half identical to DSSO with the sulfoxide and carbonyl group separated by '3' bond lengths, and a flexible half Based on this design, three MS-cleavable heterobifunctional SDASO cross-linkers composed of a fixed NHS ester end and a flexible diazirine side were constructed with varying lengths from the center sulfoxide (i.e., long, 12.5 Å; medium, 10.2 Å; short, 7.7 Å), well within the distance range suited for studying PPIs (see FIG. 2B-D). The synthesis routes and chemical analyses of SDASOs are further detailed here (see FIG. 1).

Fragmentation Characteristics of SDASO Cross-linked Peptides. It was found with asymmetric sulfoxide-containing cross-linkers, that only the C—S bond at the NHS ester end in SDASO is preferentially cleaved during CID. Thus, a single pair of MS2 fragment ions is expected for all three SDASO cross-linkers (see FIG. 2F). For an SDASO inter-linked peptide (α-β), cleavage during CID physically separates the two cross-linked constituents and thus leads to the detection of two characteristic fragment ions (αA/βS) carrying remnants of SDASO. The αA fragment contains a cross-linked lysine modified with an alkene (A) moiety, whereas the βS fragment contains a photo-crosslinked amino acid modified with a sulfenic acid (S) moiety. Since the NHS ester side of all three SDASO reagents are identical to half of DSSO, the expected alkene moieties are the same as seen in DSSO cross-linked peptides (see FIG. 2E). In contrast, the three SDASO cross-linkers yield three different sulfenic acid moieties due to spacer arm differences in the diazirine end (see FIG. 2F). As noted for other sulfoxide-containing cross-linkers, the sulfenic acid moiety typically undergoes dehydration to become a more stable and dominant unsaturated thiol (T) moiety, leading to the detection of βT (see FIG. 9A). To examine whether SDASO cross-linked peptides produce the expected fragmentation, standard protein BSA was cross-linked by the three SDASO cross-linkers and the resulting peptide digests were analyzed by LC MS$^n$. As illustrated (see FIG. 3), each MS$^n$ analysis of the same BSA peptides inter-linked by the three SDASO reagents yielded a dominant MS$^2$ fragment pair (αA/βT) as predicted. These resultant MS$^2$ fragment ions representing single peptide chains were then subjected to individual MS$^3$ analyses, permitting unambiguous identification of both cross-linked peptide sequences and cross-linking sites. As a result, the respective cross-links between BSA:K155 and BSA:E41 were identified for all SDASO linkers.

Similar to residue-specific cross-linkers, SDASO cross-linking can also result in dead-end and intra-linked peptides. For SDASO cross-linkers, two types of dead-end peptides are expected as both reactive ends can be hydrolyzed (see FIG. 9B-C). For NHS ester dead-ends, the resulting fragment ions would carry thiol moieties (See FIG. 9B), whereas the MS$^2$ fragment ion of diazirine dead-end peptides would be labeled with an alkene moiety (See FIG. 9C). These predicted MS$^2$ fragmentations were demonstrated by respective SDASO dead-end peptides of BSA (See FIG. 10). Similarly, for SDASO intra-linked peptides, a single fragment would be expected, containing both an alkene and thiol modification (See FIG. 9D). Exemplary MS$^n$ spectra of the three SDASO intra-linked peptides of BSA further demonstrated the anticipated fragmentation (see FIG. 11).

Collectively, the three types of SDASO cross-linked peptides fragment as predicted during CID to generate characteristic and predictable MS$^2$ products, which enable their simplified and accurate identification by MS$^n$ analysis in the same way as other sulfoxide-containing cross-linked peptides.

Figure 4E:
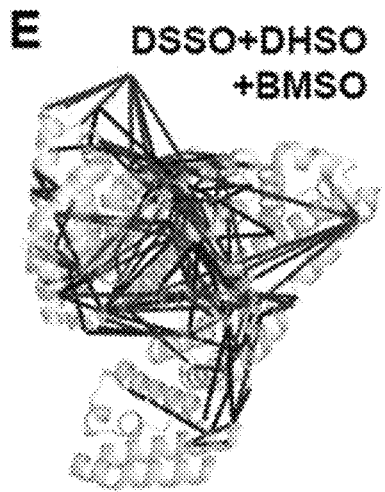

SDASO XL-MS Analysis of BSA. To evaluate the performance of the three SDASO cross-linkers, XL-MS analyses of BSA were carried out with three biological replicates each. Based on the general workflow (see FIG. 12), LC MS$^n$ analyses resulted in a total of 556 unique SDASO-L, 405 SDASO-M, 324 SDASO-S inter-linked BSA peptides, encompassing 427, 338, 306 unique K-X linkages, respectively. Here X represents any of the 20 common amino acids (AAs). Although the three SDASO cross-linkers produced similar amounts of XL-MS data, SDASO-S consistently generated the least number of cross-linked peptides. This is not entirely surprising as short linkers are more stringent on distance constraints between two cross-linkable residues, as seen with residue-specific linkers. Because of the non-specificity, it is suspected that photoactivated reaction would lead to increased variance in cross-linked products compared to residue-specific cross-linkers. To test this, the sequences of identified SDASO cross-linked peptides of BSA were first compared for each linker without considering their site localization. Interestingly, all three linkers displayed similar reproducibility with considerably high overlaps (~64%) among their corresponding three biological replicates (see FIG. 13A-C). When examining residue-to-residue (i.e., K-X) linkages, all three linkers also exhibited good reproducibility, with overlaps of 50% for SDASO-L, 42% for SDASO-M, and 43% for SDASO-S among their three respective biological replicates (see FIG. 13D-F). Intriguingly, the observed residue-to-residue reproducibility of the three SDASO linkers are quite comparable with cross-linkers with specific chemistries (i.e., DSSO, DHSO and BMSO), indicating the robustness and reliability of SDASO cross-linking. When comparing among the three SDASO linkers, 37% of cross-linked peptide sequences and 29% of their corresponding K-X linkages of BSA were found in common (see FIG. 4A-B). The results indicate that the three SDASO linkers have similar efficiency in cross-linking BSA and mapped a considerable number of shared regions, but also yielded unique cross-linked peptides and sites.

Evaluation of SDASO Cross-links of BSA. To explore the interaction coverage of BSA by SDASO cross-linking, both 2-D and 3-D XL-maps were derived based on the identified K-X linkages (see FIG. 4C-D). In comparison with published XL-MS data of BSA using DSSO (amine-reactive), DHSO (acidic residue-reactive), and BMSO (cysteine-reactive) cross-linkers (see FIG. 14A-D, FIG. 4E), SDASO XL-MS resulted in the highest number of cross-linked peptides and contact sites, thus generating the most extensive interaction coverages. As shown, interactions within the central core of BSA are broadly mapped by all types of linkers, while interactions at the N and C-termini of BSA are best profiled by the SDASO linkers (see FIG. 4C-E, see FIG. 14A-D). These results demonstrate that SDASO cross-linking is effective for mapping interactions of single proteins and generates structural information complementary to residue-specific cross-linkers.

Figure 4F:
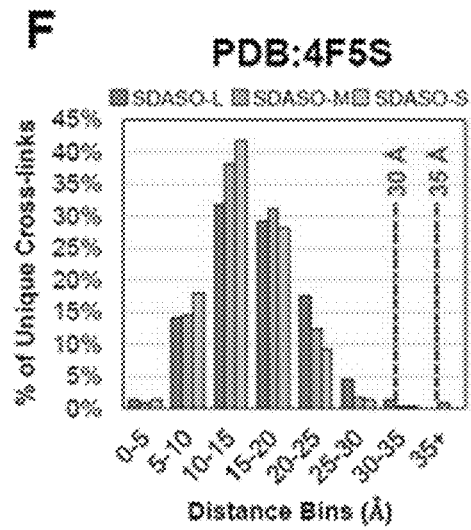

Among the 20 common AAs that can be targeted by diazirine, arginine has the longest side-chain. Considering the spacer arm lengths of SDASOs (i.e., SDASO-L (12.5 Å), SDASO-M (10.2 Å), SDASO-S (7.7 Å)), side-chain lengths of lysine (6.3 Å) and arginine (7.1 Å), as well as backbone flexibility and structural dynamics, the theoretical upper limits for the Cα-Cα distances of SDASO cross-links between a lysine (NHS reactive end) and any AA (diazirine reactive end) would be ≤35 Å for SDASO-L and ≤30 Å for SDASO-M and SDASO-S. To validate the SDASO cross-links of BSA, the identified cross-links were all mapped onto the crystal structure of BSA (PDB: 4F5S) (see FIG. 4F). As a result, 100% of SDASO-L, 99% of SDASO-M, and 100% of SDASO-S linkages were satisfied with most Cα-Cα distances well below their respective maximum thresholds (see FIG. 4F), supporting the validity of the SDASO cross-links. Notably, the average distances of SDASO cross-links also corresponded well with the linker lengths:15.8±5.8 Å (SDASO-L), 15.1±5.8 Å (SDASO-M), and 14.1±4.8 Å (SDASO-S). Although the spacer arm lengths are comparable, SDASO cross-links displayed higher satisfaction rates and lower average distances than those of DSSO and DHSO cross-links of BSA. This may be due to the fact that amino acids other than arginine would result in distances less than the expected upper limits.

SDASO-based XL-MS Analysis of the Yeast 26S Proteasome Complex. To access the feasibility of photoactivated cross-linking for complex PPI mapping, SDASO XL-MS analyses were performed with affinity-purified yeast 26S proteasome complex. This 33-subunit protein degradation machine consists of two subcomplexes, the 19S regulatory particle (RP) and 20S core particle (CP). The 19S RP contains 19 subunits that are assembled into the lid (i.e., Rpn3, Rpn5-9, Rpn11, Rpn12, Rpn15/Sem1) and base (Rpt1-6, Rpn1-2, Rpn10, Rpn13) subcomplexes, while the 20S CP is composed of 14 subunits (α1-7, β1-7) that form four stacked 7-member ring structures in the order of αββα. With three biological replicates for each linker, LC MS$^n$ analyses of tryptic digests of SDASO cross-linked complexes resulted in the identification of 1165 SDASO-L, 1133 SDASO-M and 902 SDASO-S unique cross-linked peptides within the 26S proteasome, representing 1094 SDASO-L (496 inter-subunit and 598 intra-subunit), 871 SDASO-M (416 inter-subunit and 455 intra-subunit) and 777 SDASO-S (255 inter-subunit and 522 intra-subunit) unique K-X linkages. As a result, 43% of SDASO-L, 52% of SDASO-M, and 60% of SDASO-S cross-linked peptide sequences (see FIG. 15A-C), as well as 29% of SDASO-L, 37% of SDASO-M, and 38% of SDASO-S K-X linkages were found reproducible among their respective biological replicates (See FIG. 15D-F), comparable to BSA data. These results further support the robustness of SDASO cross-linking. When comparing XL-MS data among the three linkers, it was found that the number of SDASO cross-links of proteasomes increased with spacer arm lengths of the linkers, similar to BSA data. However, the resulting cross-link data among the three linkers shared considerably fewer in common for proteasomes than for BSA, with overlaps of 16% vs. 37% for cross-linked peptide sequences and of 11% vs. 29% for K-X linkages (see FIGS. 4A-B and 5A, and FIG. 16). These results suggest that spacer arm lengths of SDASO linkers play a more significant role in capturing interactions within protein complexes, most likely attributed to the presence of both inter-protein and intra-protein interactions. Thus, the use of the three SDASO linkers is beneficial not only for result cross-validation, but also for comprehensive PPI mapping of protein complexes.

As additional enzymatic digestions are known to increase sequence coverage in XL-MS analyses using residue-specific cross-linkers, it was expected that similar results would be obtained for SDASO linkers. To test this, chymotrypsin digestion of SDASO-L cross-linked proteasomes with three biological replicates were performed. LC MS$^n$ analyses of chymotryptic digests resulted in the identification of a total of 776 unique SDASO-L cross-linked peptides of the 26S proteasome, representing 804 SDASO-L unique K-X linkages, comparable to the trypsin XL-MS data as described above. While the reproducibility of XL-MS data was somewhat similar for both chymotryptic and tryptic digests of SDASO-L cross-linked proteasomes (See FIG. 17A-B, 15A, 15D), their overlaps of cross-linked peptide sequences and K-X linkages were quite limited (~10%) (see FIG. 17C-D). This confirms that additional enzymatic digestion could facilitate the expansion of PPI coverages. Thus, tryptic and chymotryptic datasets of SDASO-L were combined, yielding a total of 1711 unique SDASO-L K-X linkages for subsequent analyses.

Figure 5A:
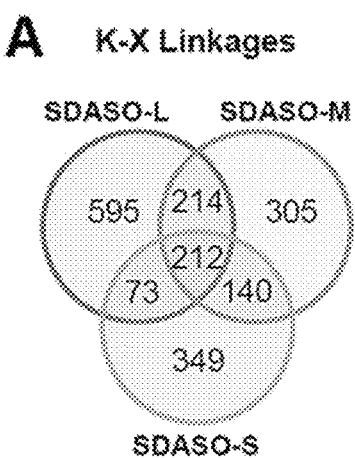
FIG. 5A-E presents a summary of the SDASO XL-MS data for the yeast 26S proteasome. (A) Comparisons of cross-linked peptide sequences and residue-to-residue linkages of the 26S proteasome obtained from SDASO-L, -M, and -S XL-MS experiments. (B) Respective distance satisfaction rates of SDASO-L, -M, and -S cross-links (SDASO-L: ≤35 Å, SDASO-M and -S: ≤30 Å) mapped onto the 4 model states of the yeast 26S (PDB: 4CR2 (s1), 4CR3 (s2), 4CR4 (s3), and 5MPD (s4)). (C) Distribution of unique state-specific K-X linkages of SDASO-L, -M, and -S across the 14 possible combinations of one, two or three out of the four states. (D) Circular 2-D XL-maps of the yeast 26S Proteasome for SDASO-L, -M, -S linkers. Intra-subunit linkages are shown medium gray and inter-subunit linkages are illustrated based on the linkers: light gray (SDASO-L), light gray (SDASO-M), or lighter gray (SDASO-S). Outer circle represents the subunits within the two subcomplexes of the 26S proteasome, i.e., the 19S RP (Lid (medium gray) and base (darker gray)) and 20S CP (α ring 34 (light gray) and β ring (light-medium gray)). (E) Distributions of SDASO-L, -M, and -S cross-links corresponding to three categories of inter-subunit interactions: 19S-19S, 19S-20S and 20S-20S. Note: linker-specific color schemes: SDASO-L: light gray, SDASO-M: medium gray, and SDASO-S: lighter gray.
Figure 5B:
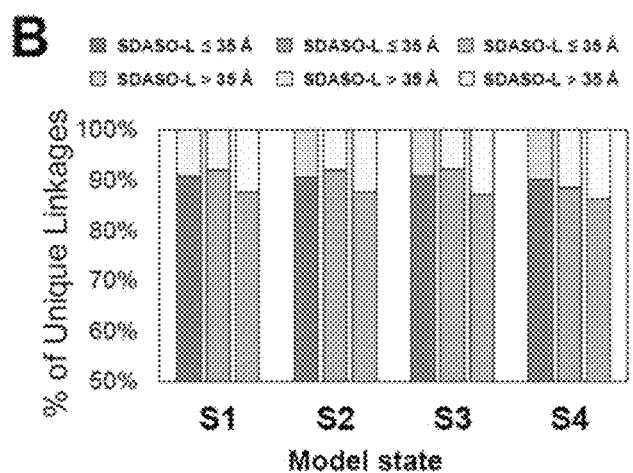
Figure 5C:
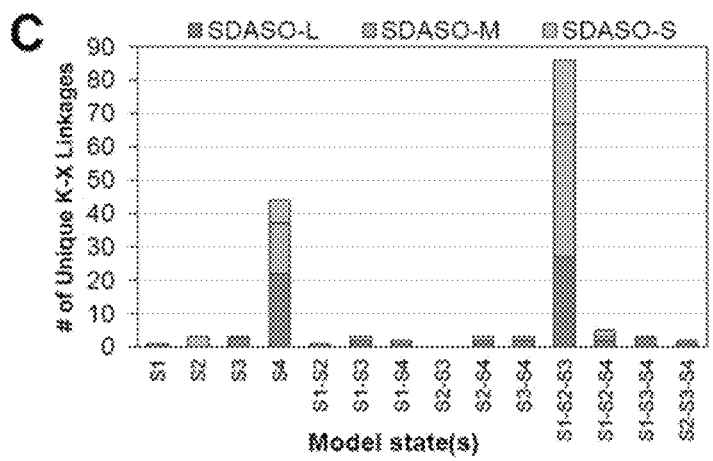

Validation of Proteasome Cross-links by Structural Mapping. It is known that the 26S proteasome is a dynamic entity and possesses multiple conformational states to fulfill its function. To validate SDASO cross-links, the identified K-X linkages were mapped onto the four known structures of the yeast 26S proteasome that represent its progression through an ATP-driven functional cycle: s1 (PDB:4CR2), s2 (PDB: 4CR3), s3 (PDB:4CR4) and s4 (PDB:5MPC). As a result, the average distance satisfaction rates of the identified K-X linkages across the four models for each linker were found to be very similar: 91% for SDASO-L (≤35 Å), 91% for SDASO-M (≤30 Å), 87% for SDASO-S (≤30 Å), with an overall variation less than 1% (see FIG. 5B, and FIG. 18A-D). Additionally, a group of SDASO linkages that appeared to fit better with a subset of models were noticed, suggesting the presence of conformational heterogeneity in the sample. To examine this, a total of 159 SDASO cross-links were classified as structural state-specific, because they were satisfied only by one, two or three out of the four models. These differentially satisfied cross-links were then grouped into 14 state-specific combinations to infer the presence of preferred structural states. As illustrated in FIG. 5C, among all combinations, two major categories were detected for the three SDASO linkers, representing 82% of the total state-specific SDASO cross-links. One of them contained cross-links (54%) satisfied only by s1-s3 states but not by the s4 state, implying the presence of s1, s2 and/or s3 states in the purified proteasome. The other described cross-links (~28%) satisfied only by the s4 state, indicating presence of that state. These two groups of state-specific cross-links represent 28 protein interactions, half of which describe connectivity within the 20S CP. The remaining half embody interactions within the 19S, particularly concerning Rpn11 and Rpn1. The results correlate well with the fact that these regions are expected to undergo significant conformational changes during state conversions of the 26S proteasome.

When considering inter-subunit and intra-subunit cross-links separately, the latter has a slightly higher distance satisfaction when mapped to known structures (intra-subunit: SDASO-L: 98%, SDASO-M: 96%, and SDASO-S: 88% vs. inter-subunit: SDASO-L: 79%, SDASO-M: 86%, and SDASO-S: 86%) (see FIG. 19A-M). This is expected as inter-subunit interactions are typically more dynamic. Coincidentally, the majority of non-satisfied inter-subunit linkages also localized to the 19S RP (See FIG. 20A-M), which is known to have diverse conformations. Collectively, structural mapping supports the validity of the identified SDASO cross-links and suggests the existence of multiple states in the purified proteasome.

Figure 5D:
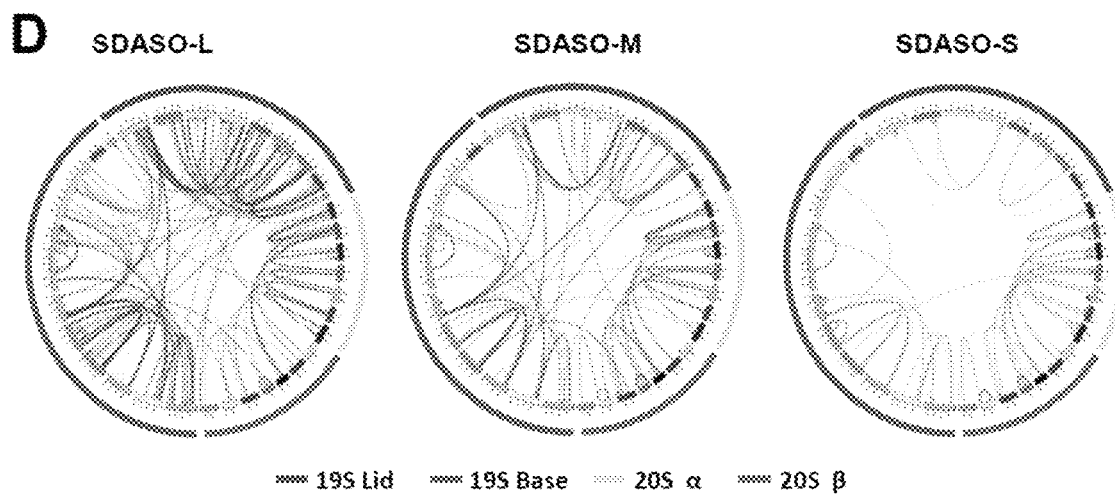
Figure 5E:
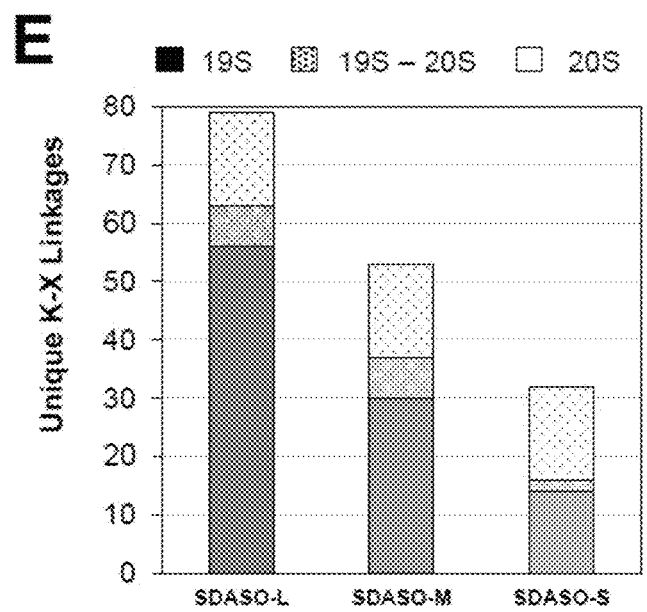

Comparison of SDASO XL-Maps of the 26S Proteasome. To further evaluate the performance of SDASO in complex PPI mapping, 2-D XL-maps were generated of the 26S proteasome based on unique K-X linkages identified by each SDASO linker (see FIG. 5D). A total of 135 non-redundant PPIs (103 inter-subunit and 32 intra-subunit) within the 26S proteasome were determined based on 2427 K-X linkages identified by the three SDASO linkers, including 119 from SDASO-L (79 inter-subunit and 30 intra-subunit), 81 from SDASO-M (53 inter-subunit and 28 intra-subunit), and 61 from SDASO-S (32 inter-subunit and 29 intra-subunit). While ~20% of inter-subunit interactions were identified across all three linkers (21/103), each linker contributed unique interactions (SDASO-L 42/103, SDASO-M 16/103 and SDASO-S 5/103). The inter-subunit interactions of the 26S proteasome captured by each linker can be classified into 3 categories based on proteasome subcomplexes: 19S-19S (56 SDASO-L, 30 SDASO-M, and 14 SDASO-S), 19S-20S (7 SDASO-L, 7 SDASO-M, and 2 SDASO-S) and 20S-20S (16 each for SDASO-L, -M, and -S), as illustrated in FIG. 5E. The differences in the PPIs captured by SDASO linkers are most likely related to their spacer arm lengths. Nevertheless, these results indicate that SDASO cross-linking covers a diverse range of protein interactions and that each SDASO linker contributes to mapping the comprehensive interaction network within the 26S proteasome.

DSSO XL-MS Analysis of the 26S Proteasome. To better assess SDASO cross-link data, a set of XL-MS experiments on the yeast 26S proteasome were performed using DSSO for comparison. LC MS$^n$ analyses identified a total of 2254 unique DSSO cross-linked peptides of proteasomes from two biological replicates, representing 1115 K-K linkages (659 inter-subunit and 456 intra-subunit) and describing 107 inter-subunit and 30 intra-subunit. While the overlap (65%) of DSSO cross-linked peptide sequences between the two biological replicates was comparable to those of SDASO data (57%~70%), the reproducibility of DSSO residue-to-residue (i.e., K-K) linkages was higher (~65%) (see FIG. 21B) than those of SDASO data (43%~52%). The increased variation in identified SDASO cross-link sites is expected as nonspecific cross-linking chemistry is inherently more variable. Nonetheless, these comparisons further demonstrate that SDASO cross-linking is robust on targetable interaction regions.

Figure 22D:
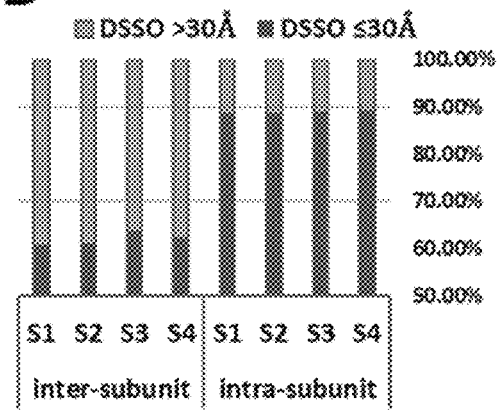
Figure 22E:
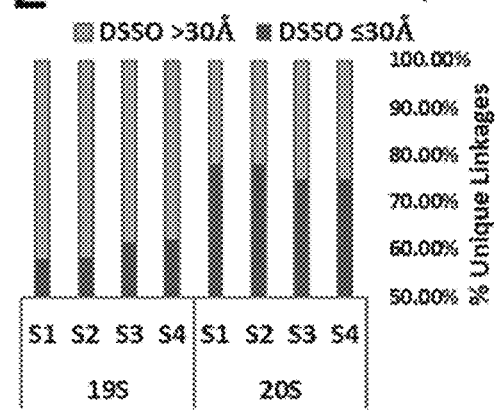
Figure 22F:
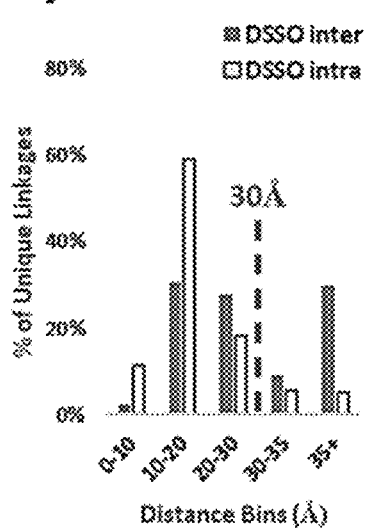
Figure 22G:
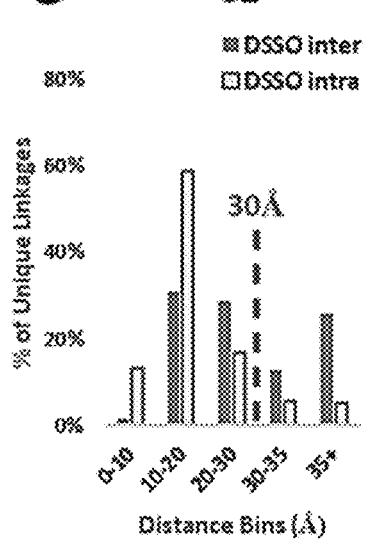
Figure 22H:
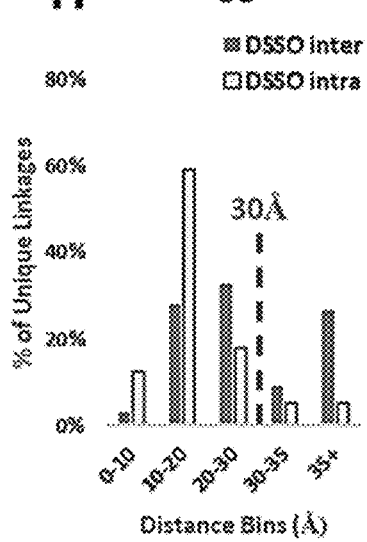
Figure 22I:
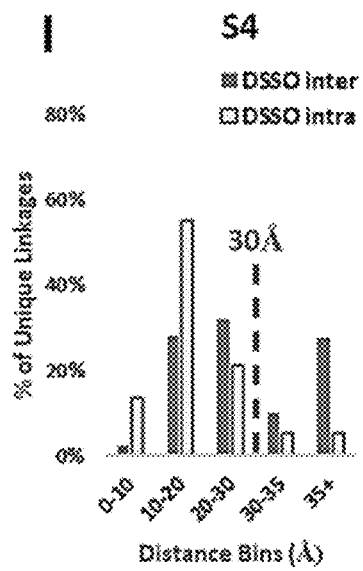
Figure 22J:
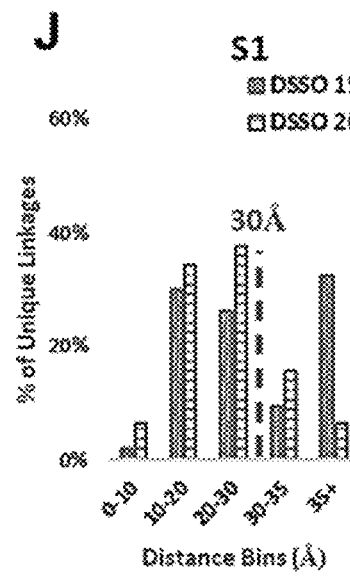
Figure 22K:
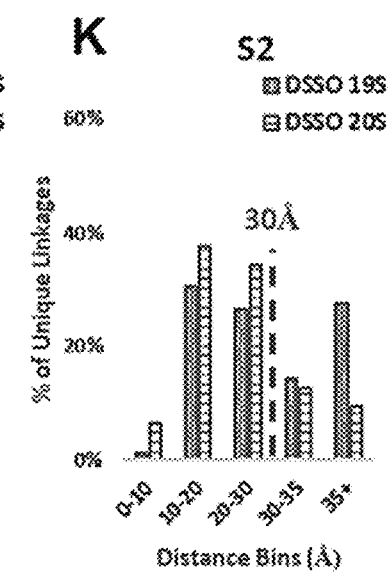
Figure 22L:
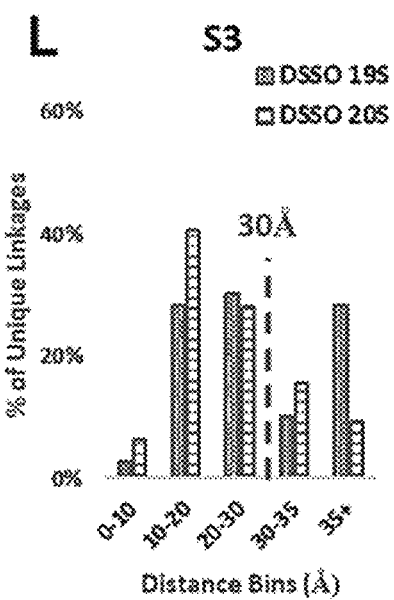
Figure 22M:
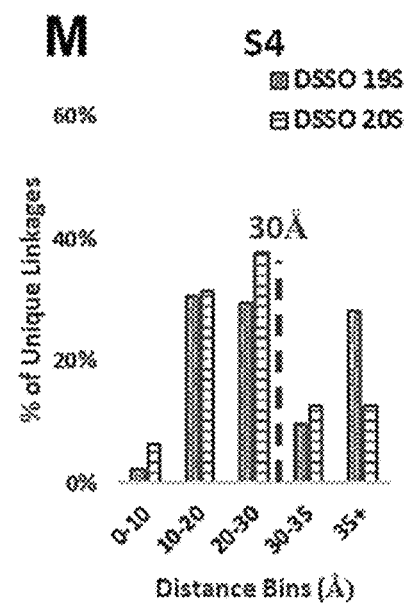

Next, DSSO cross-links were mapped onto the four conformational states (s1-s4) of the yeast 26S proteasome and determined that on average ~75% of DSSO K-K linkages were satisfied (≤30 Å) across all four models (see FIG. 22A-B). Interestingly, a total of 114 DSSO cross-links were also found to be state-specific cross-links, as described above. However, the distribution of cross-links across the 14 state-specific combinations was somewhat different from SDASO data (see FIG. 22C and FIG. 5C). In addition to the notable representations of s4 (30%) and s1-s3 states (15%) as seen in SDASO data, respective state-specific DSSO cross-links satisfied only by s1 state (~9%), s3 state (~8%), and s2-s3-s4 states (~14%) were markedly detected. These DSSO state-specific cross-links further support the presence of multiple conformational states of the 26S proteasome. Similar to SDASO data, intra-subunit DSSO cross-links were much better satisfied than inter-subunit linkages for all four models (intra: 89% vs. inter: 62%) (see FIG. 22D, F-I), and most of the violating DSSO inter-subunit cross-links were attributed to the 19S RP (see FIG. 22E, J-M). Taken together, DSSO XL-MS data corroborate well with SDASO results, confirming the structural heterogeneity of affinity-purified 26S proteasome and the dynamic nature of the 19S RP.

Figure 6A:
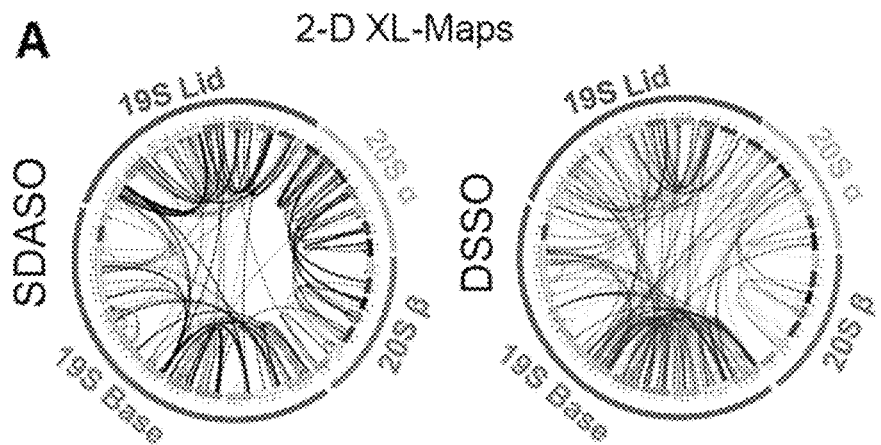
FIG. 6A-C presents SDASO and DSSO XL-maps of the yeast 26S Proteasome. (A) Circular 2-D XL-maps of the 26S Proteasome derived from all three SDASO linkers (top) and DSSO (bottom). Intra-subunit linkages are shown in medium gray and inter-subunit linkages are colored black for SDASO and medium gray for DSSO. Outer circle represents the subunits within the two subcomplexes of the 26S proteasome, i.e., the 19S RP (Lid (medium gray) and base (lighter gray)) and 20S CP (α ring (light gray) and R ring (light-medium gray)). (B) 3D XL-maps of the 19S RP using SDASO (top) and DSSO (bottom) cross-links, in which 19S lid subunits are colored light gray and base subunits colored light gray. Cross-links are also color coded: 19S lid-lid (medium gray lines), 19S base-base (light-medium gray), 19S lid-base (dark gray). (C) 3D XL-maps of the 20S CP based on SDASO (top) and DSSO (bottom) cross-links, in which 20S α subunits are colored as lightest gray, 20S β subunits as light-medium gray and 20S linkages as light gray. Note: high-resolution structure of the yeast 26S proteasome (PDB: 4CR2 (s1)) was used for the maps in (B) and (C).
Figure 6B:
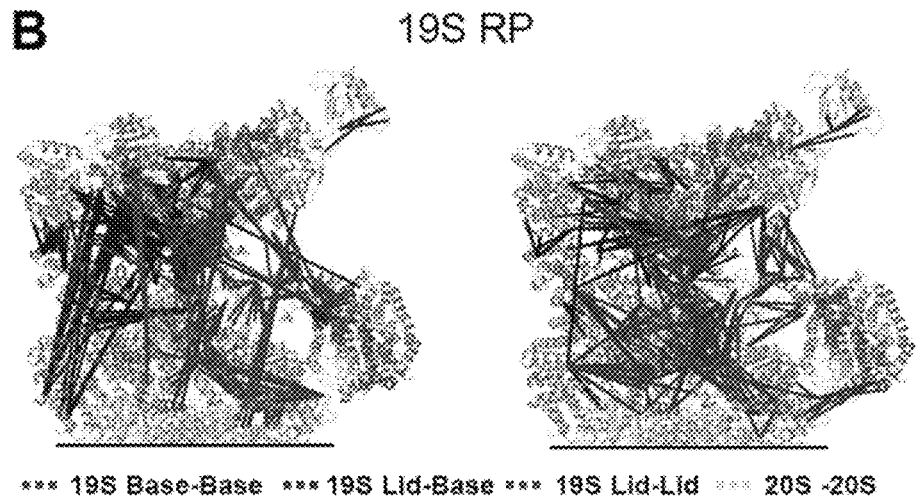
Figure 6C:
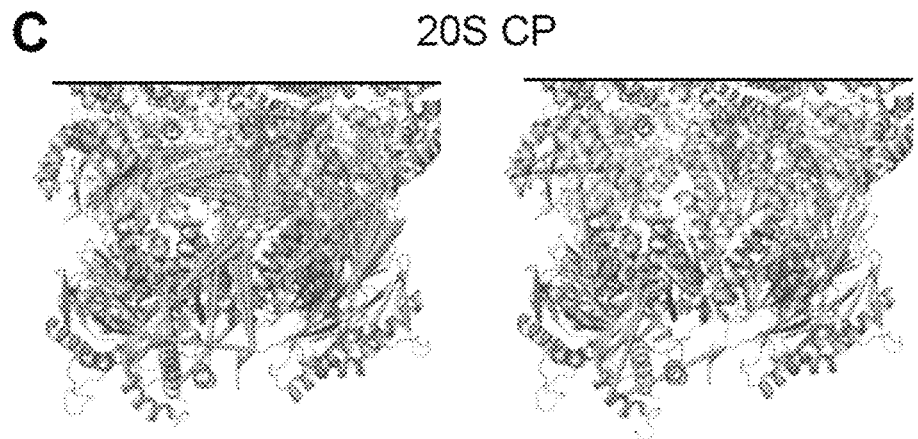
Figure 7B:
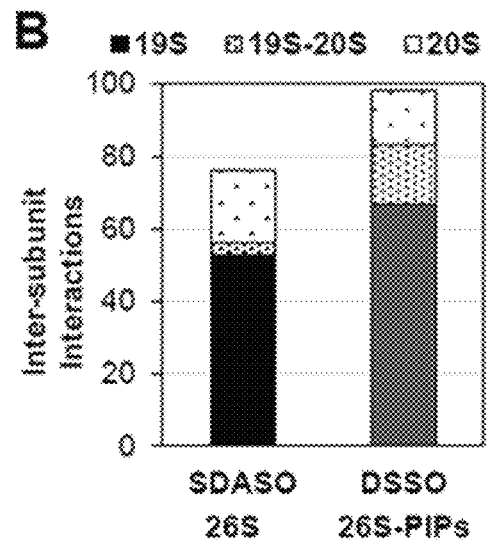
Figure 7C:
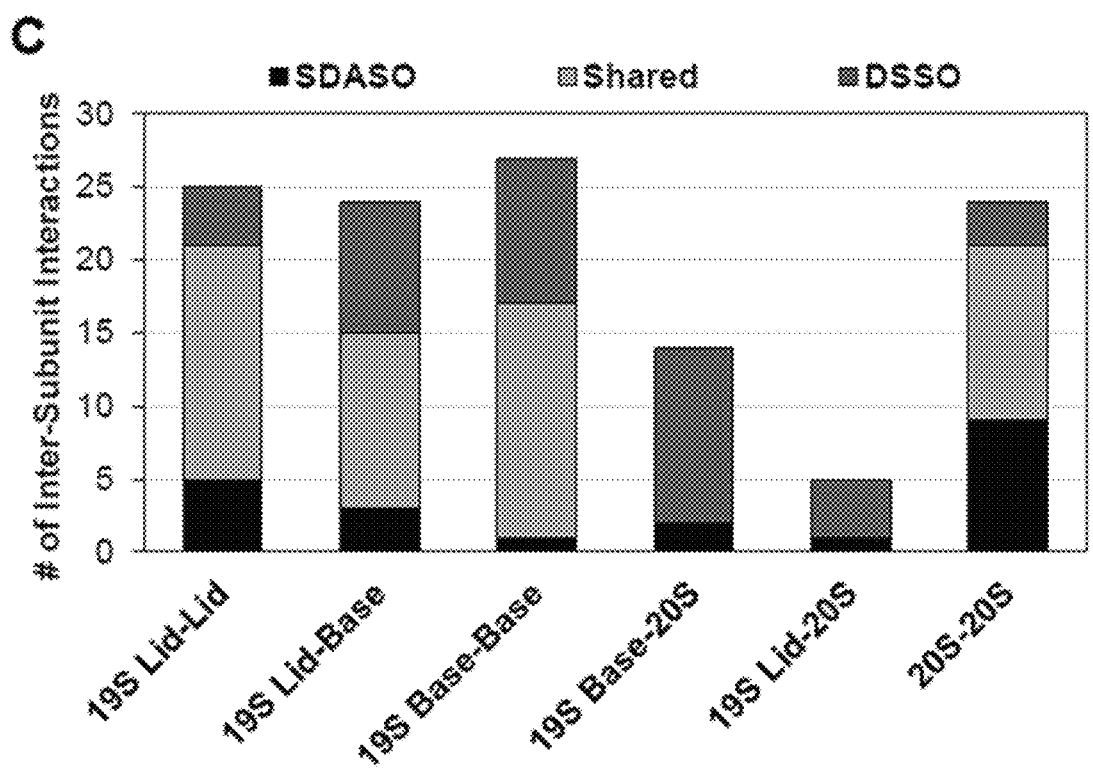
Figure 7D:
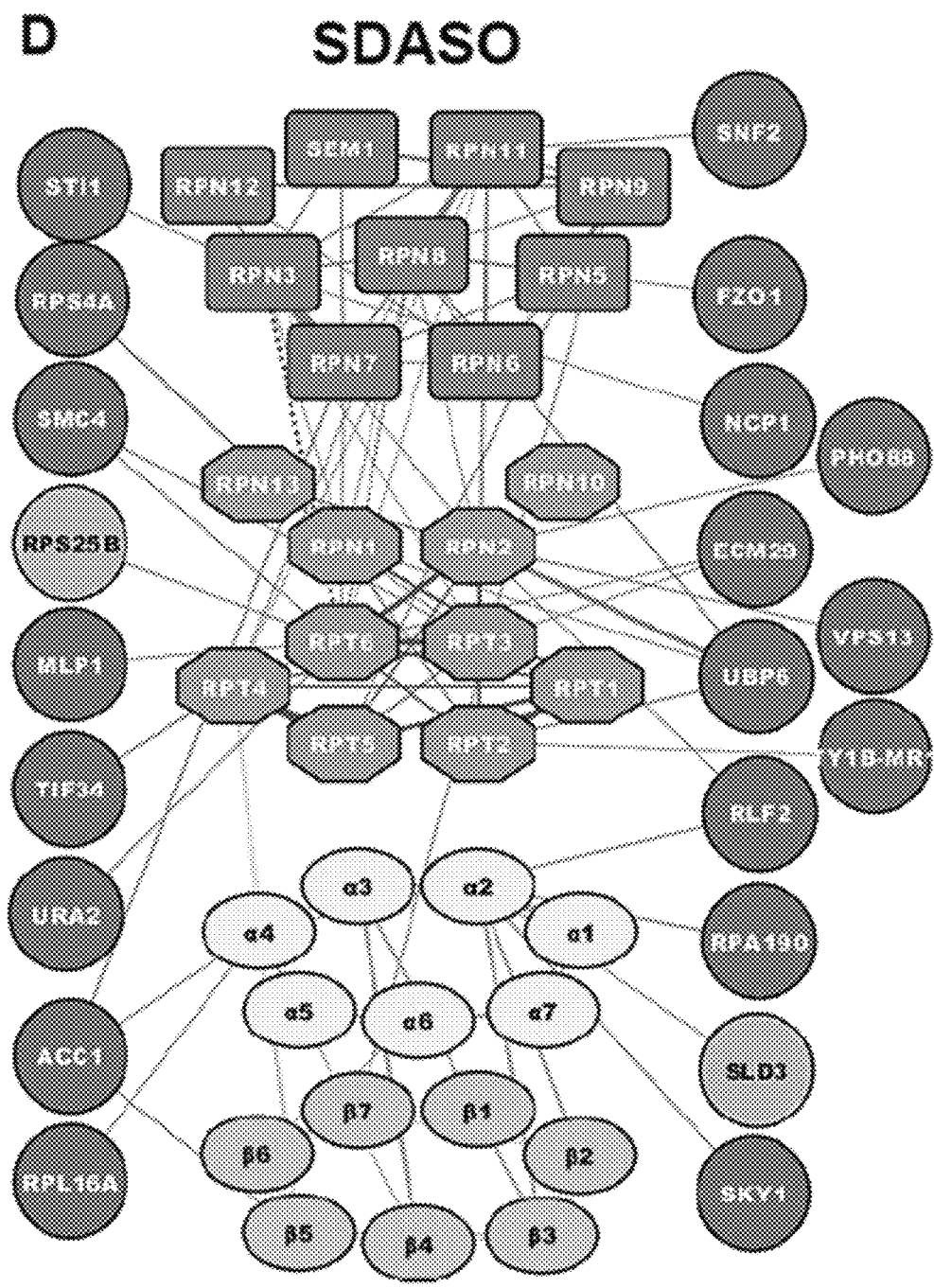
Figure 7E:
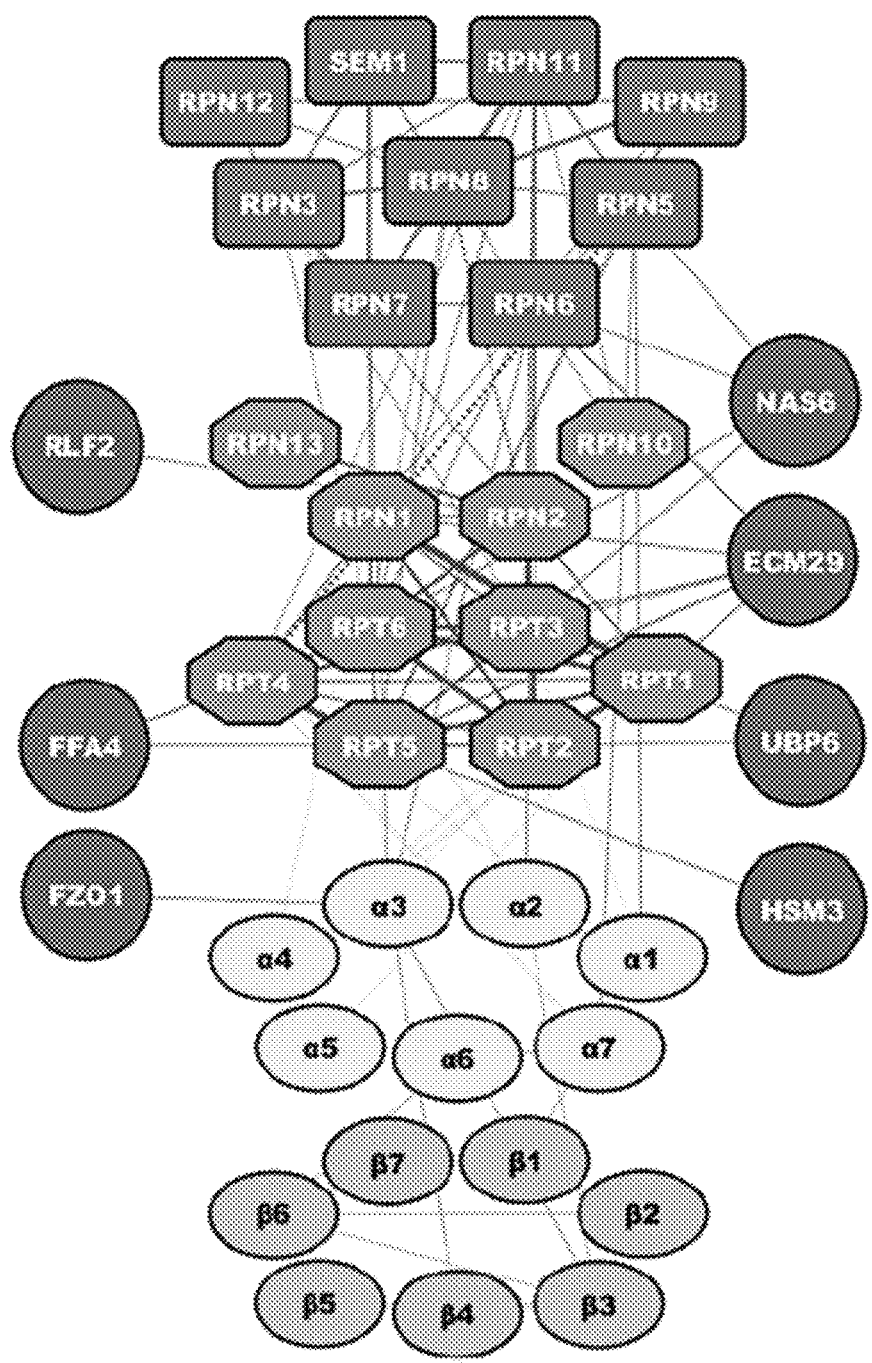

Comparison of SDASO and DSSO Cross-linking of Proteasomes. To delineate the interactions captured by residue-specific and nonspecific cross-linkers, the cross-links identified in at least two biological replicates from all of the XL-MS experiments were further compared with the combined XL data from the three SDASO linkers. As a result, a total of 2186 SDASO cross-links (959 inter-subunit, 1227 intra-subunit) and 1098 DSSO cross-links (649 inter-subunit, 449 intra-subunit) of the 26S proteasome were obtained. From this data, 2-D and 3-D XL-maps were generated, displaying extensive connectivity among proteasome subunits (see FIG. 6A-C). In comparison, the most noticeable differences in the XL-maps were the increased density of inter-subunit cross-links within the 19S by DSSO (see FIG. 6A-B) and within the 20S by SDASO (see FIG. 6A, C). When combined, SDASO and DSSO cross-links yielded a total of 118 inter-subunit (78 SDASO and 98 DSSO) and 33 intra-subunit (31 SDASO and 30 DSSO) protein-protein interactions of the 26S proteasome (see FIG. 7A). While 85 interactions were shared by both types of linkers, 23 interactions were unique to SDASO (20 inter-subunit and 3 intra-subunit) and 43 interactions were only mapped by DSSO (42 inter-subunit and 1 intra-subunit). For the inter-subunit interactions, 47% were identified by both SDASO and DSSO, whereas 17% and 36% were revealed uniquely by SDASO and DSSO, respectively. For further examination, three types of interactions within the 26S proteasome were categorized: 19S-19S, 19S-20S and 20S-20S (see FIG. 7B), and the 19S-containing interactions were further subdivided into 19S lid-lid, lid-base, base-base, 19S lid-20S and 19S base-20S interactions (see FIG. 7C). In addition, SDASO and DSSO XL-PPI networks of the 26S proteasome were derived based on their respective cross-links (see FIG. 7D-E). While both SDASO and DSSO uncovered mostly 19S-containing interactions, DSSO is more efficient than SDASO at defining these interactions, i.e., 19S base-base (26 vs. 17), 19S lid-base (21 vs. 15), and 19S-20S (16 vs. 3) (see FIG. 7C-E). In contrast, SDASO captured more 20S-20S interactions with significantly more cross-link coverage (20 SDASO XL-PPIs from 262 K-X linkages vs. 15 DSSO XL-PPIs from 37 K-K linkages) (see FIG. 6C and FIG. 7B-E). Apart from inter-subunit interactions, 29 out of 33 intra-subunit interactions were captured by both types of linkers (see FIG. 7A), but SDASO identified a greater amount of contact sites within proteasome subunits relative to DSSO (see FIG. 23A-B).

Figure 8E:
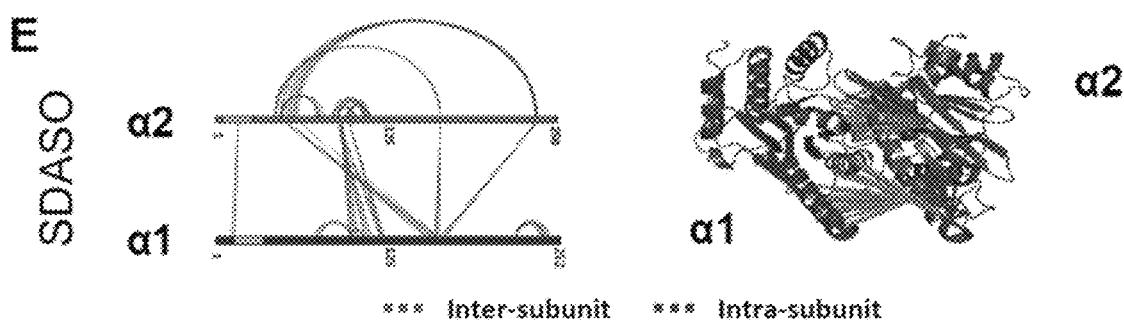
Figure 8F:
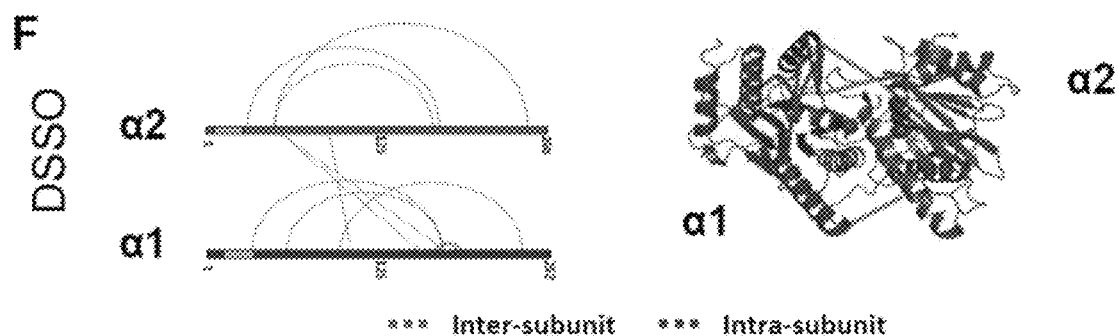
Figure 9A:
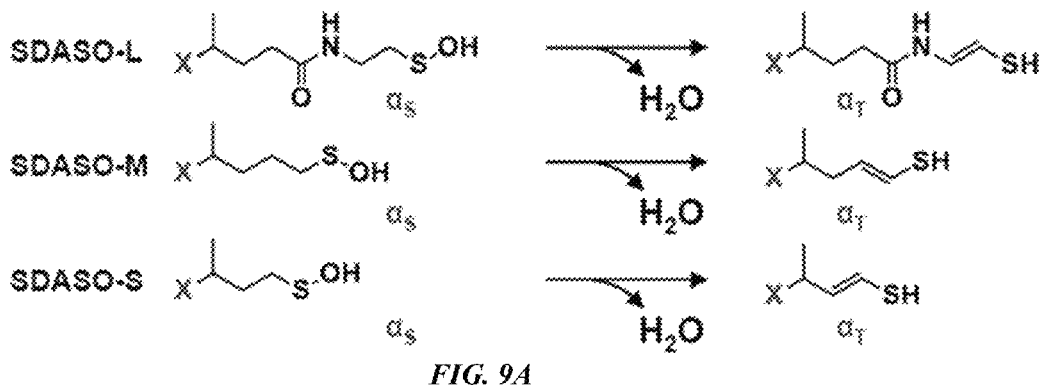
Figure 9B:
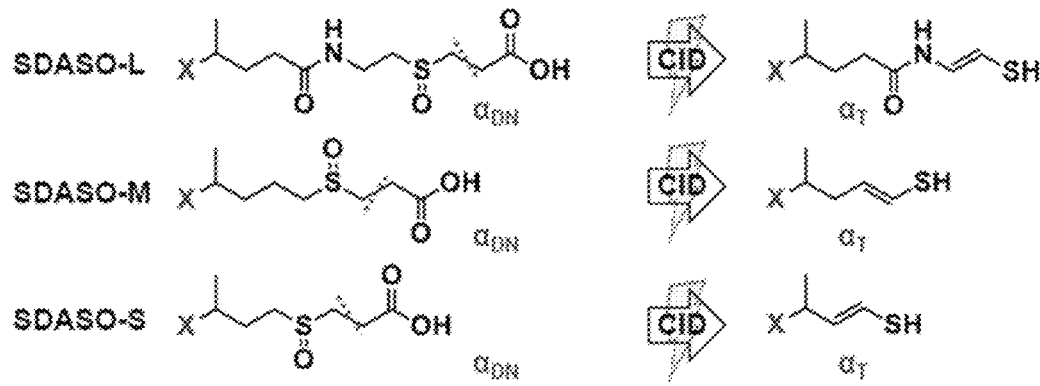
Figure 9C:
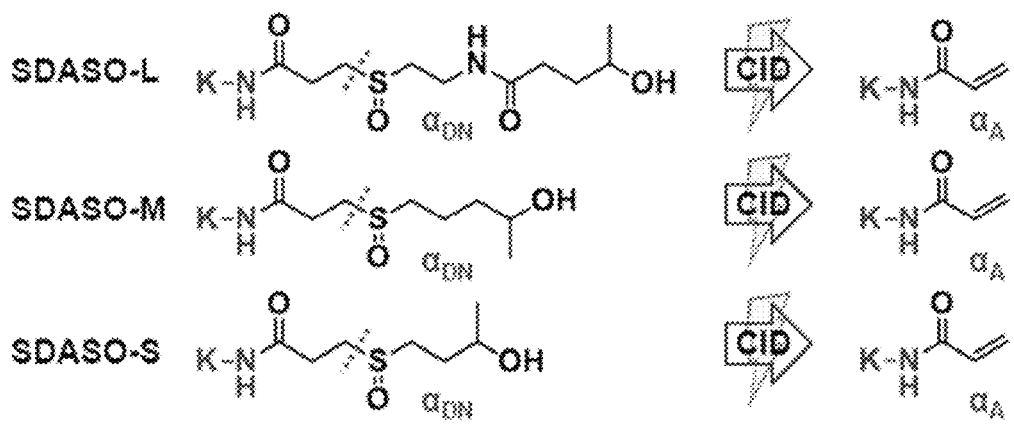
Figure 9D:
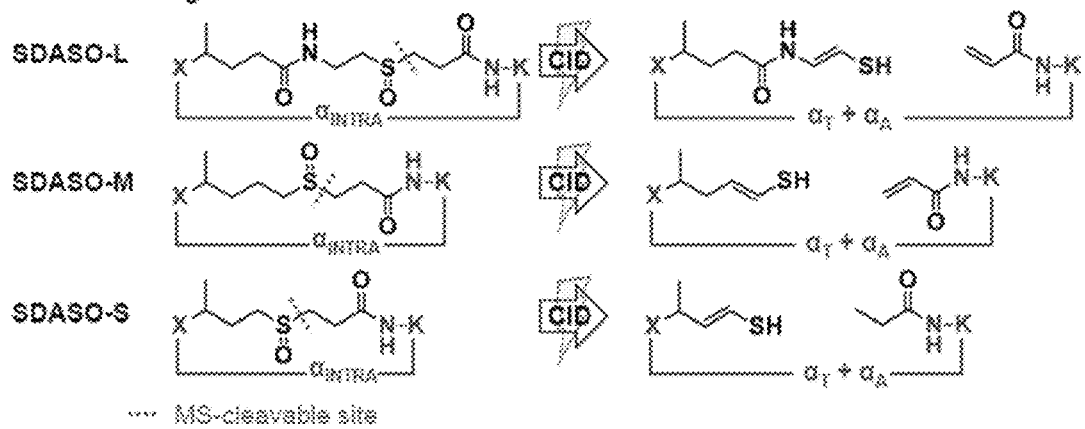
Figure 10A:
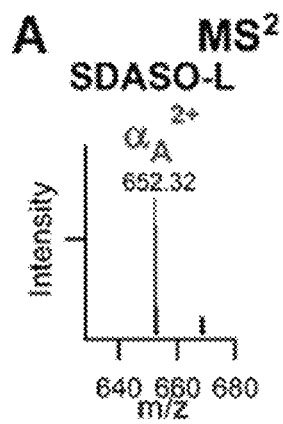
Figure 10B:
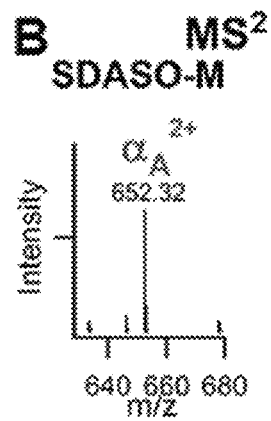
Figure 10C:
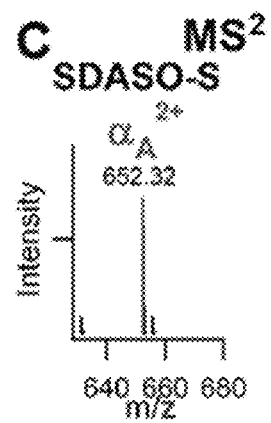
Figure 10D:
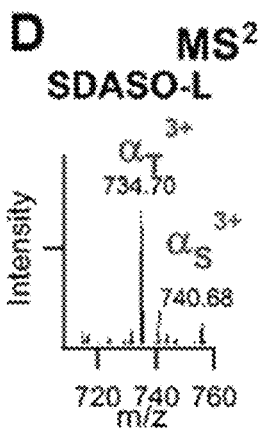
Figure 10E:
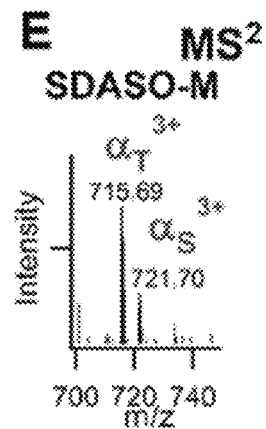
Figure 10F:
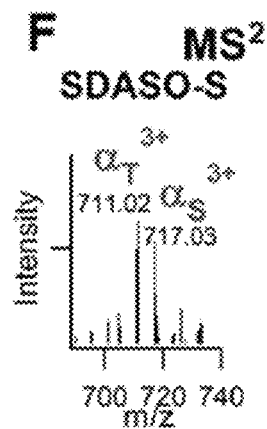
Figure 10G:
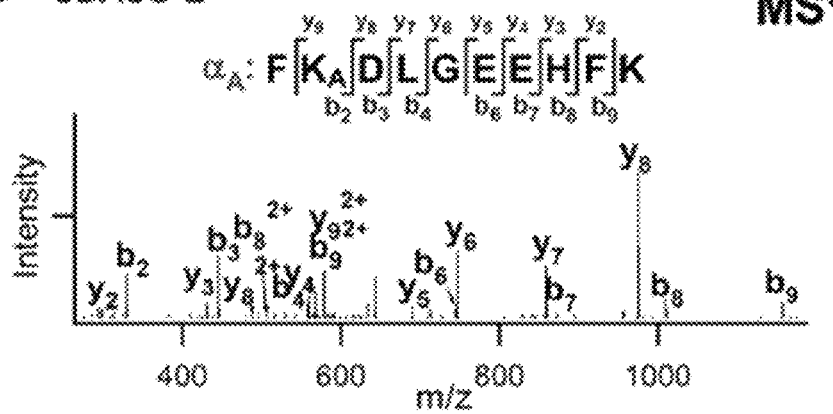
Figure 10H:
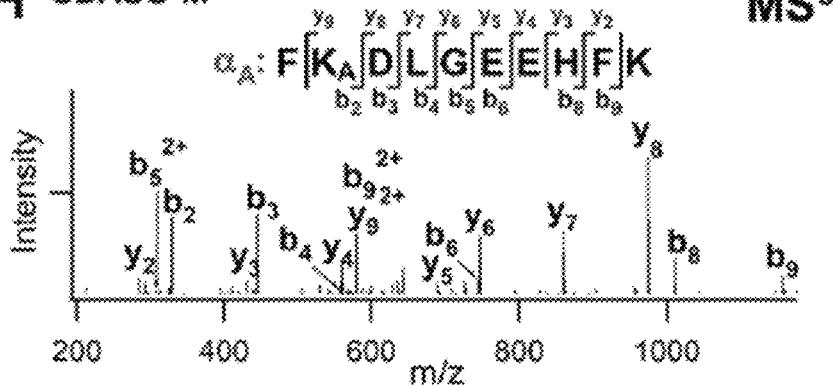
Figure 10I:
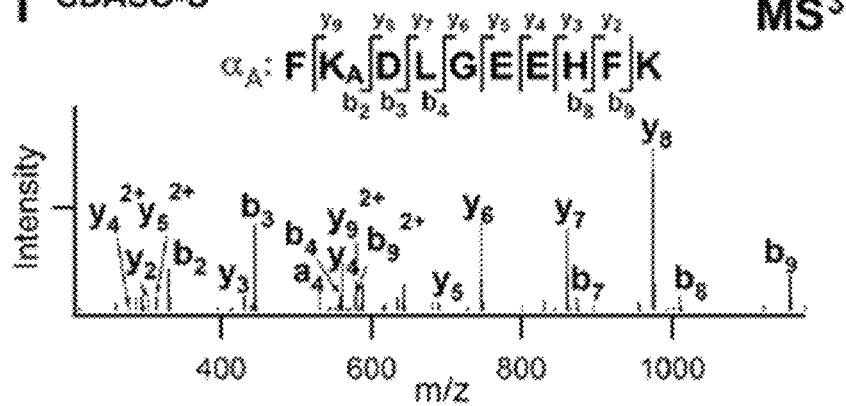
Figure 10J:
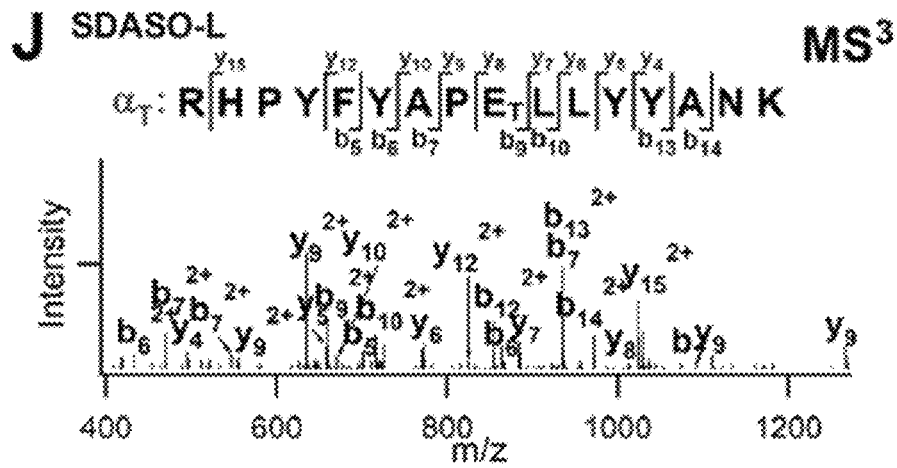
Figure 10K:
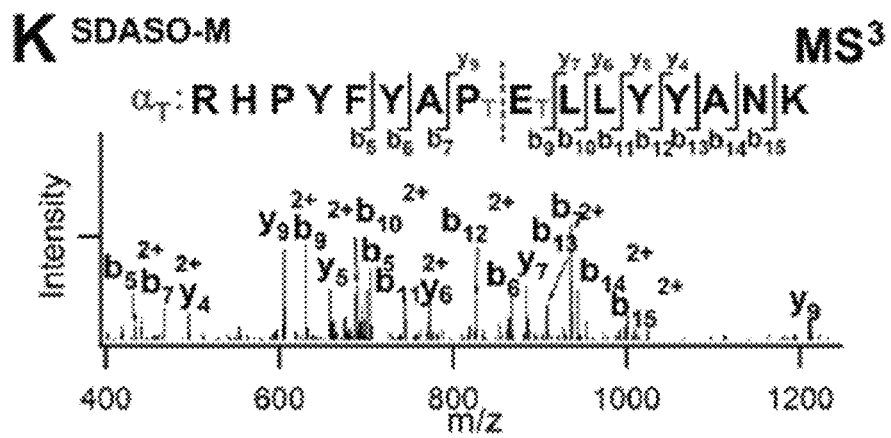
Figure 10L:
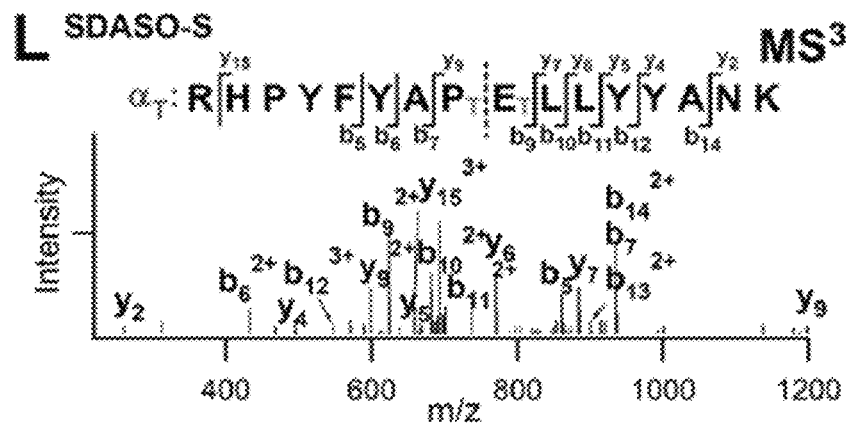
Figure 11F:
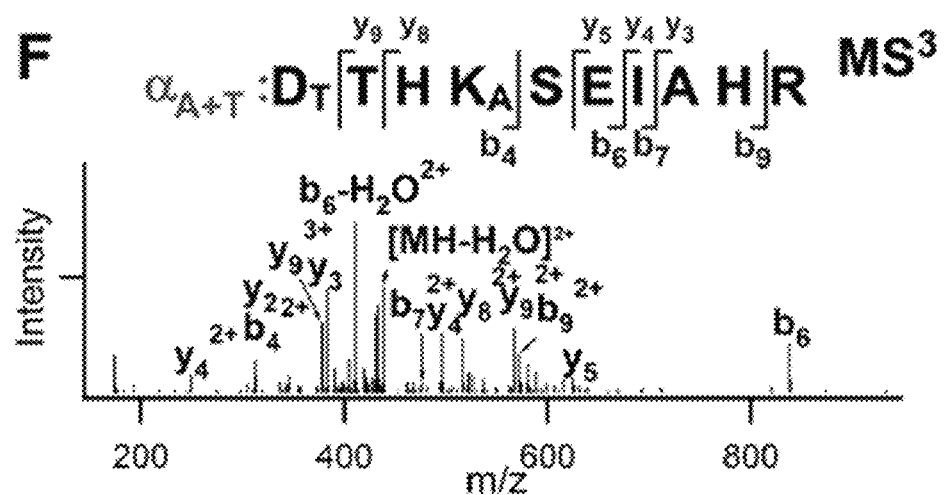

In comparison, the 2-D XL-maps of the 20S CP demonstrate that SDASO provided broader coverage of both inter-subunit and intra-subunit interactions (see FIG. 8A-B). For example, one of the inter-subunit interactions uniquely identified by SDASO was between subunit α4 and α5, described by 3 contact regions (α5:K66-α4:X(147-162), α4:K88-α5:X(128-131), and α4:K182-α5:X(233-234)) (see FIG. 8C). Although there are several lysine residues in α4 (K146, K169, and K177) and α5 (K32 and K52) proximal to the interfaces identified by SDASO, DSSO was not able to capture this particular interaction (see FIG. 8D). While both SDASO and DSSO identified intra-subunit interactions of α4 and α5 that were complementary, SDASO yielded denser connectivity within each protein (see FIG. 8C-D). This type of observation is further exemplified by the inter-subunit and intra-subunit interactions of α1 and α2 (see FIG. 8E-F). As shown, SDASO not only identified the same interaction regions as DSSO (i.e., SDASO: α1:X(98-120)-α2:K91 and α1:X(157-168)-α2:K50 vs. DSSO: α1:K107-α2:K91, α1:K167-α2:K50 and α1:K187-α2:K50), but also determined additional contacts (SDASO: α1:X(11-13)-α2:K17, α1:X(120-123)-α2:K98, α1:X(159-164)-α2:K166, and α1:X(161-166)-α2:$K_{237}$). Taken together, these results indicate that SDASO is complementary to DSSO in mapping PPIs of protein complexes. In addition, SDASO appears to be better for mapping close contacts and stable interactions, whereas DSSO is better-suited for capturing dynamic interactions.

Identification of Proteasome Interacting Proteins. Besides interactions within the 26S proteasome, physical contacts with co-purified proteasome-interacting proteins (PIPs) were also examined. Similarly considering only cross-links that were identified in at least two biological experiments from all of the XL-MS experiments, a total of 125 unique SDASO cross-linked peptides (175 K-X linkages) and 90 unique DSSO cross-linked peptides (90 K-K linkages) were obtained, representing 44 inter-protein and 4 intra-protein pair-wise interactions. This resulted in the identification of 24 PIPs (21 SDASO and 7 DSSO) with direct contacts to the 26S proteasome, including 22 known (at thebiogrid.org) and 2 novel ones (see FIG. 7D-E), in which only 4 PIPs (Ecm29, Ubp6, Fzo1, and Rlf2) were found by both types of linkers (see FIG. 7A). The 4 shared PIPs were identified with a total of 17 PPIs, of which only 3 (Rpt2-Ubp6, Rpt3-Ecm29 and Rpn2-Rlf2) were captured by both SDASO and DSSO. Among the known PIPs, Ecm29 is a key regulator of the 26S proteasome, and human Ecm29 has been shown to interact with Rpt1, Rpt4, Rpt5, Rpn1 and Rpn10 by DSSO cross-linking. Similarly, the interactions of yeast Ecm29 with Rpt1, Rpt4, Rpt5, and Rpn1 were confirmed by DSSO XL. In addition, Ecm29-Rpt3 and Ecm29-Rpn6 interactions from DSSO were identified for the first time. Furthermore, SDASO validated Ecm29-Rpt3 interaction and identified Ecm29-Rpt6 interaction (see FIG. 24A). These results demonstrate extensive contacts between Ecm29 and the 26S proteasome, corroborating well with previous observation of its human orthologue. Ubp6 is a proteasome-associated deubiquitinase that interacts with the 26S proteasome through Rpn1. While DSSO caught Ubp6-Rpt1 and Ubp6-Rpt2 interactions as reported, SDASO identified extensive interactions of Ubp6 with multiple subunits including Rpn1, Rpn2, Rpn8 and Rpt2 (see FIG. 24B). Overall, SDASO XL-MS analyses identified higher number of PIPs than DSSO, illustrating its capability of capturing interacting proteins in affinity purified samples.

Relative Specificity of Diazirine Cross-linking. Although photoactivated diazirine chemistry can target any X—H bond, recent studies have suggested that the reaction shows preferences for acidic residues. To this end, any AA preference observed in SDASO cross-linking of the 26S proteasome was determined. On average, ~26% of residues cross-linked by SDASO linkers were determined precisely at a single site, whereas the rest were localized at one out of two (~34%), three (~20%), or four and more (~20%) possible sites (see FIG. 25A). Similar precisions in SDASO cross-linked site localization were also observed in BSA data (see FIG. 25B), consistent with conventional diazirine linkers. To prevent over-estimation due to site ambiguity, the weighted AA occurrence was calculated in order to assess the preference of diazirine labeling in the 26S proteasome based on localization certainty (see FIG. 25A). Thus, among the 20 common AAs, glutamic acid clearly was the most favored by diazirine cross-linking, representing ~30% of the targeted residues for all three SDASO linkers (see FIG. 26A). In comparison, four additional residues, i.e., alanine (7.2%), aspartic acid (6.8%), leucine (7.3%), and tyrosine (6.4%) were targeted relatively favorably by SDASOs, as they had an average frequency well above those of the remaining AAs (2.7%). The dominant preference of glutamic acid displayed by diazirine cross-linking in proteasome samples was also detected in BSA, in which ~25% of SDASO cross-linked sites were glutamic acids (see FIG. 26B). Interestingly, five relatively favorable diazirine cross-linked sites in BSA contained aspartic acid, histidine, threonine, valine, and tyrosine with an average frequency of 6.8~8.4%, in which only aspartic acid and tyrosine residues showed similar preference in proteasome samples. This discrepancy is more likely attributed to the occurrence of common AAs in close proximity to cross-linkable lysines at interaction interfaces within proteins of interest as well as MS detectability and identification of the resulting cross-linked peptides. Nonetheless, while diazirine reactivity is nonspecific, the results suggest that it preferably targets a subset of AAs with glutamic acid as its most favorite.

A number of embodiments have been described herein. Nevertheless, it will be understood that various modifications may be made without departing from the spirit and scope of this disclosure. Accordingly, other embodiments are within the scope of the following claims.

What is claimed is:

1. A MS-cleavable heterobifunctional photoactivated cross-linker having a structure selected from:

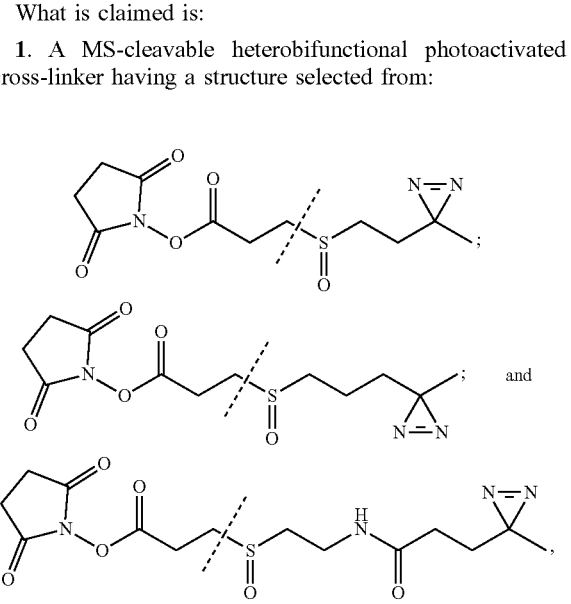

wherein the dashed line indicates a MS-cleavable bond, and wherein the MS-cleavable cross-linker is configured for mapping intra-protein interactions in a protein, or inter-protein interactions in a protein complex, or combinations thereof.

2. A method for mapping intra-protein interactions in a protein, inter-protein interactions in a protein complex, or combinations thereof, the method comprising:
   contacting the protein and/or the protein complex with the MS-cleavable heterobifunctional photoactivated cross-linker of claim 1 to form a first linked product;
   exposing the first linked product to ultraviolet light to form a crosslinked product;
   digesting the crosslinked product with one or more enzymes to form peptide fragments;
   identifying the one or more peptide fragments using tandem mass spectrometry ($MS^n$), thereby mapping intra-protein interactions in the protein and/or inter-protein interactions in the protein complex.

3. The method of claim 2, wherein the protein and/or the protein complex are contacted with the MS-cleavable heterobifunctional photoactivated cross-linker at a molar ratio of 1:5 to 1:500 (protein:crosslinker).

4. The method of claim 2, wherein the first linked product is exposed to ultraviolet light at a wavelength of 250 nm to 400 nm for at least 1 minute at 0° C. to 15° C.

5. The method of claim 2, wherein the crosslinked product is reduced/alkylated and digested with Lys-C/trypsin or chymotrypsin to form peptide fragments.

6. The method of claim 2, wherein prior to the use of $MS^n$, the peptide fragments are enriched by using size-exclusion chromatography.

7. A method for cross-linking mass spectrometry (XL-MS) for identifying one or more cross-linked peptides, the method comprising:

contacting the protein and/or the protein complex with the MS-cleavable heterobifunctional photoactivated cross-linker of claim 1 to form a first linked product;

exposing the first linked product to ultraviolet light to form a crosslinked product;

digesting the crosslinked product with one or more enzymes to form peptide fragments, wherein the peptide fragments are chemically cross-linked to the MS-cleavable heterobifunctional photoactivated cross-linker;

performing a liquid chromatography-tandem mass spectrometry (LC-$MS^n$) analysis on the one or more cross-linked peptides, wherein the LC-$MS^n$ analysis comprises:

detecting the one or more cross-linked peptides by $MS^1$ analysis;

selecting the one or more cross-linked peptides detected by $MS^1$ for $MS^2$ analysis;

selectively fragmenting the at least one CID cleavable bond and separating the one or more cross-linked peptides during $MS^2$ analysis;

sequencing the one or more cross-linked peptides separated during $MS^2$ analysis by $MS^3$ analysis; and integrating data obtained during $MS^1$, $MS^2$ and $MS^3$ analyses to identify the one or more cross-linked peptides.

8. The method of claim 7, wherein the protein and/or the protein complex are contacted with the MS-cleavable heterobifunctional photoactivated cross-linker in a light excluded environment.

9. The method of claim 7, wherein the protein and/or the protein complex are contacted with the MS-cleavable heterobifunctional photoactivated cross-linker at a molar ratio of 1:5 to 1:500 (protein:crosslinker).

10. The method of claim 7, wherein the first linked product is exposed to ultraviolet light at a wavelength of 250 nm to 400 nm for at least 1 minute at 0° C. to 15° C.

11. The method of claim 7, wherein the crosslinked product is reduced/alkylated and digested with Lys-C/trypsin or chymotrypsin to form cross-linked peptides.

12. The method of claim 7, wherein prior to LC-$MS^n$, the cross-linked peptides are enriched by using size-exclusion chromatography.

* * * * *